(12) United States Patent
Ashrafi et al.

(10) Patent No.: US 10,073,417 B2
(45) Date of Patent: Sep. 11, 2018

(54) SYSTEM AND METHOD FOR APPLYING ORTHOGONAL LIMITATIONS TO LIGHT BEAMS USING MICROELECTROMECHANICAL SYSTEMS

(71) Applicant: NXGEN PARTNERS IP, LLC, Dallas, TX (US)

(72) Inventors: Solyman Ashrafi, Plano, TX (US); Roger Linquist, Dallas, TX (US)

(73) Assignee: NxGen Partners IP, LLC, Dallas, TX (US)

(*) Notice: Subject to any disclaimer, the term of this patent is extended or adjusted under 35 U.S.C. 154(b) by 0 days.

(21) Appl. No.: 14/864,511

(22) Filed: Sep. 24, 2015

(65) Prior Publication Data

US 2016/0041523 A1 Feb. 11, 2016

Related U.S. Application Data

(63) Continuation-in-part of application No. 14/731,191, filed on Jun. 4, 2015, now Pat. No. 9,413,448.

(Continued)

(51) Int. Cl.
*G03H 1/08* (2006.01)
*G03H 1/10* (2006.01)
(Continued)

(52) U.S. Cl.
CPC ....... *G03H 1/2645* (2013.01); *G02B 26/0833* (2013.01); *G03H 1/2294* (2013.01); *G03H 2225/24* (2013.01)

(58) Field of Classification Search
CPC ......... G03H 1/2294; G03H 2001/0224; G03H 1/2645; G03H 2225/22; G03H 2225/24;
(Continued)

(56) References Cited

U.S. PATENT DOCUMENTS

| 3,459,466 | A | 8/1969 | Giordmaine |
| 3,614,722 | A | 10/1971 | Jones |

(Continued)

OTHER PUBLICATIONS

Kostov et al., "Microelectromechanical Diffraction Gratings: Areas of Applicability of Prospects," Optoelectronics, Instrumentation and Data Processing, vol. 49, No. 3, 2013, pp. 273-286.*

(Continued)

*Primary Examiner* — Jade R Chwasz

(57) ABSTRACT

A system for generating a light beam having a plurality of orthogonal function modes includes a light source for generating a plane wave light beam. A MicroElectroMechanical (MEM) system including an array of micro-mirrors for generating the light beam having the plurality of orthogonal function modes applied thereto responsive to the plane wave light beam and control signals for controlling the array of micro-mirrors. A controller generates the control signals to control a position of each of a plurality of micro-mirrors of the array of micro-mirrors. The controller controls the position of the micro-mirrors to generate a plurality of holograms for applying the plurality of orbital angular momentum modes to the plane wave light beam responsive to the control signals.

22 Claims, 68 Drawing Sheets

US 10,073,417 B2

Page 2

Related U.S. Application Data

(60) Provisional application No. 62/056,227, filed on Sep. 26, 2014, provisional application No. 62/035,224, filed on Aug. 8, 2014.

(51) Int. Cl.
 G03H 1/04 (2006.01)
 G03H 1/26 (2006.01)
 G02B 26/08 (2006.01)
 G03H 1/22 (2006.01)

(58) Field of Classification Search
 CPC .......... G03H 2225/55; G03H 2226/04; G02B 26/101; G02B 26/0833; G02B 5/32; G02B 26/105; G02B 26/10; G02B 3/0006
 USPC ........ 359/9, 10, 34, 35, 197.1, 199.4, 201.1, 359/202.1
 See application file for complete search history.

(56) References Cited

U.S. PATENT DOCUMENTS

| | | | |
|---|---|---|---|
| 4,379,409 | A | 8/1983 | Primbsch et al. |
| 4,503,336 | A | 3/1985 | Hutchin et al. |
| 4,736,463 | A | 4/1988 | Chavez |
| 4,862,115 | A | 8/1989 | Lee et al. |
| 5,051,754 | A | 9/1991 | Newberg |
| 5,220,163 | A | 6/1993 | Toughlian et al. |
| 5,222,071 | A | 6/1993 | Pezeshki et al. |
| 5,272,484 | A | 12/1993 | Labaar |
| 5,543,805 | A | 8/1996 | Thaniyavarn |
| 5,555,530 | A | 9/1996 | Meehan |
| 6,337,659 | B1 | 1/2002 | Kim |
| 6,992,829 | B1 | 1/2006 | Jennings et al. |
| 7,577,165 | B1 | 8/2009 | Barrett |
| 7,729,572 | B1 | 6/2010 | Pepper et al. |
| 7,792,431 | B2 | 9/2010 | Jennings et al. |
| 8,432,884 | B1 | 4/2013 | Ashrafi |
| 8,503,546 | B1 | 8/2013 | Ashrafi |
| 8,559,823 | B2 | 10/2013 | Izadpanah et al. |
| 8,811,366 | B2 | 8/2014 | Ashrafi |
| 9,077,577 | B1 | 7/2015 | Ashrafi |
| 2005/0254826 | A1 | 11/2005 | Jennings et al. |
| 2005/0259914 | A1 | 11/2005 | Padgett et al. |
| 2006/0193557 | A1 | 8/2006 | Bradley et al. |
| 2010/0013696 | A1 | 1/2010 | Schmitt et al. |
| 2012/0150019 | A1 | 6/2012 | Elgort et al. |
| 2012/0207470 | A1 | 8/2012 | Djordevic et al. |
| 2013/0027774 | A1 | 1/2013 | Bovino et al. |
| 2013/0235744 | A1 | 9/2013 | Chen et al. |
| 2013/0258444 | A1 | 10/2013 | Zhou |
| 2013/0289668 | A1* | 10/2013 | Nirenberg .............. G06K 9/605 607/88 |
| 2014/0355624 | A1 | 12/2014 | Li et al. |
| 2015/0098697 | A1 | 4/2015 | Marom et al. |

OTHER PUBLICATIONS

Solyman Ashrafi, Channeling Radiation of Electrons in Crystal Lattices, Essays on Classical and Quantum Dynamics, Gordon and Breach Science Publishers, 1991.

Solyman Ashrafi, Solar Flux Forecasting Using Mutual Information with an Optimal Delay, Advances in the Astronautical Sciences, American Astronautical Society, vol. 84 Part II, 1993.

Solyman Ashrafi, PCS system design issues in the presence of microwave OFS, Electromagnetic Wave Interactions, Series on Stability, Vibration and Control of Systems, World Scientific, Jan. 1996.

Solyman Ashrafi, Performance Metrics and Design Parameters for an FSO Communications Link Based on Multiplexing of Multiple Orbital-Angular-Momentum Beams, Globecom2014 OWC Workshop, 2014.

Solyman Ashrafi, Optical Communications Using Orbital Angular Momentum Beams, Adv. Opt. Photon. 7, 66-106, Advances in Optics and Photonic, 2015.

Solyman Ashrafi, Performance Enhancement of an Orbital-Angular-Momentum-Based Free-Space Optical Communication Link through Beam Divergence Controlling, OSA Technical Digest (online), paper M2F.6. The Optical Society, 2015.

Solyman Ashrafi, Experimental demonstration of enhanced spectral efficiency of 1.18 symbols/s/Hz using multiple-layer-overlay modulation for QPSK over a 14-km fiber link. OSA Technical Digest (online), paper JTh2A.63. The Optical Society, 2014.

Solyman Ashrafi, Link Analysis of Using Hermite-Gaussian Modes for Transmitting Multiple Channels in a Free-Space Optical Communication System, The Optical Society, vol. 2, No. 4, Apr. 2015.

Solyman Ashrafi, Performance Metrics and Design Considerations for a Free-Space Optical Orbital-Angular-Momentum-Multiplexed Communication Link, The Optical Society, vol. 2, No. 4, Apr. 2015.

Solyman Ashrafi, Demonstration of Distance Emulation for an Orbital-Angular-Momentum Beam. OSA Technical Digest (online), paper STh1F.6. The Optical Society, 2015.

Solyman Ashrafi, Free-Space Optical Communications Using Orbital-Angular-Momentum Multiplexing Combined with MIMO-Based Spatial Multiplexing. Optics Letters, vol. 40, No. 18, Sep. 4, 2015.

Solyman Ashrafi, Enhanced Spectral Efficiency of 2.36 bits/s/Hz Using Multiple Layer Overlay Modulation for QPSK over a 14-km Single Mode Fiber Link. OSA Technical Digest (online), paper SW1M.6. The Optical Society, 2015.

Solyman Ashrafi, Experimental Demonstration of a 400-Gbit/s Free Space Optical Link Using Multiple Orbital-Angular-Momentum Beams with Higher Order Radial Indices. OSA Technical Digest (online), paper SW4M.5. The Optical Society, 2015.

Solyman Ashrafi, Experimental Demonstration of 16-Gbit/s Millimeter-Wave Communications Link using Thin Metamaterial Plates to Generate Data-Carrying Orbital-Angular-Momentum Beams, ICC 2015, London, UK, 2014.

Solyman Ashrafi, Experimental Demonstration of Using Multi-Layer-Overlay Technique for Increasing Spectral Efficiency to 1.18 bits/s/Hz in a 3 Gbit/s Signal over 4-km Multimode Fiber. OSA Technical Digest (online), paper JTh2A.63. The Optical Society, 2015.

Solyman Ashrafi, Experimental Measurements of Multipath-Induced Intra- and Inter-Channel Crosstalk Effects in a Millimeter-Wave Communications Link using Orbital-Angular-Momentum Multiplexing, ICC 2015, London, UK, 2014.

Solyman Ashrafi, Performance Metrics for a Free-Space Communication Link Based on Multiplexing of Multiple Orbital Angular Momentum Beams with Higher Order Radial Indice. OSA Technical Digest (online), paper JTh2A.62. The Optical Society, 2015.

Solyman Ashrafi, 400-Gbit/s Free-Space Optical Communications Link Over 120-meter Using Multiplexing of 4 Collocated Orbital-Angular-Momentum Beams. OSA Technical Digest (online), paper M2F.1. The Optical Society, 2015.

Solyman Ashrafi, Experimental Demonstration of Two-Mode 16-Gbit/s Free-Space mm-Wave Communications Link Using Thin Metamaterial Plates to Generate Orbital Angular Momentum Beams, Optica, vol. 1, No. 6, Dec. 2014.

Solyman Ashrafi, Demonstration of an Obstruction-Tolerant Millimeter-Wave Free-Space Communications Link of Two 1-Gbaud 16-QAM Channels using Bessel Beams Containing Orbital Angular Momentum, Third International Conference on Optical Angular Momentum (ICOAM), Aug. 4-7, 2015, New York USA.

Wang et al: "Terabit free-space data transmission employing orbital angular momentum multiplexing", Nature Photonics, vol. 6, Jul. 2012, pp. 488-496.

Solyman Ashrafi, An Information Theoretic Framework to Increase Spectral Efficiency, IEEE Transactions on Information Theory, vol. XX, No. Y, Oct. 2014, Dallas, Texas.

H. Yao et al, Patch Antenna Array for the Generation of Millimeter-wave Hermite-Gaussian Beams, IEEE Antennas and Wireless Propagation Letters, (pending publication).

Yongxiong Ren et al, Experimental Investigation of Data Transmission Over a Graded-index Multimode Fiber Using the Basis of Orbital Angular Momentum Modes (pending publication).

(56) References Cited

OTHER PUBLICATIONS

M. Nouri et al., Perturbations of Laguerre-Gaussian Beams by Chiral Molecules (pending publication).
Solyman Ashrafi, Acoustically induced stresses in elastic cylinders and their visualization, The Journal of the Acoustical Society of America 82(4):1378-1385, Sep. 1987.
Solyman Ashrafi, Splitting of channeling-radiation peaks in strained-layer superlattices, Journal of the Optical Society of America B 8(12), Nov. 1991.
Solyman Ashrafi, Spurious Resonances and Modelling of Composite Resonators, 37th Annual Symposium on Frequency Control, 1983.
Solyman Ashrafi, Splitting and contrary motion of coherent bremsstrahlung peaks in strained-layer superlattices, Journal of Applied Physics 70:4190-4193, Dec. 1990.
Solyman Ashrafi, Evidence of Chaotic Pattern in Solar Flux Through a Reproducible Sequence of Period-Doubling-Type Bifurcations, Proceedings of Flight Mechanics/Estimation Theory Symposium, National Aeronautics and Space Administration, May 1991.
Solyman Ashrafi, Combining Schatten's Solar Activity Prediction Model with a Chaotic Prediction Model, National Aeronautics and Space Administration, Nov. 1991.
Solyman Ashrafi, Nonlinear Techniques for Forecasting Solar Activity Directly From its Time Series, Proceedings of Flight Mechanics/Estimation Theory Symposium, National Aeronautics and Space Administration, May 1992.
Solyman Ashrafi, Detecting and Disentangling Nonlinear Structure from Solar Flux Time Series, 43rd Congress of the International Astronautical Federation, Aug. 1992.
Solyman Ashrafi, Physical Phaseplate for the Generation of a Millimeter-Wave Hermite-Gaussian Beam, IEEE Antennas and Wireless Propagation Letters, RWS 2016; pp. 234-237.
Solyman Ashrafi; Future Mission Studies: Preliminary Comparisons of Solar Flux Models; NASA Goddard Space Flight Center Flight Dynamics Division; Flight Dynamics Division Code 550; Greenbelt, Maryland; Dec. 1991.
Ren, Y. et al.; Experimental Demonstration of 16 Gbit/s millimeter-wave Communications using MIMO Processing of 2 OAM Modes on Each of Two Transmitter/Receiver Antenna Apertures. In Proc. IEEE GLobal TElecom. Conf. 3821-3826 (2014).
Li, X. et al.; Investigation of interference in multiple-input multiple-output wireless transmission at W band for an optical wireless integration system. Optics Letters 38, 742-744 (2013).
Padgett, Miles J. et al., Divergence of an orbital-angular-momentum-carrying beam upon propagation. New Journal of Physics 17, 023011 (2015).
Mahmouli, F.E. & Walker, D. 4-Gbps Uncompressed Video Transmission over a 60-GHz Orbital Angular Momentum Wireless Channel. IEEE Wireless Communications Letters, vol. 2, No. 2, 223-226 (Apr. 2013).
Vasnetsov, M. V., Pasko, V.A. & Soskin, M.S.; Analysis of orbital angular momentum of a misaligned optical beam; New Journal of Physics 7, 46 (2005).
Byun, S.H., Haji, G.A. & Young, L.E.; Development and application of GPS signal multipath simulator; Radio Science, vol. 37, No. 6, 1098 (2002).
Tamburini, Fabrizio; Encoding many channels on the same frequency through radio vorticity: first experimental test; New Journal of Physics 14, 033001 (2012).
Yan, Y. et al.; High-capacity millimetre-wave communications with orbital angular momentum multiplexing; Nature Communications; 5, 4876 (2014).
Hur, Sooyoung et at.; Millimeter Wave Beamforming for Wireless Backhaul and Access in Small Cell Networks. IEEE Transactions on Communications, vol. 61, 4391-4402 (2013).
Allen, L., Beijersbergen, M., Spreeuw, R.J.C., and Woerdman, J.P.; Orbital Angular Momentum of Light and the Transformation of Laguerre-Gaussian Laser Modes; Physical Review A, vol. 45, No. 11; 8185-8189 (1992).
Anderson, Jorgen Bach; Rappaport, Theodore S.; Yoshida, Susumu; Propagation Measurements and Models for Wireless Communications Channels; 33 42-49 (1995).
Iskander, Magdy F.; Propagation Prediction Models for Wireless Communication Systems; IEEE Transactions on Microwave Theory and Techniques, vol. 50., No. 3, 662-673 (2002).
Wang, Jian, et al.; Terabit free-space data transmission employing orbital angular momentum multiplexing. Nature Photonics; 6, 488-496 (2012).
Katayama, Y., et al.; Wireless Data Center Networking with Steered-Beam mmWave Links; IEEE Wireless Communication Network Conference; 2011, 2179-2184 (2011).
Molina-Terriza, G., et al.; Management of the Angular Momentum of Light: Preparation of Photons in Multidimensional Vector States of Angular Momentum; Physical Review Letters; vol. 88, No. 1; 77, 013601/1-4 (2002).
Rapport, T.S.; Millimeter Wave Mobile Communications for 5G Cellular: It Will Work!; IEEE Access, 1, 335-349 (2013).
PCT: International Search Report and Written Opinion of PCT/US2015/52312 (related application), Dec. 14, 2015, 13 pgs.
Gibson, G. et al., Free-space information transfer using light beans carrying orbital angular momentum; Optical Express 12, 5448-5456 (2004).

* cited by examiner

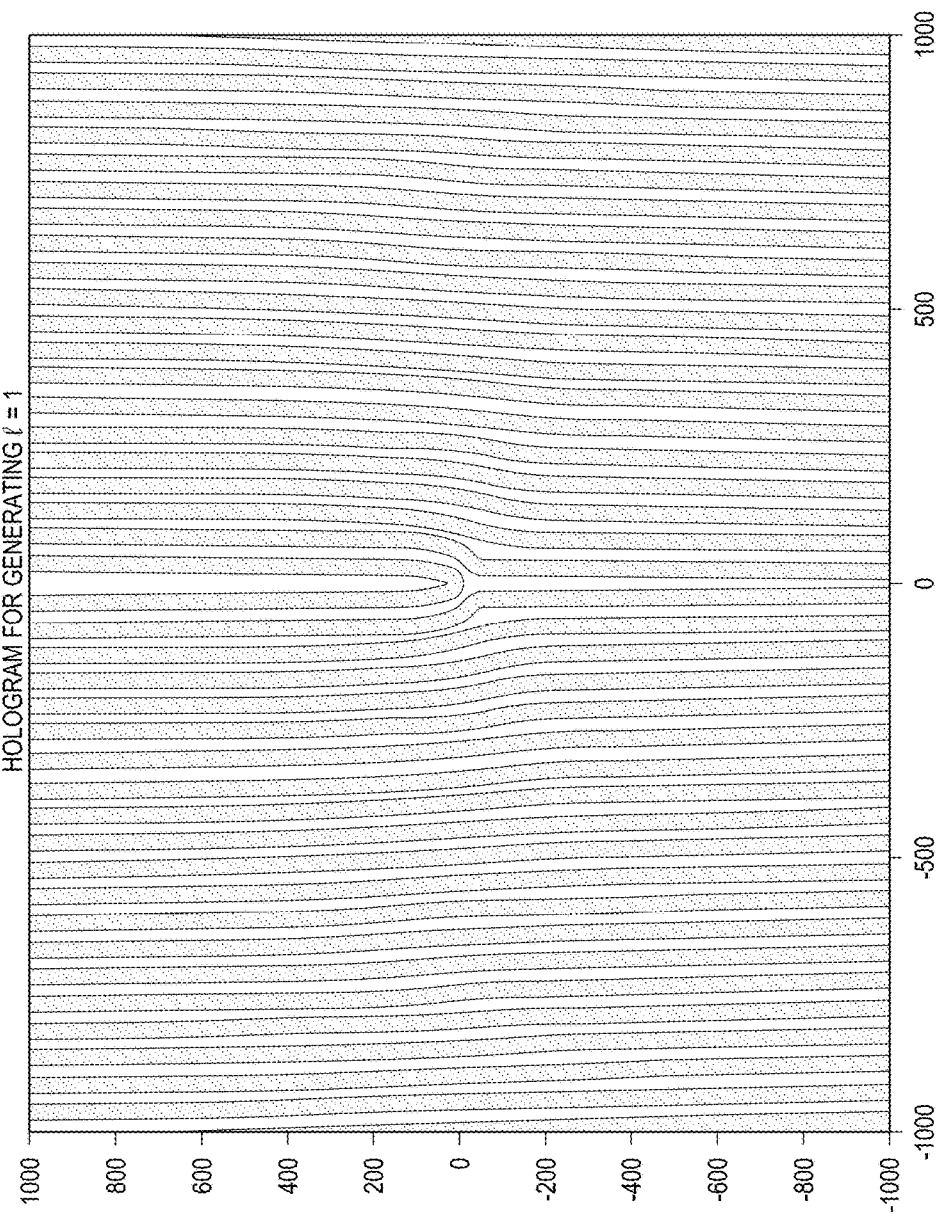

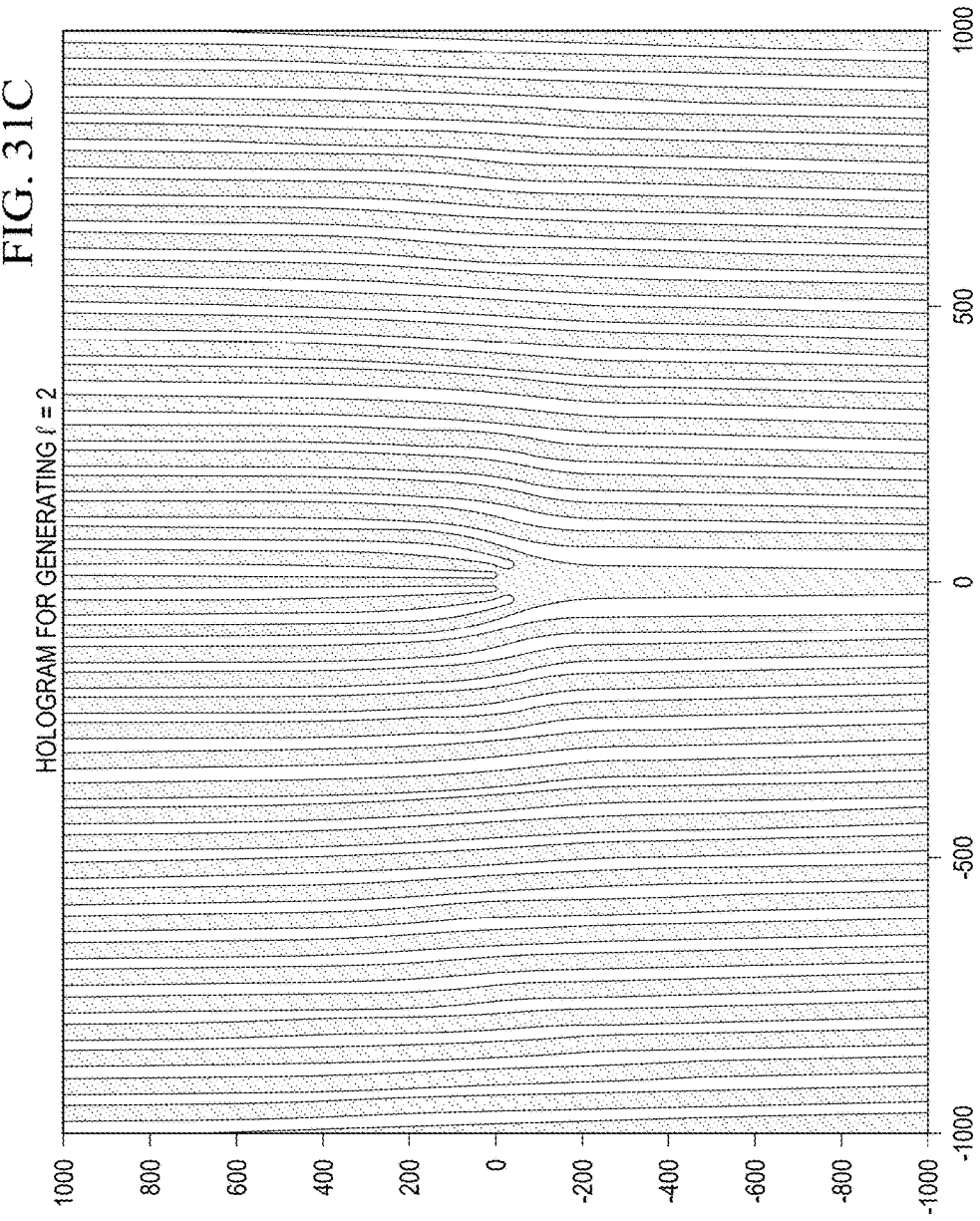

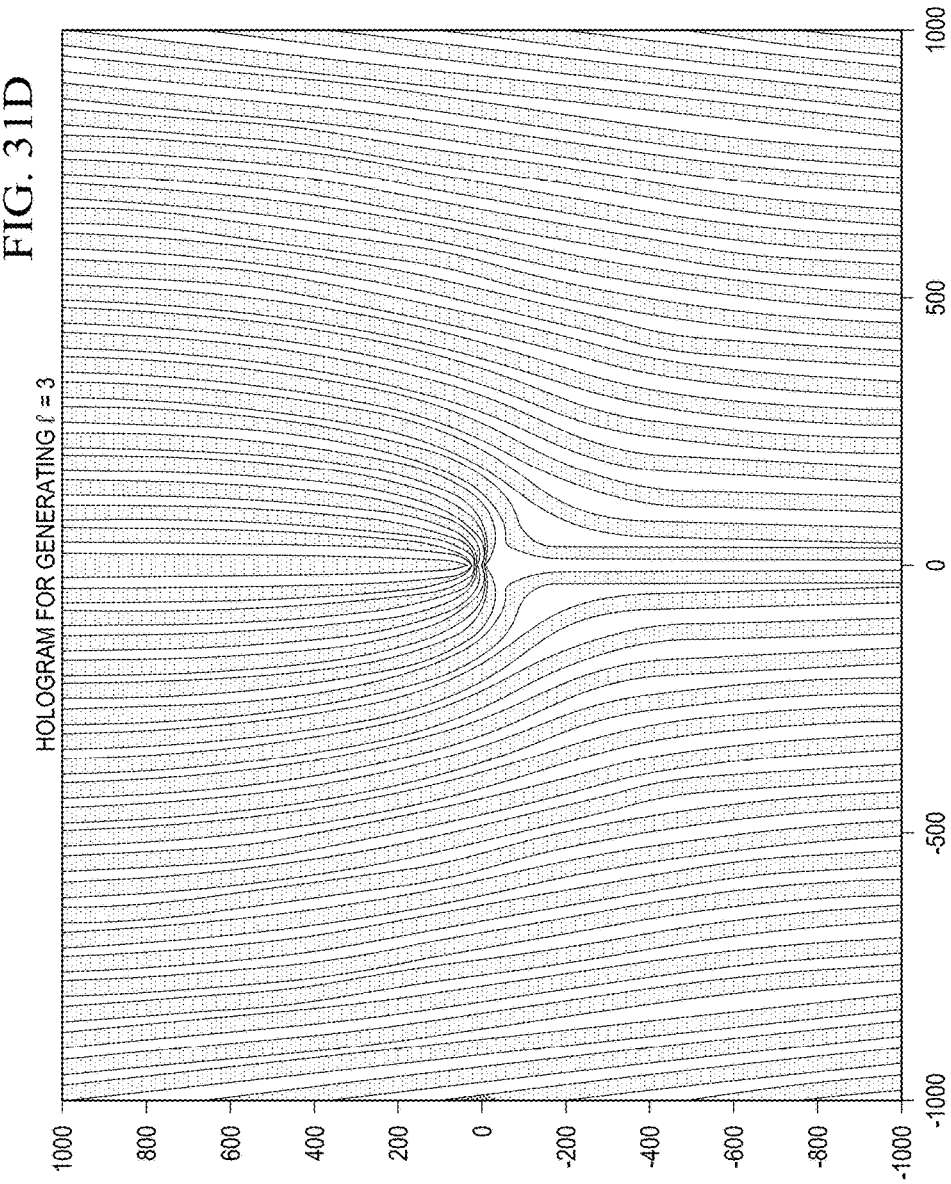

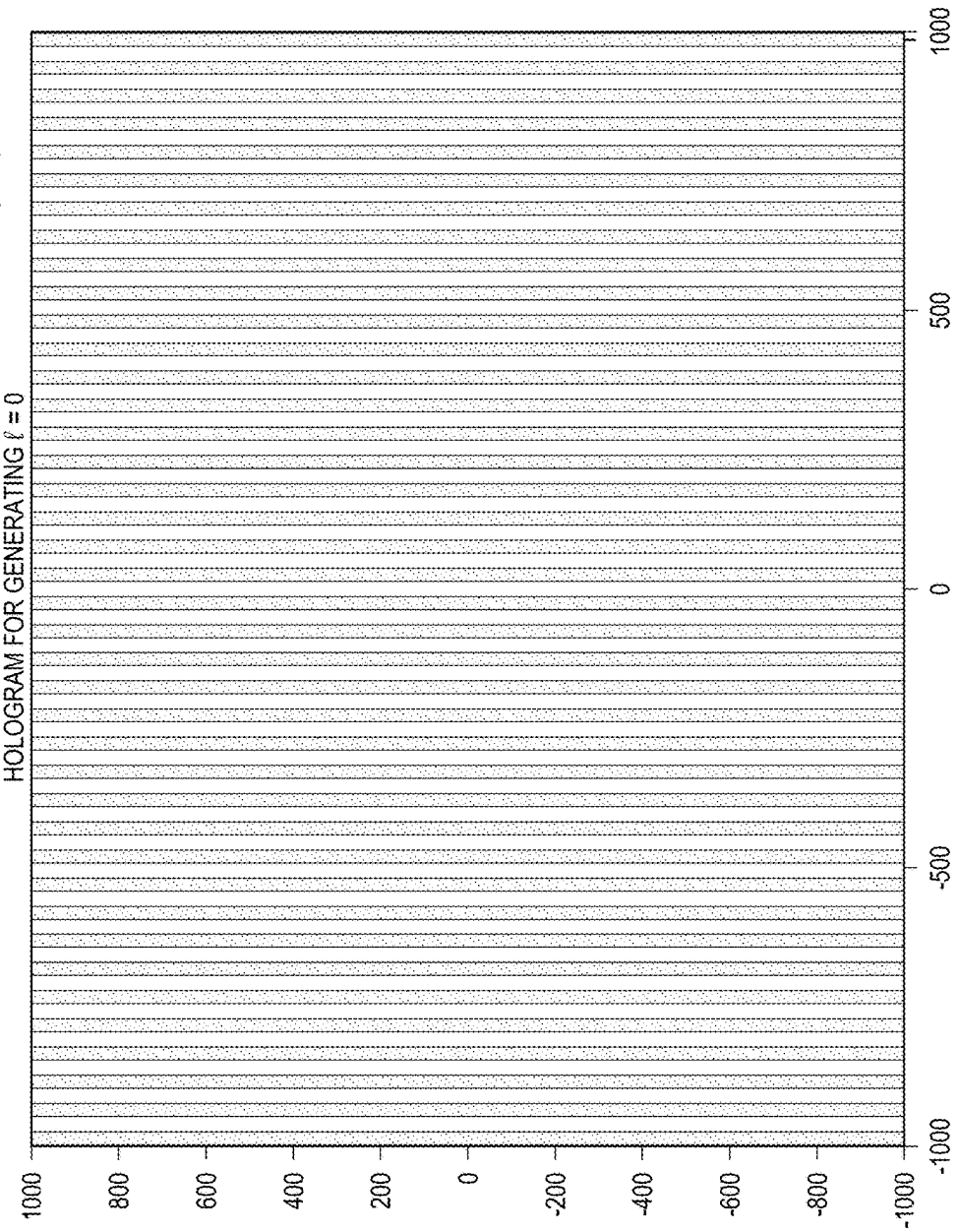

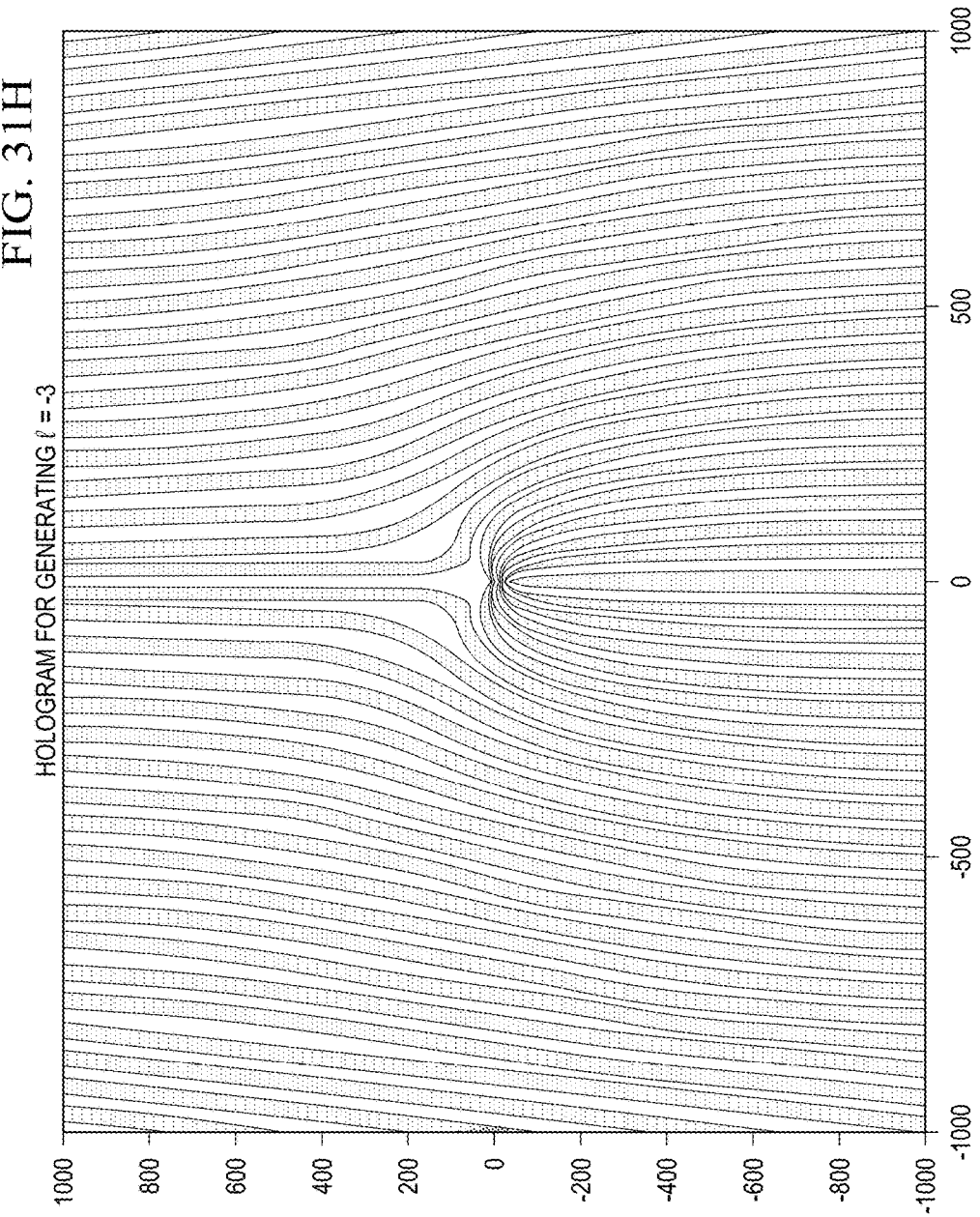

SYSTEM AND METHOD FOR APPLYING ORTHOGONAL LIMITATIONS TO LIGHT BEAMS USING MICROELECTROMECHANICAL SYSTEMS

CROSS-REFERENCE TO RELATED APPLICATIONS

This application claims benefit of U.S. Provisional Application No. 62/056,227, filed Sep. 26, 2014, entitled ORBITAL ANGULAR MOMENTUM USING MEMS, which is incorporated by reference herein in its entirety.

This application is also a Continuation-in-Part of U.S. patent application Ser. No. 14/731,191, filed Jun. 4, 2015, entitled SYSTEMS AND METHODS FOR FOCUSING BEAMS WITH MODE DIVISION MULTIPLEXING, which claims benefit of U.S. Provisional Application No. 62/035,224, filed Aug. 8, 2014, entitled FOCUSING APPROACH FOR OAM-BASED FREE-SPACE AND RF. U.S. patent application Ser. No. 14/731,191 and 62/035,224 are incorporated by reference herein in their entirety.

TECHNICAL FIELD

The following relates to orthogonal function based optical communication, and more particularly, to the generation of orthogonal function signals within an optical signal using micro electromechanical systems.

BRIEF DESCRIPTION OF THE DRAWINGS

For a more complete understanding, reference is now made to the following description taken in conjunction with the accompanying Drawings in which:

FIGS. 31A-31H illustrate holograms that may be used for modulating a beam;

DETAILED DESCRIPTION

Figure 1:
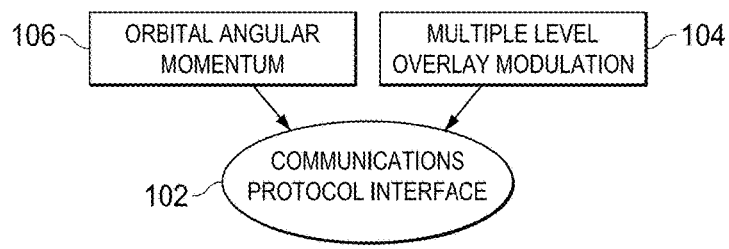
FIG. 1 illustrates a general overview of the manner for providing communication bandwidth between various communication protocol interfaces.

Referring now to the drawings, wherein like reference numbers are used herein to designate like elements throughout, the various views and embodiments of system and method for communication using orbital angular momentum with modulation are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated a general overview of the manner for providing improved spectral efficiency within various communication protocol interfaces 102, using a combination of multiple level overlay modulation 104 and the application of orbital angular momentum 106 to increase the number of communications channels.

The various communication protocol interfaces 102 may be comprised of a variety of system links using the electromagnetic spectrum, such as RF, cable or twisted pair, or optical making use of light wavelengths such as fiber-optic communications or free-space optics. Various types of RF communications may include a combination of RF microwave, RF satellite communication, nomadic and mobile wireless systems, as well as multiplexing between RF and free-space optics in real time.

By combining a multiple layer overlay modulation technique 104 with orbital angular momentum (OAM) technique 106, a higher throughput over various types of system 102 may be achieved. The use of multiple level overlay modulation alone without OAM increases the spectral efficiency of systems 102, whether wired, optical, or wireless. However, together with OAM, the increase in spectral efficiency is even more significant.

Multiple overlay modulation techniques 104 provide a new degree of freedom beyond the conventional 2 degrees of freedom, with time T and frequency F being independent variables in a two-dimensional notational space defining orthogonal axes in an information diagram. This comprises a more general approach rather than modeling signals as fixed in either the frequency or time domain. Previous modeling methods using fixed time or fixed frequency are considered to be more limiting cases of the general approach of using multiple level overlay modulation 104. Within the multiple level overlay modulation technique 104, signals may be differentiated in two-dimensional space rather than along a single axis. Thus, the information-carrying capacity and/or spectral efficiency of a system may be determined by a number of signals which occupy different time and frequency coordinates and may be differentiated in a notational two-dimensional space.

Within the notational two-dimensional space, minimization of the time bandwidth product, i.e., the area occupied by a signal in that space, enables denser packing, and thus, the use of more signals, with higher resulting information-carrying capacity and/or spectral efficiency, within a fixed bandwidth. Given the frequency bandwidth delta ($\Delta f$), a given signal transmitted through it in minimum time $\Delta t$ will have an envelope described by certain time-bandwidth minimizing signals. The time-bandwidth products for these signals take the form;

$$\Delta t \Delta f = \frac{1}{2}(2n+1) \quad (1)$$

where n is an integer ranging from 0 to infinity, denoting the order of the signal.

These signals form an orthogonal set of infinite elements, where each has a finite amount of energy. They are finite in both the time domain and the frequency domain, and can be detected from a mix of other signals and noise through correlation, for example, by match filtering. Unlike other wavelets, these orthogonal signals have similar time and frequency forms.

The orbital angular momentum process 106 provides a twist to wave fronts of the electromagnetic fields carrying the data stream that may enable the transmission of multiple data streams on the same frequency, wavelength, or other signal-supporting mechanism. This will increase the bandwidth over a system by allowing a single frequency or wavelength to support multiple eigen channels, each of the individual channels having a different orthogonal and independent orbital angular momentum associated therewith.

Figure 2:
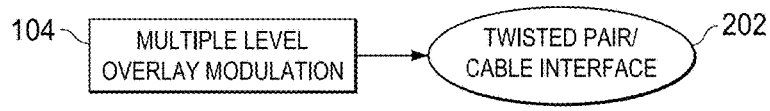
FIG. 2 illustrates the manner for utilizing multiple level overlay modulation with twisted pair/cable interfaces.

In one embodiment, referring now to FIG. 2, there is illustrated a further communication implementation technique using the above described techniques as twisted pairs or cables carry electrons (not photons). Rather than using each of the multiple level overlay modulation 104 and orbital angular momentum techniques 106, only the multiple level overlay modulation 104 can be used in conjunction with a single wireline interface and, more particularly, a twisted pair communication link or a cable communication link 202. The operation of the multiple level overlay modulation 204, is similar to that discussed previously with respect to FIG. 1, but is used by itself without the use of orbital angular momentum techniques 106, and is used with either a twisted pair communication link or cable interface communication link 202.

Figure 3:
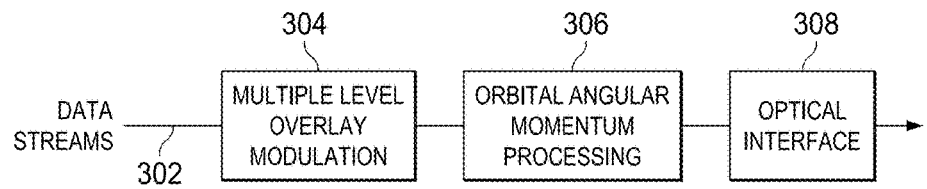
FIG. 3 illustrates a general block diagram for processing a plurality of data streams within an optical communication system.

Referring now to FIG. 3, there is illustrated a general block diagram for processing a plurality of data streams 302 for transmission in an optical communication system. The multiple data streams 302 are provided to the multi-layer overlay modulation circuitry 304 wherein the signals are modulated using the multi-layer overlay modulation technique. The modulated signals are provided to orbital angular momentum processing circuitry 306 which applies a twist to each of the wave fronts being transmitted on the wavelengths of the optical communication channel. The twisted waves are transmitted through the optical interface 308 over an optical communications link such as an optical fiber or free space optics communication system. FIG. 3 may also illustrate an RF mechanism wherein the interface 308 would comprise and RF interface rather than an optical interface.

Figure 4:
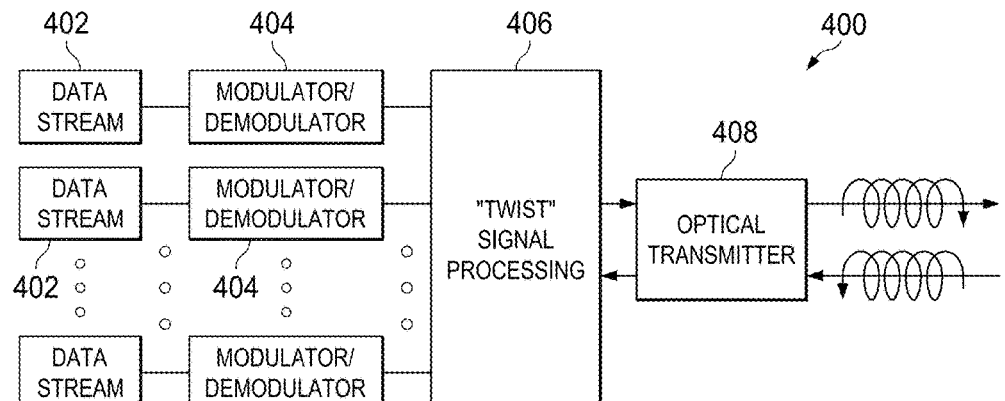
FIG. 4 is a functional block diagram of a system for generating orbital angular momentum within a communication system.

Referring now more particularly to FIG. 4, there is illustrated a functional block diagram of a system for generating the orbital angular momentum "twist" within a communication system, such as that illustrated with respect to FIG. 1, to provide a data stream that may be combined with multiple other data streams for transmission upon a same wavelength or frequency. Multiple data streams 402 are provided to the transmission processing circuitry 400. Each of the data streams 402 comprises, for example, an end to end connection carrying a voice call or a packet connection transmitting non-circuit switch packed data over a data connection. The multiple data streams 402 are processed by modulator/demodulator circuitry 404. The modulator/demodulator circuitry 404 modulates the received data stream 402 onto a wavelength or frequency channel using a multiple level overlay modulation technique, as will be more fully described herein below. The communications link may comprise an optical fiber link, free-space optics link, RF microwave link, RF satellite link, wired link (without the twist), etc.

The modulated data stream is provided to the orbital angular momentum (OAM) signal processing block 406. Each of the modulated data streams from the modulator/demodulator 404 are provided a different orbital angular momentum by the orbital angular momentum electromagnetic block 406 such that each of the modulated data streams have a unique and different orbital angular momentum associated therewith. Each of the modulated signals having an associated orbital angular momentum are provided to an optical transmitter 408 that transmits each of the modulated data streams having a unique orbital angular momentum on a same wavelength. Each wavelength has a selected number of bandwidth slots B and may have its data transmission capability increase by a factor of the number of degrees of orbital angular momentum l that are provided from the OAM electromagnetic block 406. The optical transmitter 408 transmitting signals at a single wavelength could transmit B groups of information. The optical transmitter 408 and OAM electromagnetic block 406 may transmit l×B groups of information according to the configuration described herein.

In a receiving mode, the optical transmitter 408 will have a wavelength including multiple signals transmitted therein having different orbital angular momentum signals embedded therein. The optical transmitter 408 forwards these signals to the OAM signal processing block 406, which separates each of the signals having different orbital angular momentum and provides the separated signals to the demodulator circuitry 404. The demodulation process extracts the data streams 402 from the modulated signals and provides it at the receiving end using the multiple layer overlay demodulation technique.

Figure 5:
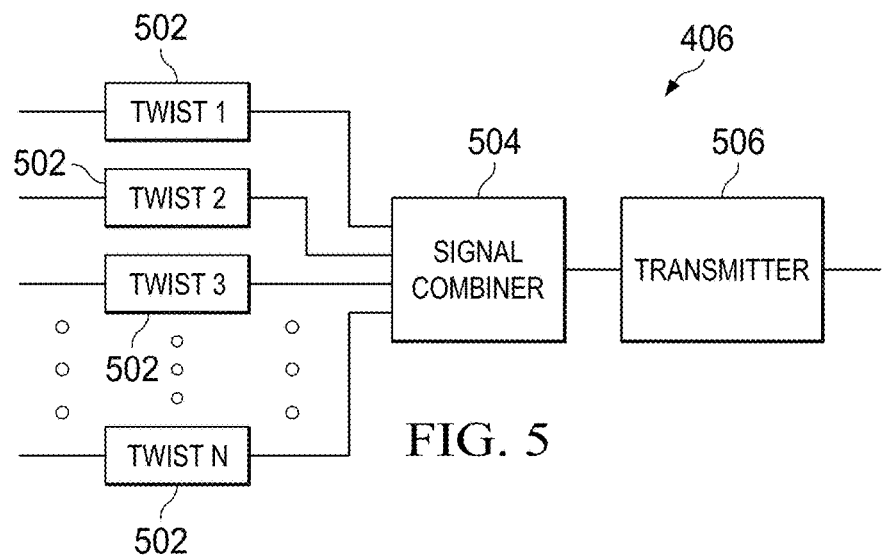
FIG. 5 is a functional block diagram of the orbital angular momentum signal processing block of FIG. 4.

Referring now to FIG. 5, there is provided a more detailed functional description of the OAM signal processing block 406. Each of the input data streams are provided to OAM circuitry 502. Each of the OAM circuitry 502 provides a different orbital angular momentum to the received data stream. The different orbital angular momentums are achieved by applying different currents for the generation of the signals that are being transmitted to create a particular orbital angular momentum associated therewith. The orbital angular momentum provided by each of the OAM circuitries 502 are unique to the data stream that is provided thereto. An infinite number of orbital angular momentums may be applied to different input data streams using many different currents. Each of the separately generated data streams are provided to a signal combiner 504, which combines the signals onto a wavelength for transmission from the transmitter 506.

Figure 6:
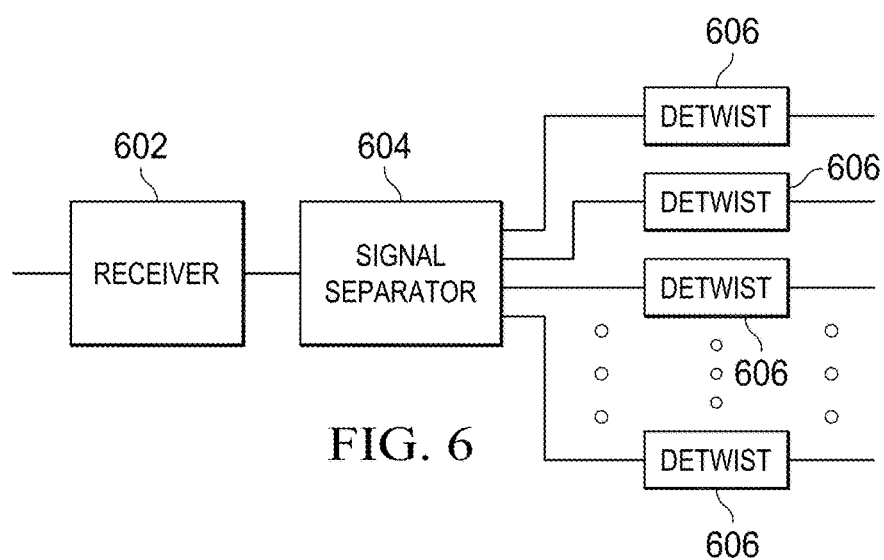
FIG. 6 is a functional block diagram illustrating the manner for removing orbital angular momentum from a received signal including a plurality of data streams.

Referring now to FIG. 6, there is illustrated an embodiment in which the OAM processing circuitry 406 may separate a received signal into multiple data streams. The receiver 602 receives the combined OAM signals on a single wavelength and provides this information to a signal separator 604. The signal separator 604 separates each of the signals having different orbital angular momentums from the received wavelength and provides the separated signals to OAM de-twisting circuitry 606. The OAM de-twisting circuitry 606 removes the associated OAM twist from each of the associated signals and provides the received modulated data stream for further processing. The signal separator 604 separates each of the received signals that have had the orbital angular momentum removed therefrom into individual received signals. The individually received signals are provided to the receiver 602 for demodulation using, for example, multiple level overlay demodulation as will be more fully described herein below.

Figure 7:
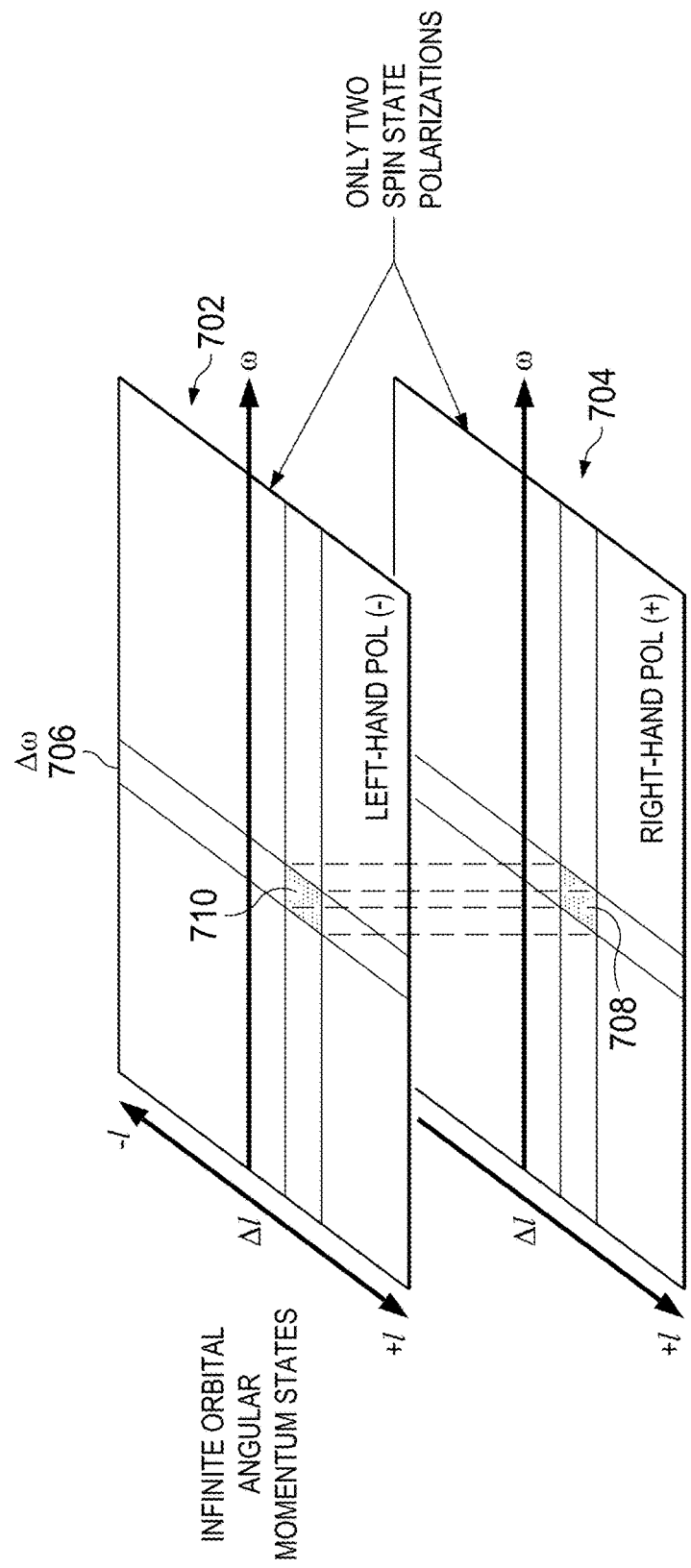
FIG. 7 illustrates a single wavelength having two quantispin polarizations providing an infinite number of signals having various orbital angular momentums associated therewith.

FIG. 7 illustrates in a manner in which a single wavelength or frequency, having two quanti-spin polarizations may provide an infinite number of twists having various orbital angular momentums associated therewith. The l axis represents the various quantized orbital angular momentum states which may be applied to a particular signal at a selected frequency or wavelength. The symbol omega (ω) represents the various frequencies to which the signals of differing orbital angular momentum may be applied. The top grid 702 represents the potentially available signals for a left handed signal polarization, while the bottom grid 704 is for potentially available signals having right handed polarization.

By applying different orbital angular momentum states to a signal at a particular frequency or wavelength, a potentially infinite number of states may be provided at the frequency or wavelength. Thus, the state at the frequency Δω or wavelength 706 in both the left handed polarization plane 702 and the right handed polarization plane 704 can provide an infinite number of signals at different orbital angular momentum states Δl. Blocks 708 and 710 represent a particular signal having an orbital angular momentum Δl at a frequency Δω or wavelength in both the right handed polarization plane 704 and left handed polarization plane 710, respectively. By changing to a different orbital angular momentum within the same frequency Δω or wavelength 706, different signals may also be transmitted. Each angular momentum state corresponds to a different determined current level for transmission from the optical transmitter. By estimating the equivalent current for generating a particular orbital angular momentum within the optical domain and applying this current for transmission of the signals, the transmission of the signal may be achieved at a desired orbital angular momentum state.

Thus, the illustration of FIG. 7, illustrates two possible angular momentums, the spin angular momentum, and the orbital angular momentum. The spin version is manifested within the polarizations of macroscopic electromagnetism, and has only left and right hand polarizations due to up and down spin directions. However, the orbital angular momentum indicates an infinite number of states that are quantized. The paths are more than two and can theoretically be infinite through the quantized orbital angular momentum levels.

Figure 8A:
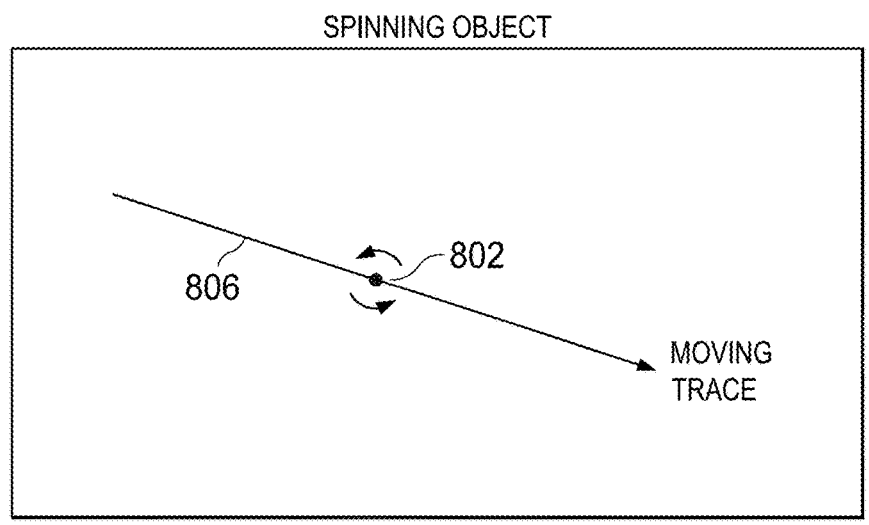
FIG. 8A illustrates an object with only a spin angular momentum.
Figure 8B:
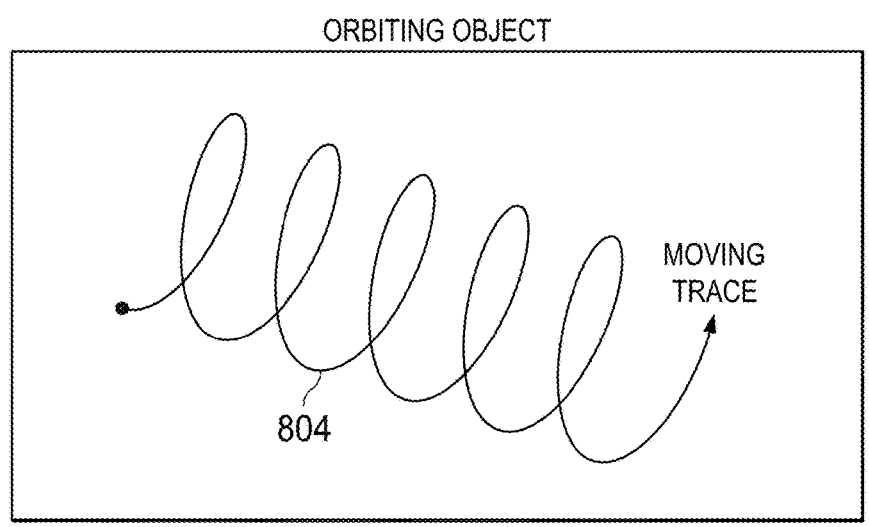
FIG. 8B illustrates an object with an orbital angular momentum.
Figure 8C:
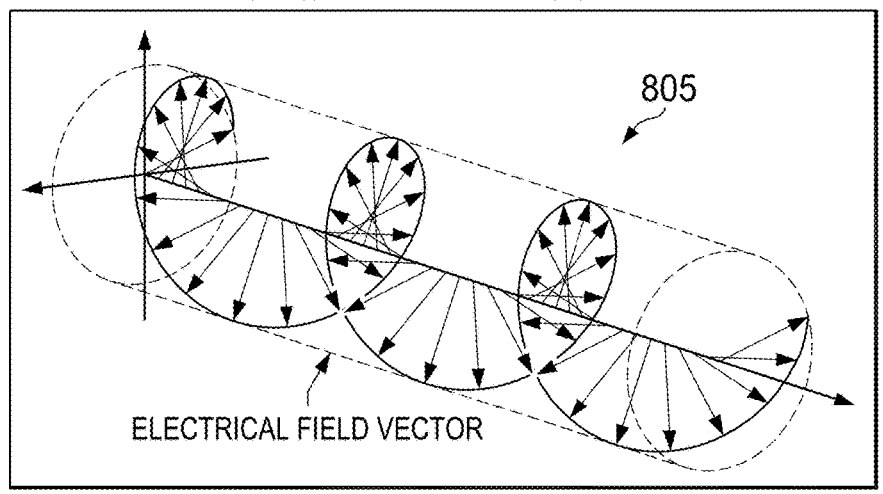
FIG. 8C illustrates a circularly polarized beam carrying spin angular momentum.
Figure 8D:
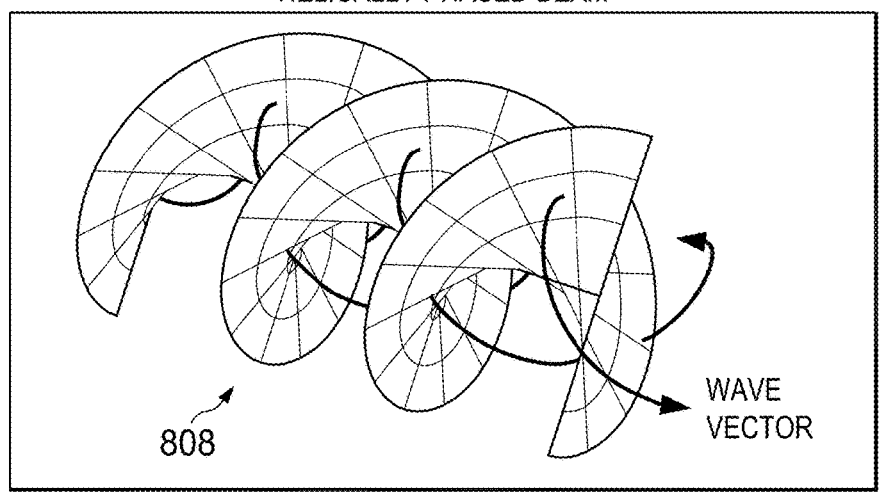
FIG. 8D illustrates the phase structure of a light beam carrying an orbital angular momentum.

It is well-known that the concept of linear momentum is usually associated with objects moving in a straight line. The object could also carry angular momentum if it has a rotational motion, such as spinning (i.e., spin angular momentum (SAM) 802), or orbiting around an axis 806 (i.e., OAM 804), as shown in FIGS. 8A and 8B, respectively. A light beam may also have rotational motion as it propagates. In paraxial approximation, a light beam carries SAM 802 if the electrical field rotates along the beam axis 806 (i.e., circularly polarized light 805), and carries OAM 804 if the wave vector spirals around the beam axis 806, leading to a helical phase front 808, as shown in FIGS. 8C and 8D. In its analytical expression, this helical phase front 808 is usually related to a phase term of exp(ilθ) in the transverse plane, where θ refers to the angular coordinate, and l is an integer indicating the number of intertwined helices (i.e., the number of 2π phase shifts along the circle around the beam axis). l could be a positive, negative integer or zero, corresponding to clockwise, counterclockwise phase helices or a Gaussian beam with no helix, respectively.

Two important concepts relating to OAM include:

1) OAM and polarization: As mentioned above, an OAM beam is manifested as a beam with a helical phase front and therefore a twisting wavevector, while polarization states can only be connected to SAM 802. A light beam carries SAM 802 of ±h/2π (h is Plank's constant) per photon if it is left or right circularly polarized, and carries no SAM 802 if it is linearly polarized. Although the SAM 802 and OAM 804 of light can be coupled to each other under certain scenarios, they can be clearly distinguished for a paraxial light beam. Therefore, with the paraxial assumption, OAM 804 and polarization can be considered as two independent properties of light.

2) OAM beam and Laguerre-Gaussian (LG) beam: In general, an OAM-carrying beam could refer to any helically phased light beam, irrespective of its radial distribution (although sometimes OAM could also be carried by a non-helically phased beam). LG beam is a special subset among all OAM-carrying beams, due to that the analytical expression of LG beams are eigen-solutions of paraxial form of the wave equation in a cylindrical coordinates. For an LG beam, both azimuthal and radial wavefront distributions are well defined, and are indicated by two index numbers, l and p, of which l has the same meaning as that of a general OAM beam, and p refers to the radial nodes in the intensity distribution. Mathematical expressions of LG beams form an orthogonal and complete basis in the spatial domain. In contrast, a general OAM beam actually comprises a group of LG beams (each with the same l index but a different p index) due to the absence of radial definition. The term of "OAM beam" refers to all helically phased beams, and is used to distinguish from LG beams.

Using the orbital angular momentum state of the transmitted energy signals, physical information can be embedded within the radiation transmitted by the signals. The Maxwell-Heaviside equations can be represented as:

$$\nabla \cdot E = \frac{\rho}{\varepsilon_0} \qquad (2)$$

$$\nabla \times E = -\frac{\partial B}{\partial t}$$

$$\nabla \cdot B = 0$$

-continued $$\nabla \times B = \varepsilon_0 \mu_0 \frac{\partial E}{\partial t} + \mu_0 j(t, x)$$

where $\nabla$ is the del operator, E is the electric field intensity and B is the magnetic flux density. Using these equations, one can derive 23 symmetries/conserved quantities from Maxwell's original equations. However, there are only ten well-known conserved quantities and only a few of these are commercially used. Historically if Maxwell's equations where kept in their original quaternion forms, it would have been easier to see the symmetries/conserved quantities, but when they were modified to their present vectorial form by Heaviside, it became more difficult to see such inherent symmetries in Maxwell's equations.

The conserved quantities and the electromagnetic field can be represented according to the conservation of system energy and the conservation of system linear momentum. Time symmetry, i.e. the conservation of system energy can be represented using Poynting's theorem according to the equations:

$$H = \sum_i m_i \gamma_i c^2 + \frac{\varepsilon_0}{2} \int d^3 x (|E|^2 + c^2 |B|^2)$$

Hamiltonian (total energy)

$$\frac{dU^{mech}}{dt} + \frac{dU^{em}}{dt} + \oint_{s'} d^2 x' \hat{n}' \cdot S = 0$$

conservation of energy

The space symmetry, i.e., the conservation of system linear momentum representing the electromagnetic Doppler shift can be represented by the equations:

$$p = \sum_i m_i \gamma_i v_i + \varepsilon_0 \int d^3 x (E \times B)$$

linear momentum $$\frac{dp^{mech}}{dt} + \frac{dp^{em}}{dt} + \oint_{s'} d^2 x' \hat{n}' \cdot T = 0$$

conservation of linear momentum

The conservation of system center of energy is represented by the equation:

$$R = \frac{1}{H} \sum_i (x_i - x_0) m_i \gamma_i c^2 + \frac{\varepsilon_0}{2H} \int d^3 x (x - x_0)(|E|^2 + c^2 |B|^2) \quad (3)$$

Similarly, the conservation of system angular momentum, which gives rise to the azimuthal Doppler shift is represented by the equation:

$$\frac{dJ^{mech}}{dt} + \frac{dJ^{em}}{dt} + \oint_{s'} d^2 x' \hat{n}' \cdot M = 0$$

conservation of angular momentum

For radiation beams in free space, the EM field angular momentum $J^{em}$ can be separated into two parts:

$$J^{em} = \varepsilon_0 \int_{V'} d^3 x' (E \times A) + \varepsilon_0 \int_{V'} d^3 x' E_i [(x' - x_0) \times \nabla] A_i \quad (4)$$

For each singular Fourier mode in real valued representation:

$$J^{em} = -i \frac{\varepsilon_0}{2\omega} \int_{V'} d^3 x' (E^* \times E) - i \frac{\varepsilon_0}{2\omega} \int_{V'} d^3 x' E_i [(x' - x_0) \times \nabla] E_i \quad (5)$$

The first part is the EM spin angular momentum $S^{em}$, its classical manifestation is wave polarization. And the second part is the EM orbital angular momentum $L^{em}$ its classical manifestation is wave helicity. In general, both EM linear momentum $P^{em}$, and EM angular momentum $J^{em} = L^{em} + S^{em}$ are radiated all the way to the far field.

By using Poynting theorem, the optical vorticity of the signals may be determined according to the optical velocity equation:

$$\frac{\partial U}{\partial t} + \nabla \cdot S = 0, \text{ continuity equation}$$

where S is the Poynting vector $$S = \frac{1}{4}(E \times H^* + E^* \times H), \quad (6)$$

and U is the energy density $$U = \frac{1}{4}(\epsilon |E|^2 + \mu_0 |H|^2), \quad (7)$$

with E and H comprising the electric field and the magnetic field, respectively, and $\epsilon$ and $\mu_0$ being the permittivity and the permeability of the medium, respectively. The optical voracity V may then be determined by the curl of the optical velocity according to the equation:

$$V = \nabla \times v_{opt} = \nabla \times \left( \frac{E \times H^* + E^* \times H}{\epsilon |E|^2 + \mu_0 |H|^2} \right) \quad (8)$$

Figure 9A:
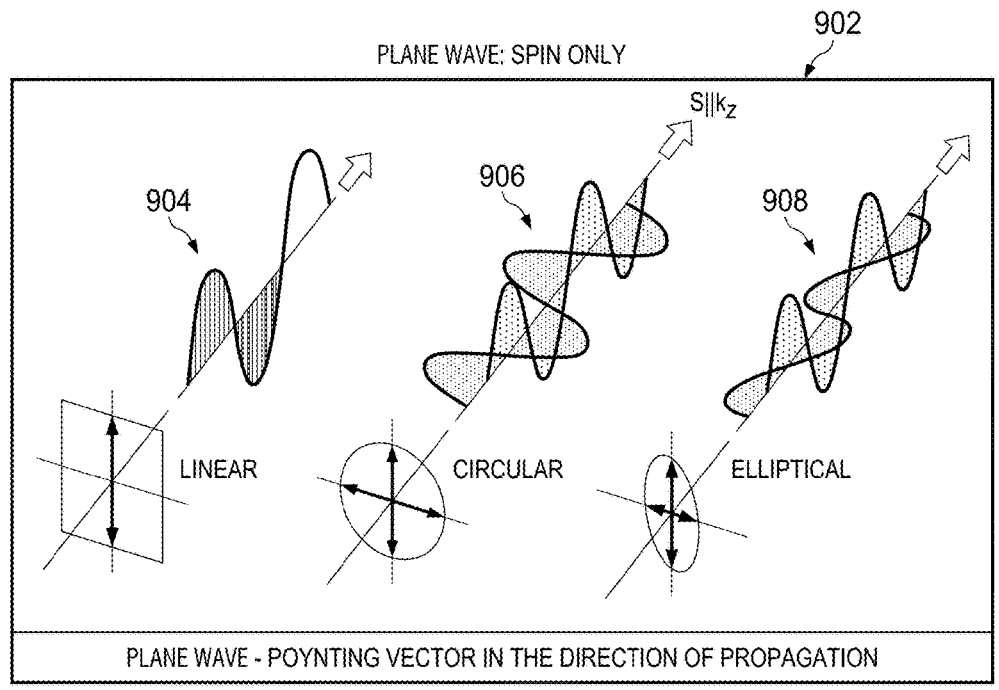
FIG. 9A illustrates a plane wave having only variations in the spin angular momentum.
Figure 9B:
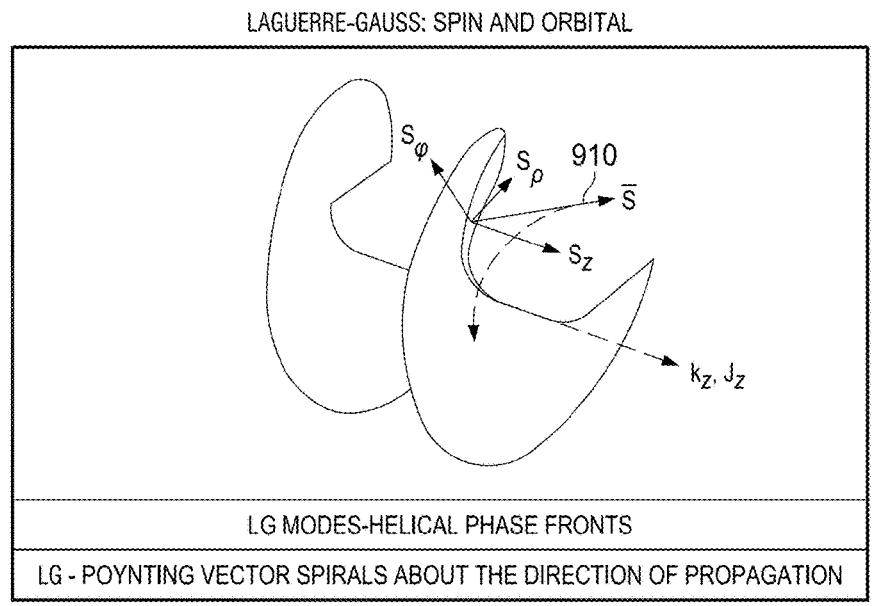
FIG. 9B illustrates a signal having both spin and orbital angular momentum applied thereto.
Figure 10A:
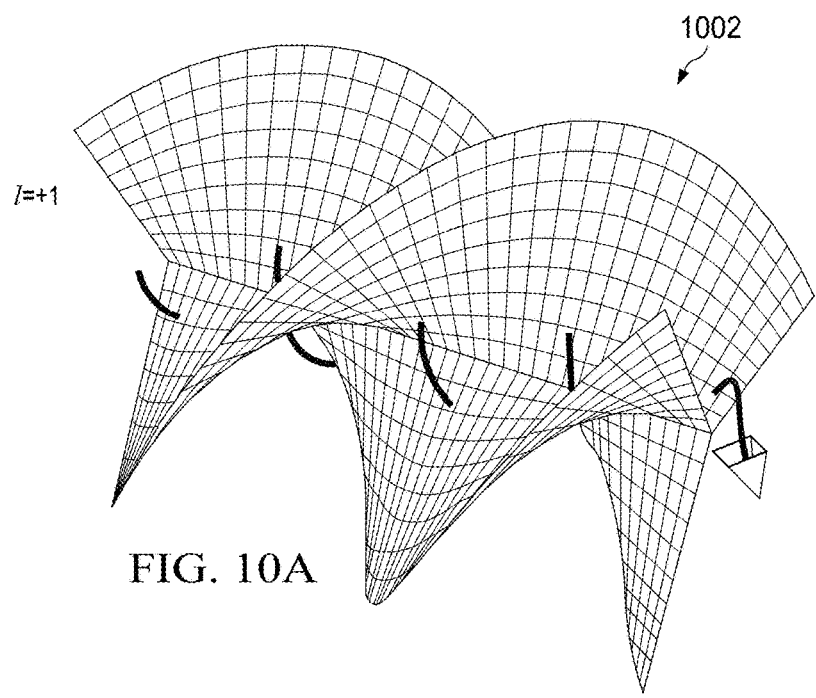
FIGS. 10A-10C illustrate various signals having different orbital angular momentum applied thereto.
Figure 10B:
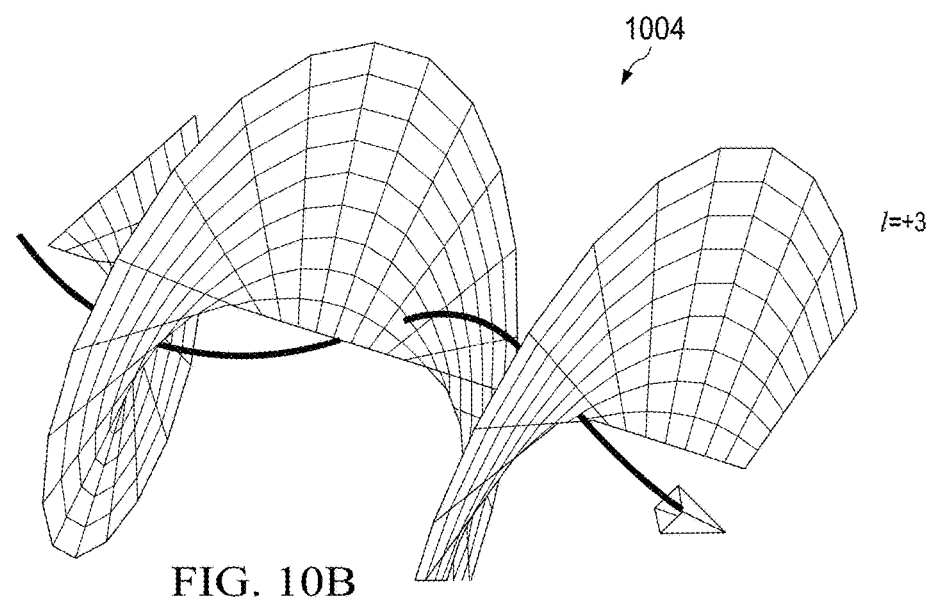
Figure 10C:
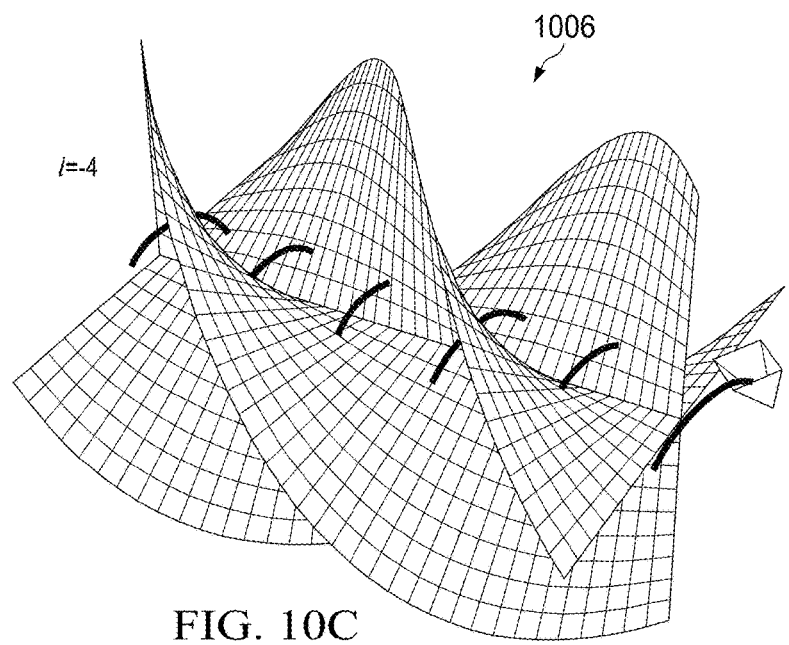
Figure 10D:
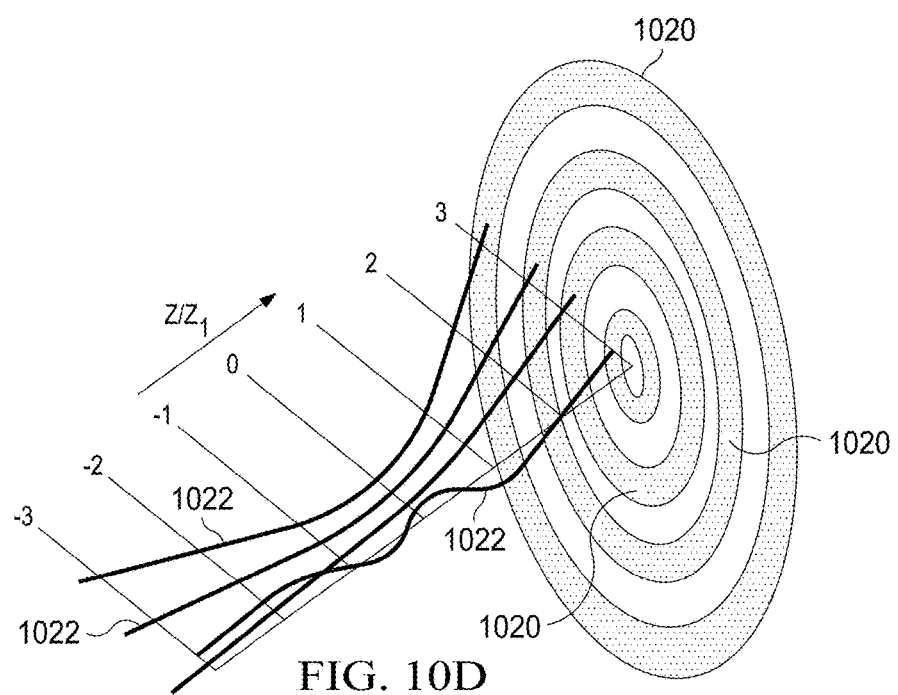
FIG. 10D illustrates a propagation of Poynting vectors for various Eigen modes.
Figure 10E:
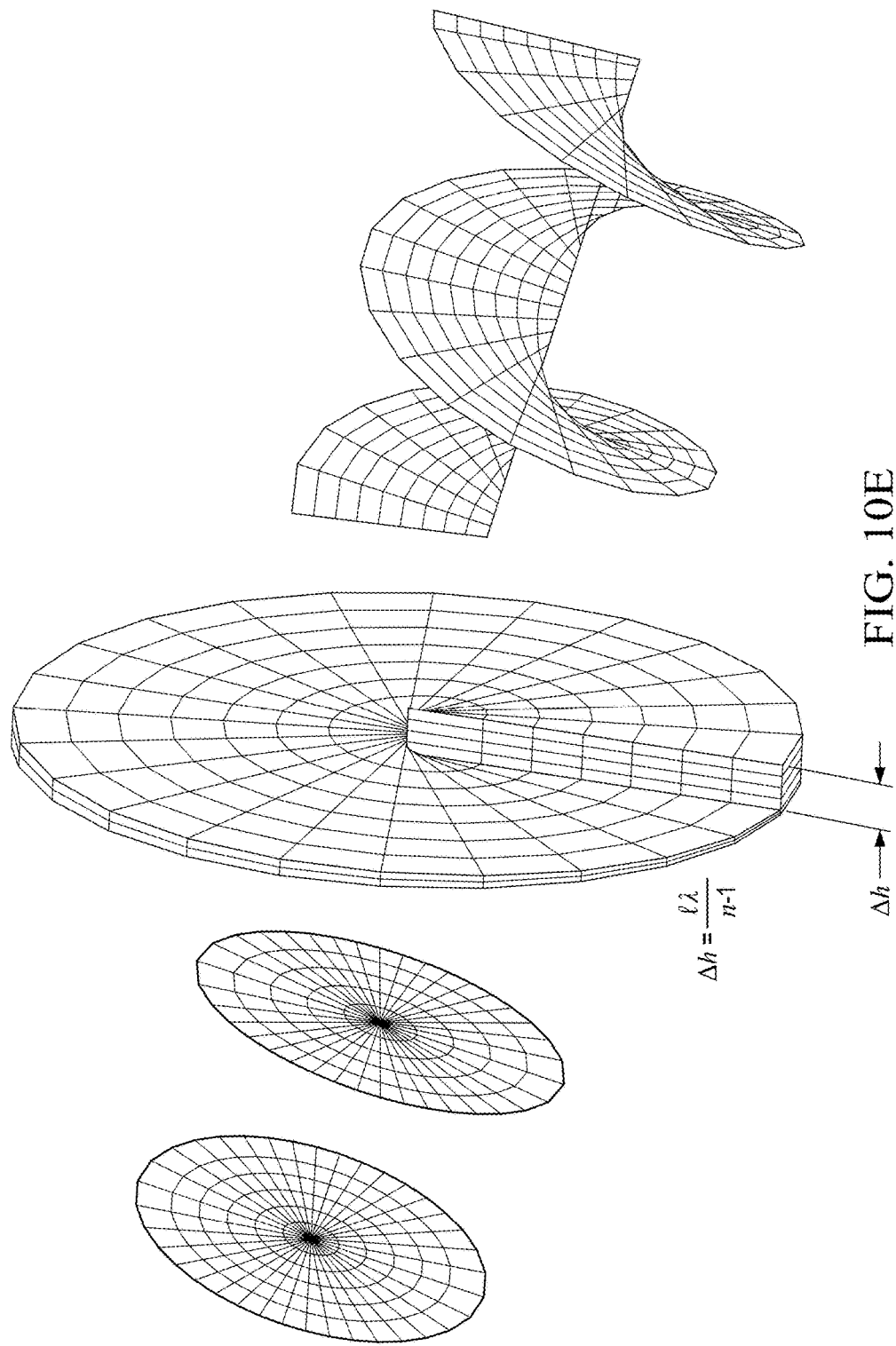
FIG. 10E illustrates a spiral phase plate.

Referring now to FIGS. 9A and 9B, there is illustrated the manner in which a signal and its associated Poynting vector in a plane wave situation. In the plane wave situation illustrated generally at 902, the transmitted signal may take one of three configurations. When the electric field vectors are in the same direction, a linear signal is provided, as illustrated generally at 904. Within a circular polarization 906, the electric field vectors rotate with the same magnitude. Within the elliptical polarization 908, the electric field vectors rotate but have differing magnitudes. The Poynting vector remains in a constant direction for the signal configuration to FIG. 9A and always perpendicular to the electric and magnetic fields. Referring now to FIG. 9B, when a unique orbital angular momentum is applied to a signal as described here and above, the Poynting vector S 910 will spiral about the direction of propagation of the signal. This spiral may be varied in order to enable signals to be transmitted on the same frequency as described herein.

FIGS. 12A-12C illustrate the differences in signals having different helicity (i.e., orbital angular momentums). Each of the spiraling Poynting vectors associated with the signals 902, 904, and 906 provide a different shaped signal. Signal 1202 has an orbital angular momentum of +1, signal 1204 has an orbital angular momentum of +3, and signal 1206 has an orbital angular momentum of −4. Each signal has a distinct angular momentum and associated Poynting vector enabling the signal to be distinguished from other signals within a same frequency. This allows differing type of information to be combined on the same frequency, since these signals are separately detectable and do not interfere with each other (Eigen channels).

FIG. 12D illustrates the propagation of Poynting vectors for various Eigen modes. Each of the rings 1220 represents a different Eigen mode or twist representing a different orbital angular momentum within the same frequency. Each of these rings 1220 represents a different orthogonal channel. Each of the Eigen modes has a Poynting vector 1222 associated therewith.

Topological charge may be multiplexed to the frequency for either linear or circular polarization. In case of linear polarizations, topological charge would be multiplexed on vertical and horizontal polarization. In case of circular polarization, topological charge would multiplex on left hand and right hand circular polarizations. The topological charge is another name for the helicity index "l" or the amount of twist or OAM applied to the signal. The helicity index may be positive or negative. In RF, different topological charges can be created and muxed together and de-muxed to separate the topological charges.

The topological charges ls can be created using Spiral Phase Plates (SPPs) as shown in FIG. 9E using a proper material with specific index of refraction and ability to machine shop or phase mask, holograms created of new materials or a new technique to create an RF version of Spatial Light Modulator (SLM) that does the twist of the RF waves (as opposed to optical beams) by adjusting voltages on the device resulting in twisting of the RF waves with a specific topological charge. Spiral Phase plates can transform a RF plane wave (l=0) to a twisted RF wave of a specific helicity (i.e. l=+1).

These embodiments can create cross talk and multipath interference. However, cross talk and multipath interference can be corrected using RF Multiple-Input-Multiple-Output (MIMO). In one embodiment, most of the channel impairments can be detected using a control or pilot channel and be corrected using algorithmic techniques (closed loop control system). However, other techniques can be used to eliminate these channel impairments.

As described previously with respect to FIG. 3, each of the multiple data streams applied within the processing circuitry has a multiple layer overlay modulation scheme applied thereto.

Application of OAM to Optical Communication

Utilization of OAM for optical communications is based on the fact that coaxially propagating light beams with different OAM states can be efficiently separated. This is certainly true for orthogonal modes such as the LG beam. Interestingly, it is also true for general OAM beams with cylindrical symmetry by relying only on the azimuthal phase. Considering any two OAM beams with an azimuthal index of l1 and l2, respectively:

$$U_1(r,\theta,z) = A_1(r,z)\exp(il_1\theta) \quad (12)$$

where r and z refers to the radial position and propagation distance respectively, one can quickly conclude that these two beams are orthogonal in the sense that:

$$\int_0^{2\pi} U_1 U_2^* d\theta = \begin{cases} 0 & \text{if } \ell_1 \neq \ell_2 \\ A_1 A_2^* & \text{if } \ell_1 = \ell_2 \end{cases} \quad (13)$$

There are two different ways to take advantage of the distinction between OAM beams with different l states in communications. In the first approach, N different OAM states can be encoded as N different data symbols representing "0", "1", . . . , "N−1", respectively. A sequence of OAM states sent by the transmitter therefore represents data information. At the receiver, the data can be decoded by checking the received OAM state. This approach seems to be more favorable to the quantum communications community, since OAM could provide for the encoding of multiple bits (log 2(N)) per photon due to the infinitely countable possibilities of the OAM states, and so could potentially achieve a higher photon efficiency. The encoding/decoding of OAM states could also have some potential applications for on-chip interconnection to increase computing speed or data capacity.

Figure 11:
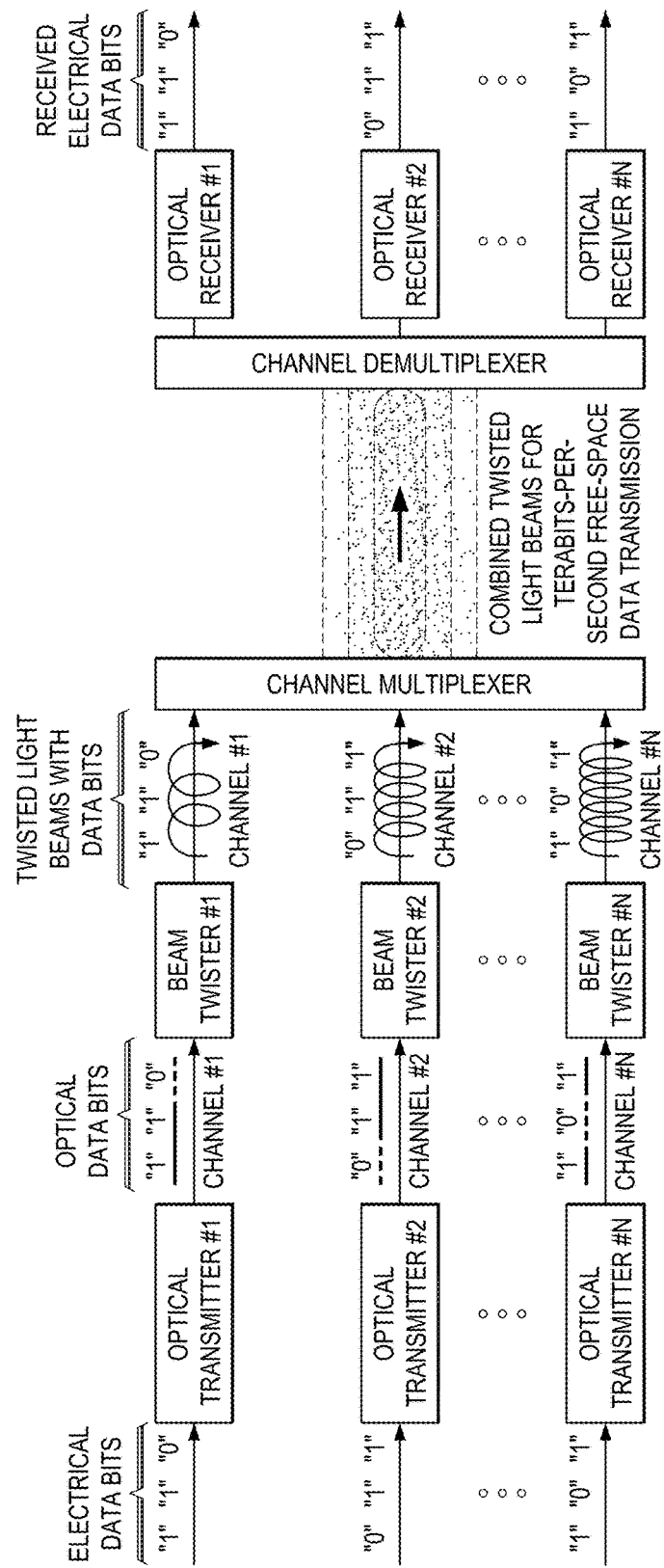
FIG. 11 illustrates a typical OAM multiplexing scheme.

The second approach is to use each OAM beam as a different data carrier in an SDM (Spatial Division Multiplexing) system. For an SDM system, one could use either a multi-core fiber/free space laser beam array so that the data channels in each core/laser beam are spatially separated, or use a group of orthogonal mode sets to carry different data channels in a multi-mode fiber (MMF) or in free space. Greater than 1 petabit/s data transmission in a multi-core fiber and up to 6 linearly polarized (LP) modes each with two polarizations in a single core multi-mode fiber has been reported. Similar to the SDM using orthogonal modes, OAM beams with different states can be spatially multiplexed and demultiplexed, thereby providing independent data carriers in addition to wavelength and polarization. Ideally, the orthogonality of OAM beams can be maintained in transmission, which allows all the data channels to be separated and recovered at the receiver. A typical embodiments of OAM multiplexing is conceptually depicted in FIG. 11. An obvious benefit of OAM multiplexing is the improvement in system spectral efficiency, since the same bandwidth can be reused for additional data channels.

OAM Beam Generation and Detection

Many approaches for creating OAM beams have been proposed and demonstrated. One could obtain a single or multiple OAM beams directly from the output of a laser cavity, or by converting a fundamental Gaussian beam into an OAM beam outside a cavity. The converter could be a spiral phase plate, diffractive phase holograms, metal materials, cylindrical lens pairs, q-plates or fiber structures. There are also different ways to detect an OAM beam, such as using a converter that creates a conjugate helical phase, or using a plasmonic detector.

Mode Conversion Approaches

Figure 12:
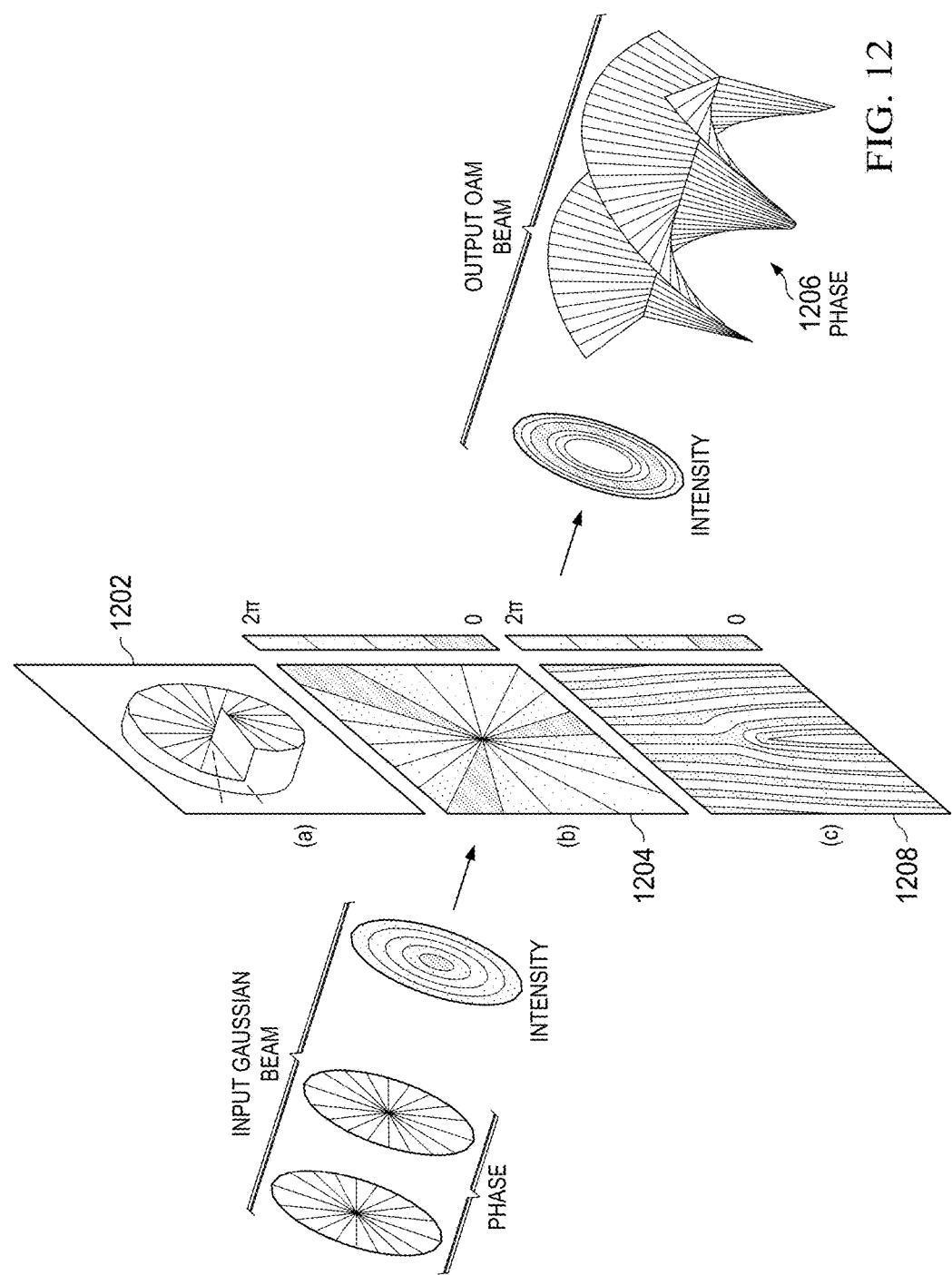
FIG. 12 illustrates various manners for converting a Gaussian beam into an OAM beam.

Referring now to FIG. 12, among all external-cavity methods, perhaps the most straightforward one is to pass a Gaussian beam through a coaxially placed spiral phase plate (SPP) 1202. An SPP 1202 is an optical element with a helical surface, as shown in FIG. 12A. To produce an OAM beam with a state of l, the thickness profile of the plate should be machined as $l\lambda\theta/2\pi(n-1)$, where n is the refractive index of the medium. A limitation of using an SPP 1202 is that each OAM state requires a different specific plate. As an alternative, reconfigurable diffractive optical elements, e.g., a pixelated spatial light modulator (SLM) 1204, or a digital micro-mirror device can be programmed to function as any refractive element of choice at a given wavelength. As mentioned above, a helical phase profile exp(ilθ) converts a linearly polarized Gaussian laser beam into an OAM mode, whose wave front resembles an f-fold corkscrew 1206, as shown at 1204. Importantly, the generated OAM beam can be easily changed by simply updating the hologram loaded on the SLM 1204. To spatially separate the phase-modulated beam from the zeroth-order non-phase-modulated reflection from the SLM, a linear phase ramp is added to helical phase code (i.e., a "fork"-like phase pattern 1208 to produce a spatially distinct first-order diffracted OAM beam, carrying the desired charge. It should also be noted that the aforementioned methods produce OAM beams with only an azimuthal index control. To generate a pure LG_(l,p) mode, one must jointly control both the phase and the intensity of the wavefront. This could be achieved using a phase-only SLM with a more complex phase hologram.

OAM Beams Multiplexing and Demultiplexing

One of the benefits of OAM is that multiple coaxially propagating OAM beams with different l states provide additional data carriers as they can be separated based only on the twisting wavefront. Hence, one of the critical techniques is the efficient multiplexing/demultiplexing of OAM beams of different t states, where each carries an independent data channel and all beams can be transmitted and received using a single aperture pair. Several multiplexing and demultiplexing techniques have been demonstrated, including the use of an inverse helical phase hologram to down-convert the OAM into a Gaussian beam, a mode sorter, free-space interferometers, a photonic integrated circuit, and q-plates. Some of these techniques are briefly described below.

Beam Splitter and Inverse Phase Hologram

Figure 13A:
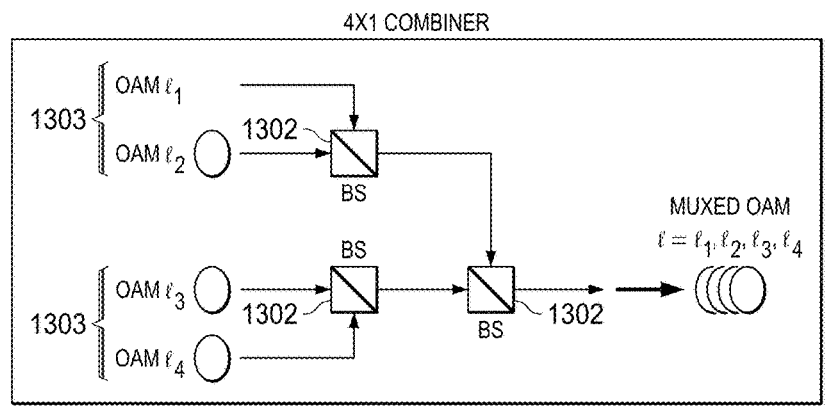
FIG. 13A illustrates spatial multiplexing using cascaded beam splitters.
Figure 13B:
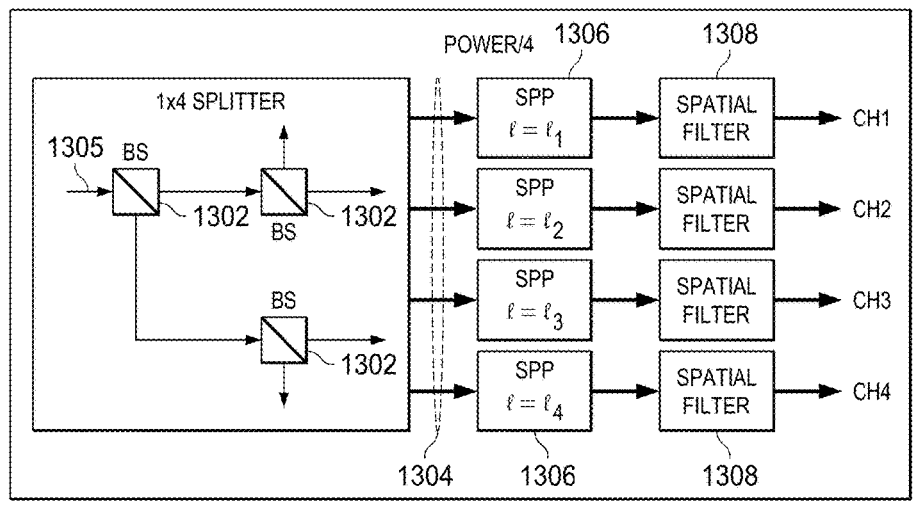
FIG. 13B illustrated demultiplexing using cascaded beam splitters and conjugated spiral phase holograms.

A straightforward way of multiplexing is simply to use cascaded 3-dB beam splitters (BS) 1302. Each BS 1302 can coaxially multiplex two beams 1303 that are properly aligned, and cascaded N BSs can multiplex N+1 independent OAM beams at most, as shown in FIG. 13A. Similarly, at the receiver end, the multiplexed beam 1305 is divided into four copies 1304 by BS 1302. To demultiplex the data channel on one of the beams (e.g., with l=1_i), a phase hologram 1306 with a spiral charge of 〚 −1 〛_i is applied to all the multiplexed beams 1304. As a result, the helical phase on the target beam is removed, and this beam evolves into a fundamental Gaussian beam, as shown in FIG. 13B. The down-converted beam can be isolated from the other beams, which still have helical phase fronts by using a spatial mode filter 1308 (e.g., a single mode fiber only couples the power of the fundamental Gaussian mode due to the mode matching theory). Accordingly, each of the multiplexed beams 1304 can be demultiplexed by changing the spiral phase hologram 1306. Although this method is very power-inefficient since the BSs 1302 and the spatial mode filter 1306 cause a lot of power loss, it was used in the initial lab demonstrations of OAM multiplexing/demultiplexing, due to the simplicity of understanding and the reconfigurability provided by programmable SLMs.

Optical Geometrical Transformation-Based Mode Sorter

Figure 14:
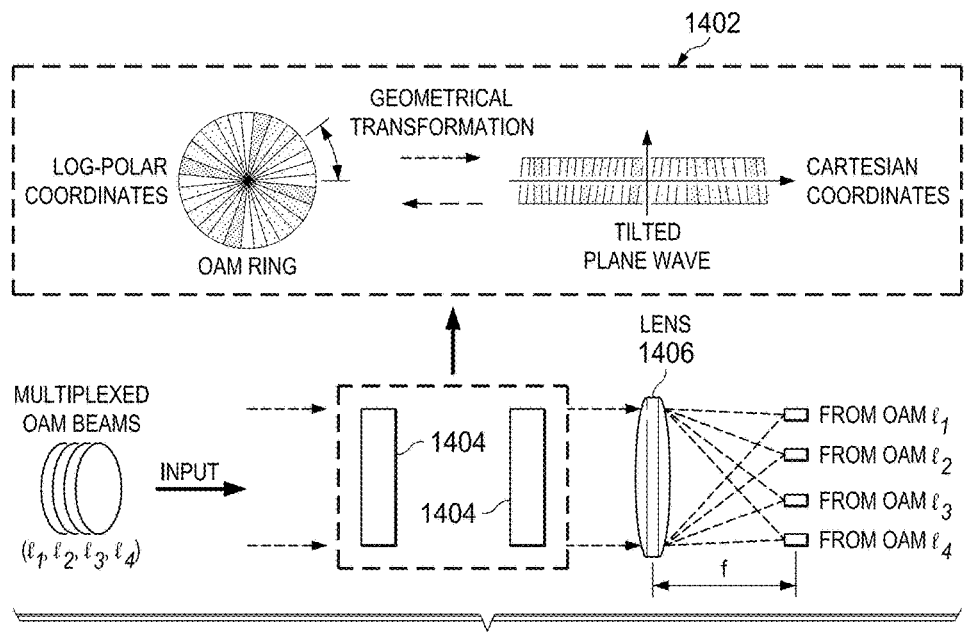
FIG. 14 illustrates a log polar geometrical transformation based on OAM multiplexing and demultiplexing.

Referring now to FIG. 14, another method of multiplexing and demultiplexing, which could be more power-efficient than the previous one (using beam splitters), is the use of an OAM mode sorter. This mode sorter usually comprises three optical elements, including a transformer 1402, a corrector 1404, and a lens 1406, as shown in FIG. 14. The transformer 1402 performs a geometrical transformation of the input beam from log-polar coordinates to Cartesian coordinates, such that the position (x,y) in the input plane is mapped to a new position (u,v) in the output plane, where $$u = -a \ln\left(\frac{\sqrt{x^2+y^2}}{b}\right),$$

and v=a arctan(y/x). Here, a and b are scaling constants. The corrector 1404 compensates for phase errors and ensures that the transformed beam is collimated. Considering an input OAM beam with a ring-shaped beam profile, it can be unfolded and mapped into a rectangular-shaped plane wave with a tilted phase front. Similarly, multiple OAM beams having different l states will be transformed into a series of plane waves each with a different phase tilt. A lens 1406 focuses these tilted plane waves into spatially separated spots in the focal plane such that all the OAM beams are simultaneously demultiplexed. As the transformation is reciprocal, if the mode sorter is used in reverse it can become a multiplexer for OAM. A Gaussian beam array placed in the focal plane of the lens 1406 is converted into superimposed plane waves with different tilts. These beams then pass through the corrector and the transformer sequentially to produce properly multiplexed OAM beams.

Free Space Communications

The first proof-of-concept experiment using OAM for free space communications transmitted eight different OAM states each representing a data symbol one at a time. The azimuthal index of the transmitted OAM beam is measured at the receiver using a phase hologram modulated with a binary grating. To effectively use this approach, fast switching is required between different OAM states to achieve a high data rate. Alternatively, classic communications using OAM states as data carriers can be multiplexed at the transmitter, co-propagated through a free space link, and demultiplexed at a receiver. The total data rate of a free space communication link has reached 100 Tbit/s or even beyond by using OAM multiplexing. The propagation of OAM beams through a real environment (e.g., across a city) is also under investigation.

Basic Link Demonstrations

Figure 15A:
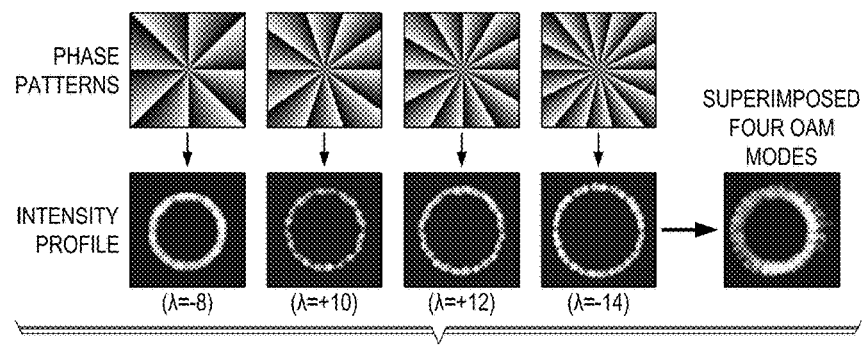
FIG. 15A illustrates an intensity profile of generated OAM beams and their multiplexing.
Figure 15B:
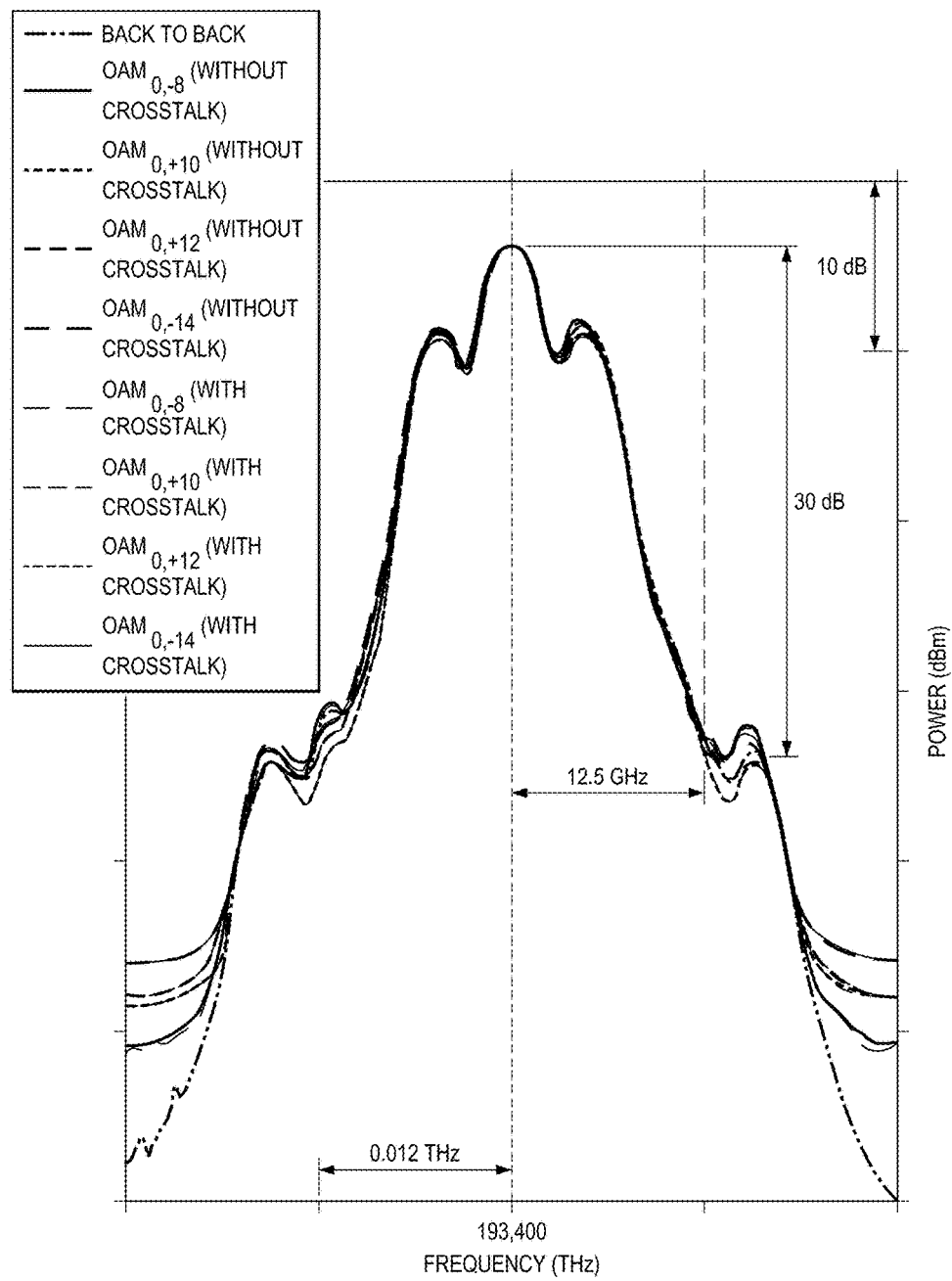
FIG. 15B illustrates the optical spectrum of each channel after each multiplexing for the OAM beams of FIG. 10A.
Figure 15C:
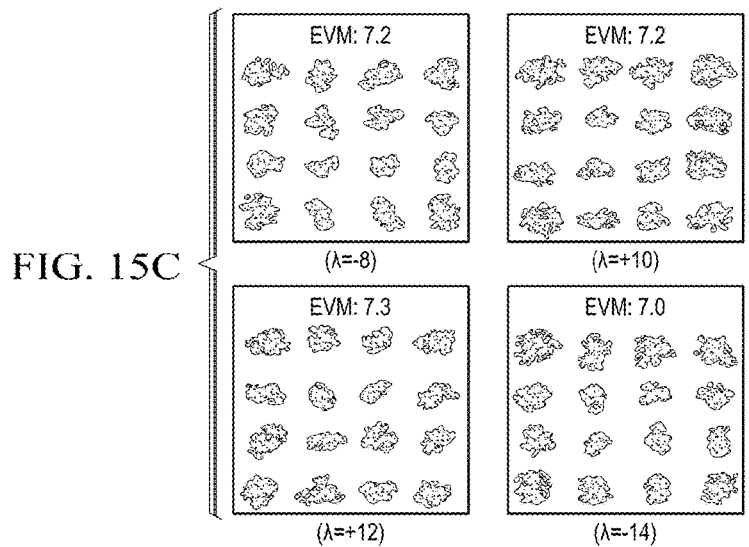
FIG. 15C illustrates the recovered constellations of 16-QAM signals carried on each OAM beam.

Referring now to FIGS. 15A-15C, initial demonstrates of using OAM multiplexing for optical communications include free space links using a Gaussian beam and an OAM beam encoded with OOK data. Four monochromatic Gaussian beams each carrying an independent 50.8 Gbit/s (4×12.7 Gbit/s) 16-QAM signal were prepared from an IQ modulator and free-space collimators. The beams were converted to OAM beams with l=−8, +10, +12 and −14, respectively, using 4 SLMs each loaded with a helical phase hologram, as shown in FIG. 15A. After being coaxially multiplexed using cascaded 3 dB-beam splitters, the beams were propagated through ~1 m distance in free-space under lab conditions. The OAM beams were detected one at a time, using an inverse helical phase hologram and a fiber collimator together with a SMF. The 16-QAM data on each channel was successfully recovered, and a spectral efficiency of 12.8 bit/s/Hz in this data link was achieved, as shown in FIGS. 15B and 15C.

A following experiment doubled the spectral efficiency by adding the polarization multiplexing into the OAM-multiplexed free-space data link. Four different OAM beams (l=+4, +8, −8, +16) on each of two orthogonal polarizations (eight channels in total) were used to achieve a Terabit/s transmission link. The eight OAM beams were multiplexed and demultiplexed using the same approach as mentioned above. The measured crosstalk among channels carried by the eight OAM beams is shown in Table 1, with the largest crosstalk being ~−18.5 dB. Each of the beams was encoded with a 42.8 Gbaud 16-QAM signal, allowing a total capacity of ~1.4 (42.8×4×4×2) Tbit/s.

TABLE 1

| Measured Crosstalk | | OAM$_{+4}$ | | OAM$_{+8}$ | | OAM$_{-8}$ | | OAM$_{+16}$ | |
|---|---|---|---|---|---|---|---|---|---|
| | | X-Pol. | Y-Pol. | X-Pol. | Y-Pol. | X-Pol. | Y-Pol. | X-Pol | Y-Pol. |
| OAM$_{+4}$(dB) | X-Pol. | | −23.2 | −26.7 | −30.8 | −30.5 | −27.7 | −24.6 | −30.1 |
| | Y-Pol. | −25.7 | | | | | | | |
| OAM$_{+8}$(dB) | X-Pol. | −26.6 | −23.5 | | −21.6 | −18.8 | −25.4 | −23.8 | −28.8 |
| | Y-Pol. | | | −25.0 | | | | | |
| OAM$_{-8}$(dB) | X-Pol. | −27.5 | −33.9 | −27.6 | −30.8 | | −20.5 | −26.5 | −21.8 |
| | Y-Pol. | | | | | −26.8 | | | |
| OAM$_{+16}$(dB) | X-Pol. | −24.5 | −31.2 | −23.7 | −23.3 | −25.8 | −26.1 | | −30.2 |
| | Y-Pol. | | | | | | | −24.0 | |
| Total from other OAMs *(dB) | | −21.8 | −21.0 | −21.2 | −21.4 | −18.6 | −21.2 | −22.2 | −20.7 |

Figure 16A:
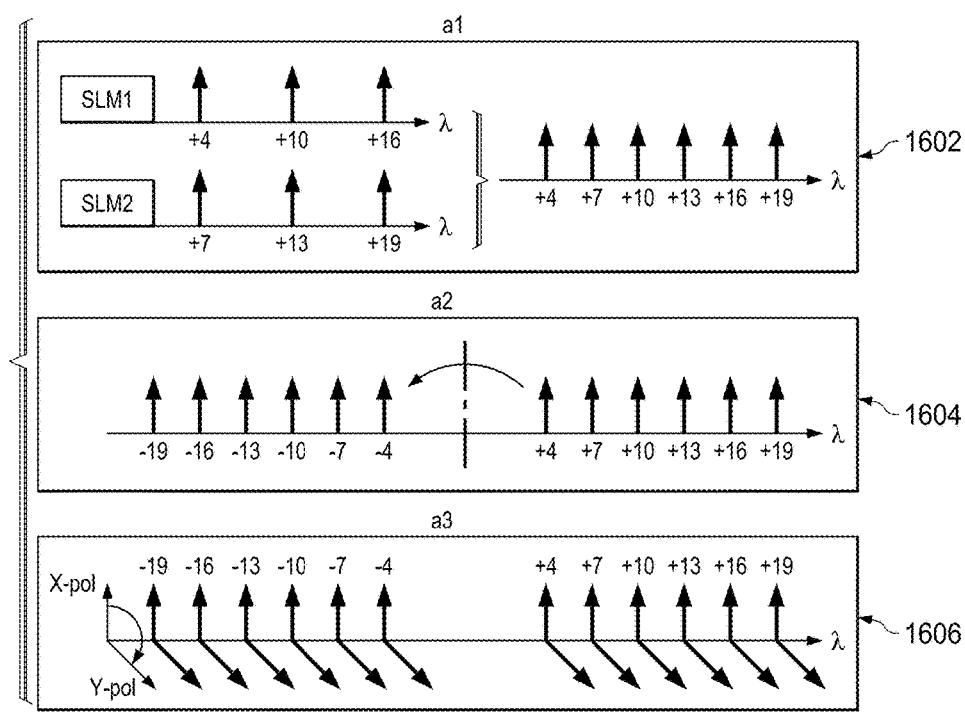
FIG. 16A illustrates the steps to produce 24 multiplex OAM beams.
Figure 16B:
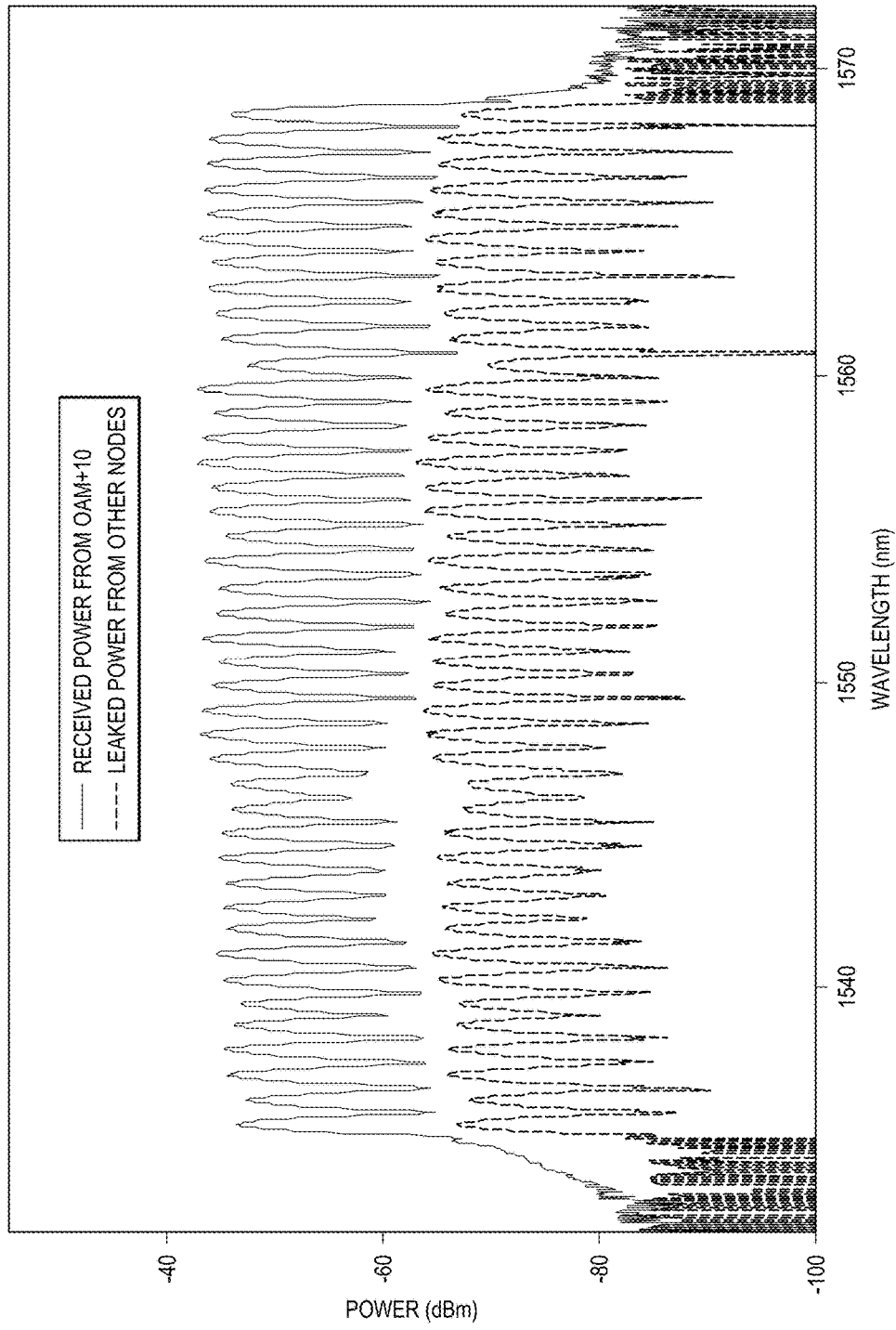
FIG. 16B illustrates the optical spectrum of a WDM signal carrier on an OAM beam.

The capacity of the free-space data link was further increased to 100 Tbit/s by combining OAM multiplexing with PDM (phase division multiplexing) and WDM (wave division multiplexing). In this experiment, 24 OAM beams (l=±4, ±7, ±10, ±13, ±16, and ±19, each with two polarizations) were prepared using 2 SLMs, the procedures for which are shown in FIG. 16 at 1602-1606. Specifically, one SLM generated a superposition of OAM beams with l=+4, +10, and +16, while the other SLM generated another set of three OAM beams with l=+7, +13, and +19 (FIG. 16A). These two outputs were multiplexed together using a beam splitter, thereby multiplexing six OAM beams: l=+4, +7, +10, +13, +16, and +19 (FIG. 16A). Secondly, the six multiplexed OAM beams were split into two copies. One copy was reflected five times by three mirrors and two beam splitters, to create another six OAM beams with inverse charges (FIG. 16B). There was a differential delay between the two light paths to de-correlate the data. These two copies were then combined again to achieve 12 multiplexed OAM beams with l=±4, ±7, ±10, ±13, ±16, and ±19 (FIG. 16B). These 12 OAM beams were split again via a beam splitter. One of these was polarization-rotated by 90 degrees, delayed by ~33 symbols, and then recombined with the other copy using a polarization beam splitter (PBS), finally multiplexing 24 OAM beams (with l=±4, ±7, ±10, ±13, ±16, and ±19 on two polarizations). Each of the beam carried a WDM signal comprising 100 GHz-spaced 42 wavelengths (1,536.34-1,568.5 nm), each of which was modulated with 100 Gbit/s QPSK data. The observed optical spectrum of the WDM signal carried on one of the demultiplexed OAM beams (l=+10).

Atmospheric Turbulence Effects on OAM Beams

One of the critical challenges for a practical free-space optical communication system using OAM multiplexing is atmospheric turbulence. It is known that inhomogeneities in the temperature and pressure of the atmosphere lead to random variations in the refractive index along the transmission path, and can easily distort the phase front of a light beam. This could be particularly important for OAM communications, since the separation of multiplexed OAM beams relies on the helical phase-front. As predicted by simulations in the literature, these refractive index inhomogeneities may cause inter-modal crosstalk among data channels with different OAM states.

Figure 17A:
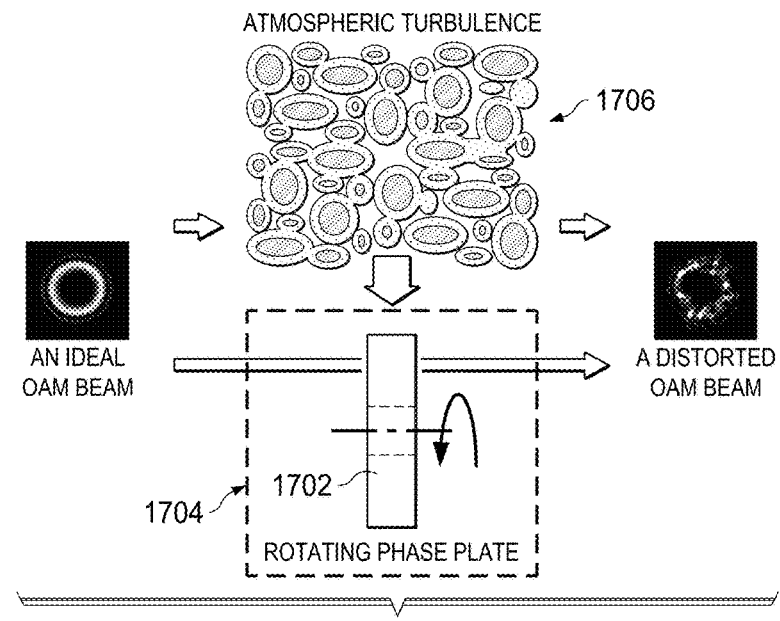
FIG. 17A illustrates a turbulence emulator.
Figure 17B:
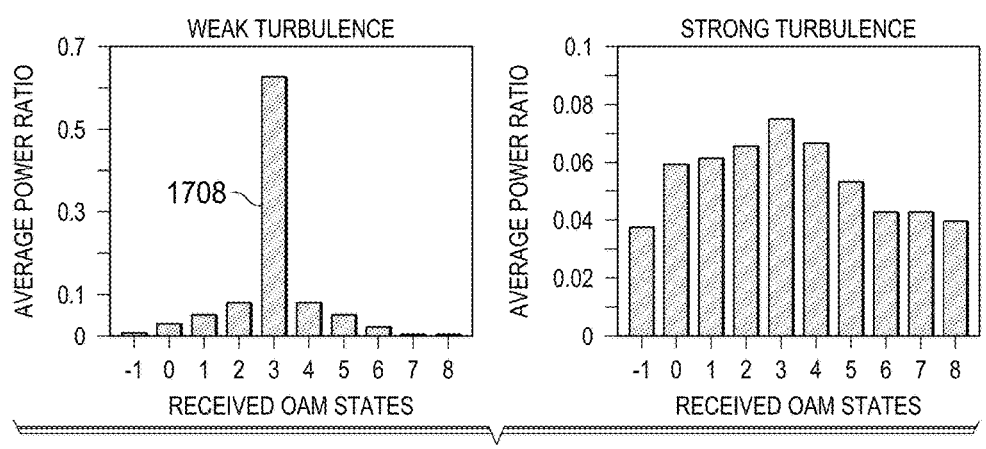
FIG. 17B illustrates the measured power distribution of an OAM beam after passing through turbulence with a different strength.

The effect of atmospheric turbulence is also experimentally evaluated. For the convenience of estimating the turbulence strength, one approach is to emulate the turbulence in the lab using an SLM or a rotating phase plate. FIG. 17A illustrates an emulator built using a thin phase screen plate 1702 that is mounted on a rotation stage 1704 and placed in the middle of the optical path. The pseudo-random phase distribution machined on the plate 1702 obeys Kolmogorov spectrum statistics, which are usually characterized by a specific effective Fried coherence length r0. The strength of the simulated turbulence 1706 can be varied either by changing to a plate 1702 with a different r0, or by adjusting the size of the beam that is incident on the plate. The resultant turbulence effect is mainly evaluated by measuring the power of the distorted beam distributed to each OAM mode using an OAM mode sorter. It was found that, as the turbulence strength increases, the power of the transmitted OAM mode would leak to neighboring modes and tend to be equally distributed among modes for stronger turbulence. As an example, FIG. 17B shows the measured average power (normalized) l=3 beam under different emulated turbulence conditions. It can be seen that the majority of the power is still in the transmitted OAM mode 1708 under weak turbulence, but it spreads to neighboring modes as the turbulence strength increases.

Turbulence Effects Mitigation Techniques

Figure 18A:
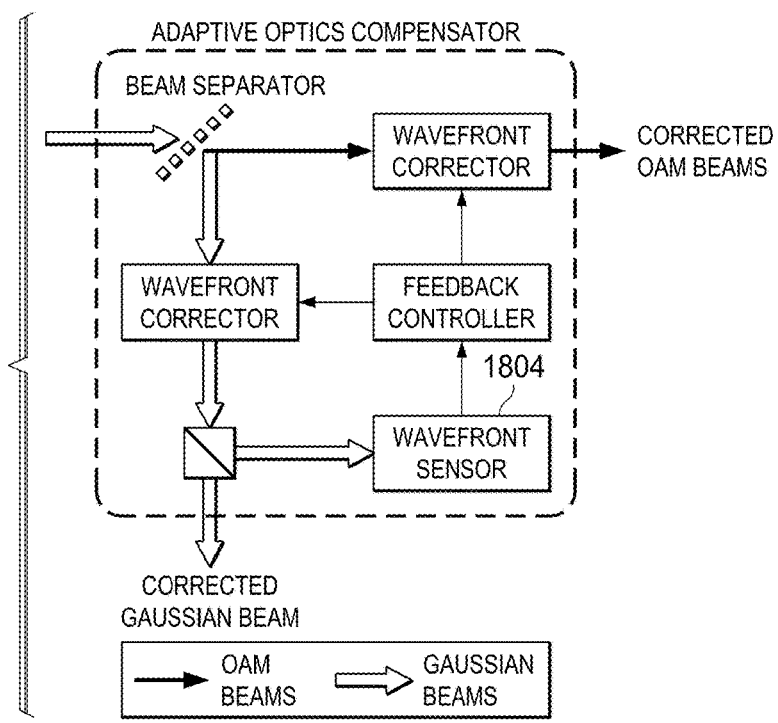
FIG. 18A illustrates how turbulence effects mitigation using adaptive optics.
Figure 18B:
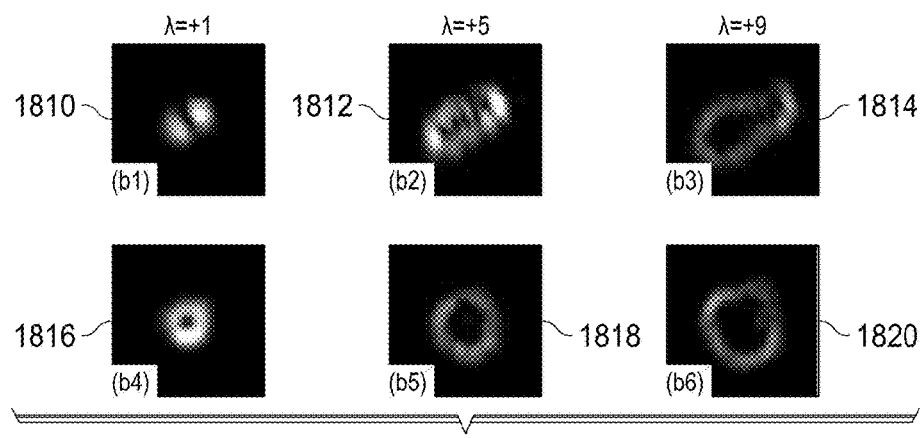
FIG. 18B illustrates experimental results of distortion mitigation using adaptive optics.

One approach to mitigate the effects of atmospheric turbulence on OAM beams is to use an adaptive optical (AO) system. The general idea of an AO system is to measure the phase front of the distorted beam first, based on which an error correction pattern can be produced and can be applied onto the beam transmitter to undo the distortion. As for OAM beams with helical phase fronts, it is challenging to directly measure the phase front using typical wavefront sensors due to the phase singularity. A modified AO system can overcome this problem by sending a Gaussian beam as a probe beam to sense the distortion, as shown in FIG. 18A. Due to the fact that turbulence is almost independent of the light polarization, the probe beam is orthogonally polarized as compared to all other beams for the sake of convenient separation at beam separator 1802. The correction phase pattern can be derived based on the probe beam distortion that is directly measured by a wavefront sensor 1704. It is noted that this phase correction pattern can be used to simultaneously compensate multiple coaxially propagating OAM beams. FIG. 18 at 1810-1820 illustrate the intensity profiles of OAM beams with l=1, 5 and 9, respectively, for a random turbulence realization with and without mitigation. From the far-field images, one can see that the distorted OAM beams (upper), up to l=9, were partially corrected, and the measured power distribution also indicates that the channel crosstalk can be reduced.

Another approach for combating turbulence effects is to partially move the complexity of optical setup into the electrical domain, and use digital signal processing (DSP) to mitigate the channel crosstalk. A typical DSP method is the multiple-input-multiple-output (MIMO) equalization, which is able to blindly estimate the channel crosstalk and cancel the interference. The implementation of a 4×4 adaptive MIMO equalizer in a four-channel OAM multiplexed free space optical link using heterodyne detection may be used. Four OAM beams (l=+2, +4, +6 and +8), each carrying 20 Gbit/s QPSK data, were collinearly multiplexed and propagated through a weak turbulence emulated by the rotating phase plate under laboratory condition to introduce distortions. After demultiplexing, four channels were coherently detected and recorded simultaneously. The standard constant modulus algorithm is employed in addition to the standard procedures of coherent detection to equalize the channel interference. Results indicate that MIMO equalization could be helpful to mitigate the crosstalk caused by either turbulence or imperfect mode generation/detection, and improve both error vector magnitude (EVM) and the bit-error-rate (BER) of the signal in an OAM-multiplexed communication link. MIMO DSP may not be universally useful as outage could happen in some scenarios involving free space data links. For example, the majority power of the transmitted OAM beams may be transferred to other OAM states under a strong turbulence without being detected, in which case MIMO would not help to improve the system performance.

OAM Free Space Link Design Considerations

Figure 19:
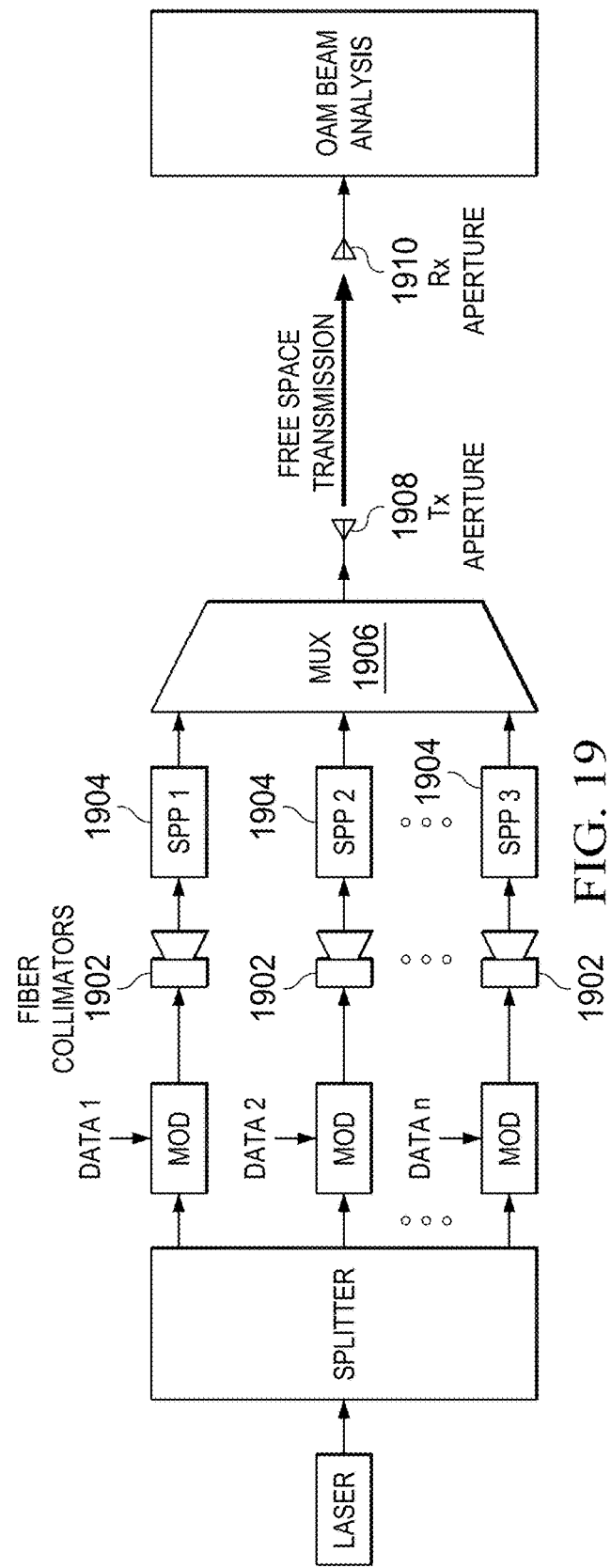
FIG. 19 illustrates a free-space optical data link using OAM.

To date, most of the experimental demonstrations of optical communication links using OAM beams took place in the lab conditions. There is a possibility that OAM beams may also be used in a free space optical communication link with longer distances. To design such a data link using OAM multiplexing, several important issues such as beam divergence, aperture size and misalignment of two transmitter and receiver, need to be resolved. To study how those parameters affect the performance of an OAM multiplexed system, a simulation model was described by Xie et al, the schematic setup of which is shown in FIG. 19. Each of the different collimated Gaussian beams 1902 at the same wavelength is followed by a spiral phase plate 1904 with a unique order to convert the Gaussian beam into a data-carrying OAM beam. Different orders of OAM beams are then multiplexed at multiplexor 1906 to form a concentric-ring-shape and coaxially propagate from transmitter 1908 through free space to the receiver aperture located at a certain propagation distance. Propagation of multiplexed OAM beams is numerically propagated using the Kirchhoff-Fresnel diffraction integral. To investigate the signal power and crosstalk effect on neighboring OAM channels, power distribution among different OAM modes is analyzed through a modal decomposition approach, which corresponds to the case where the received OAM beams are demultiplexed without power loss and the power of a desired OAM channel is completely collected by its receiver 1910.

Beam Divergence

Figure 20A:
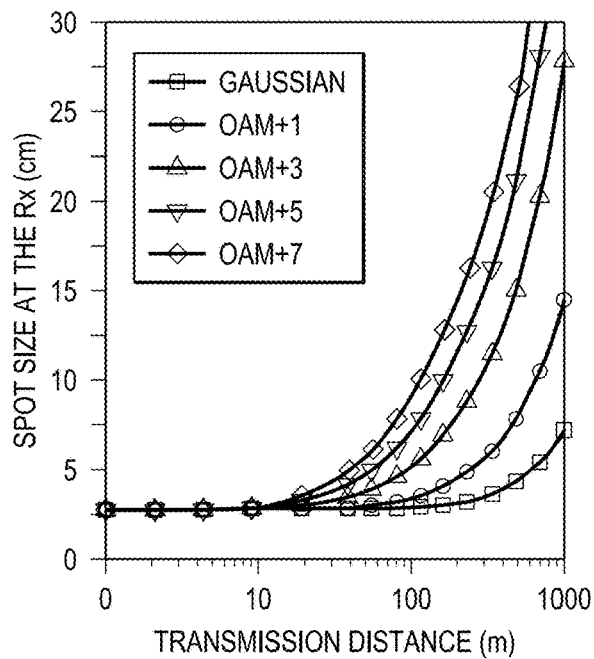
FIG. 20A illustrates simulated spot sized of different orders of OAM beams as a function of transmission distance for a 3 cm transmitted beam.
Figure 20B:
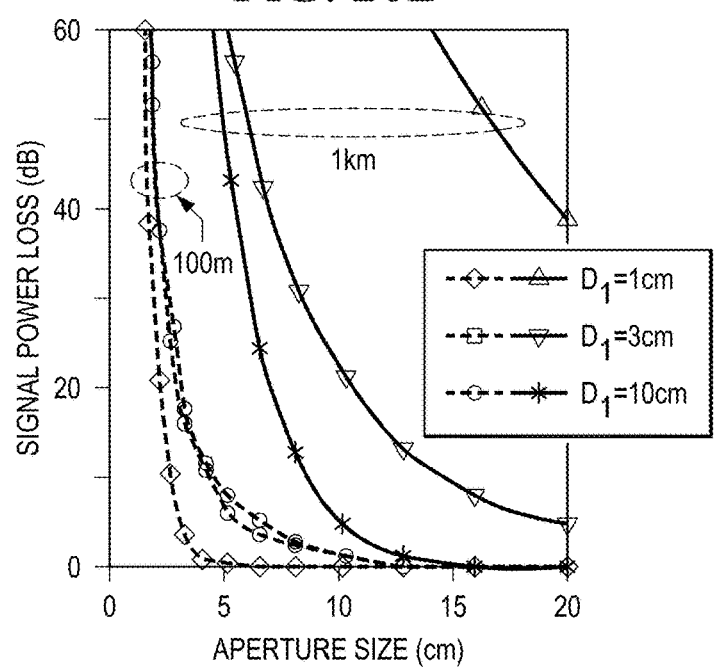
FIG. 20B illustrates simulated power loss as a function of aperture size.
Figure 35:
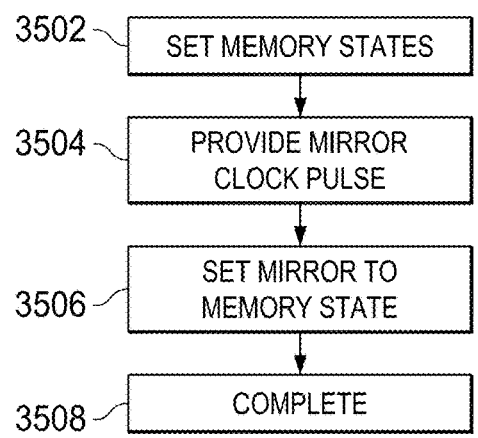
FIG. 35 illustrates a flow chart of the process for changing the position of a micro-mirror.
Figure 31A:
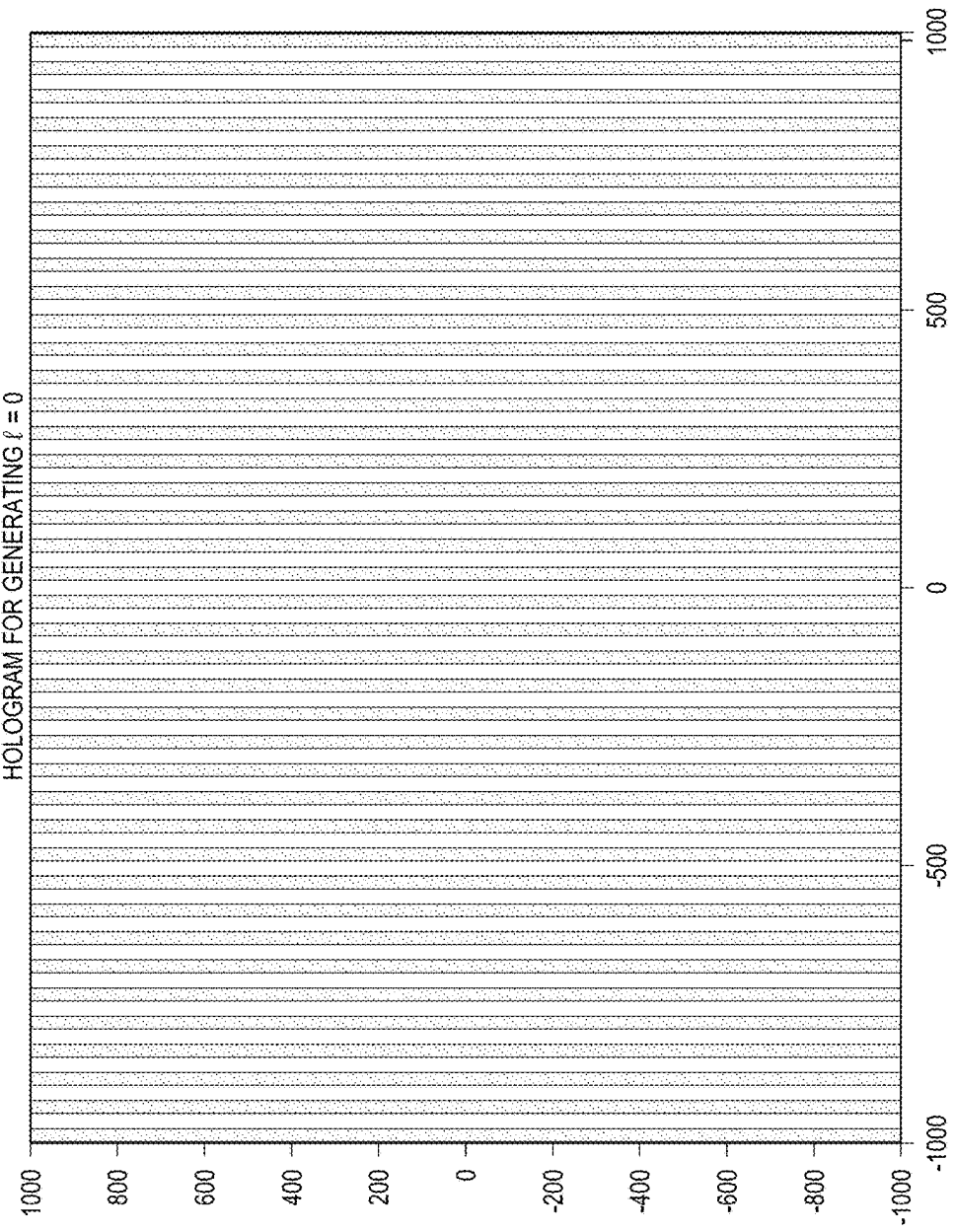
Figure 31F:
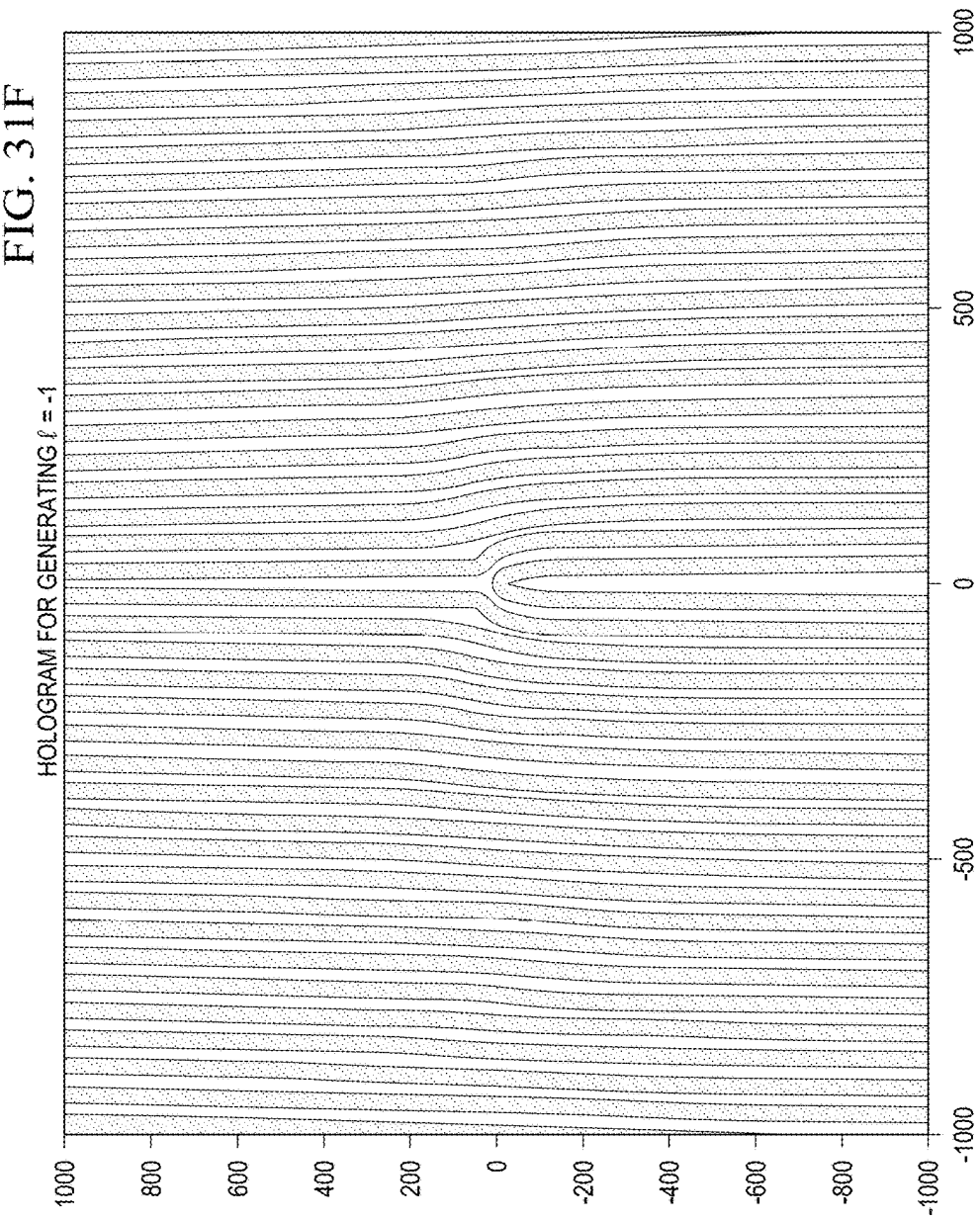
Figure 31G:
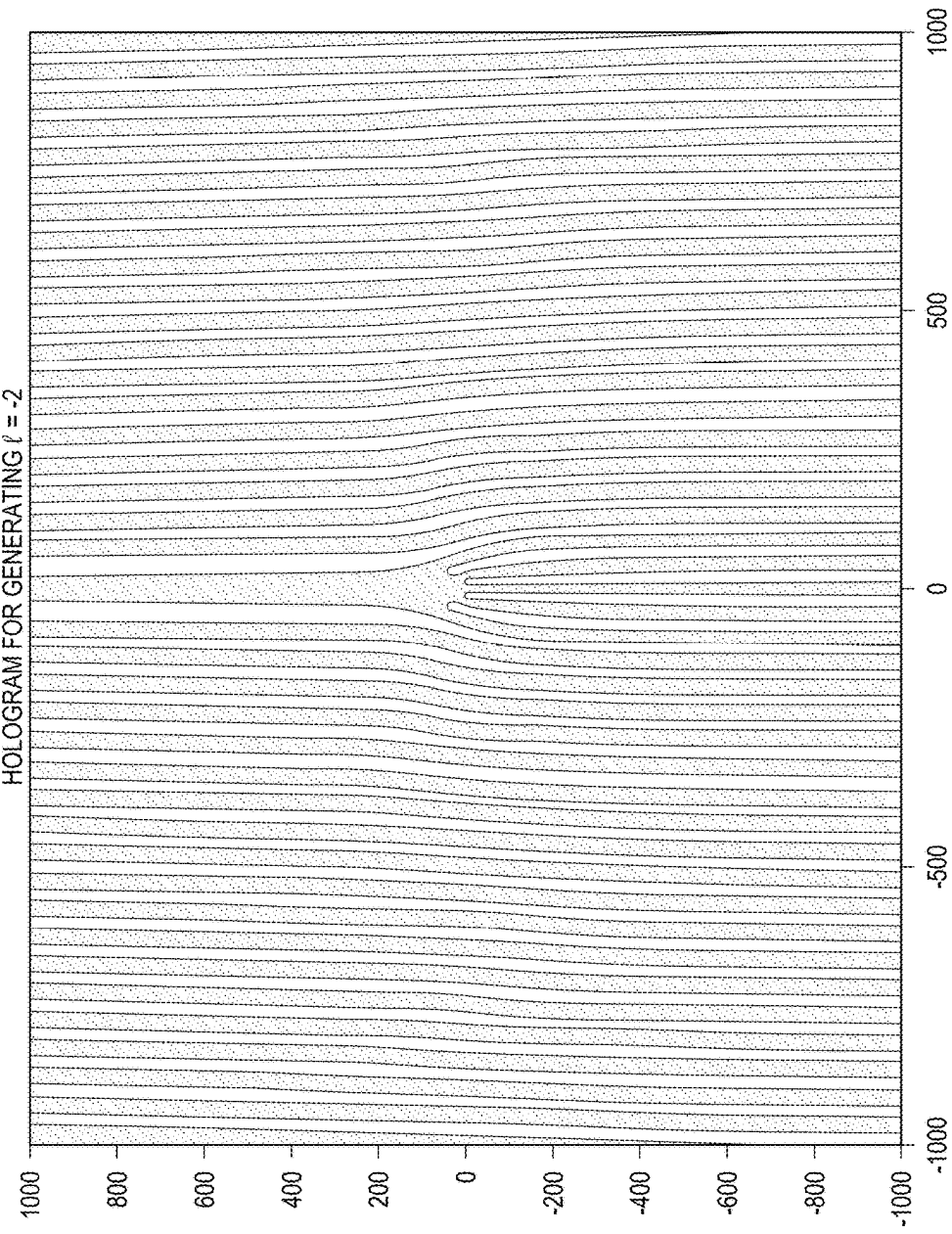

For a communication link, it is generally preferable to collect as much signal power as possible at the receiver to ensure a reasonable signal-to-noise ratio (SNR). Based on the diffraction theory, it is known that a collimated OAM beam diverges while propagating in free space. Given the same spot size of three cm at the transmitter, an OAM beam with a higher azimuthal index diverges even faster, as shown in FIG. 20A. On the other hand, the receiving optical element usually has a limited aperture size and may not be able to collect all of the beam power. The calculated link power loss as a function of receiver aperture size is shown in FIG. 35B, with different transmission distances and various transmitted beam sizes. Unsurprisingly, the power loss of a 1-km link is higher than that of a 100-m link under the same transmitted beam size due to larger beam divergence. It is interesting to note that a system with a transmitted beam size of 3 cm suffers less power loss than that of 1 cm and 10 cm over a 100-m link. The 1-cm transmitted beam diverges faster than the 3 cm beam due to its larger diffraction. However, when the transmitted beam size is 10 cm, the geometrical characteristics of the beam dominate over the diffraction, thus leading larger spot size at the receiver than the 3 cm transmitted beam. A trade-off between the diffraction, geometrical characteristics and the number of OAMs of the beam therefore needs to be carefully considered in order to achieve a proper-size received beam when designing a link.

Misalignment Tolerance

Figure 21A:
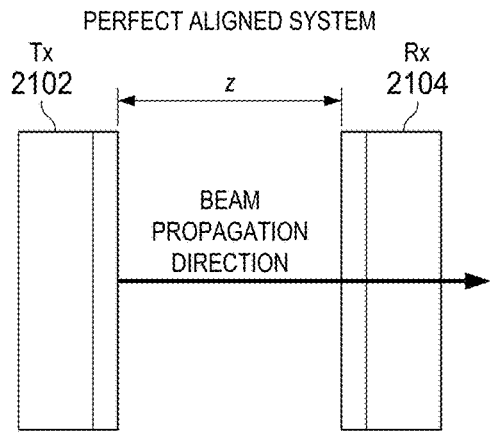
FIG. 21A illustrates a perfectly aligned system between a transmitter and receiver.
Figure 21B:
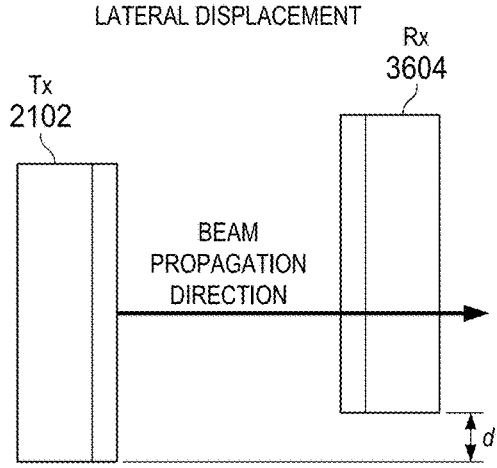
FIG. 21B illustrates a system with lateral displacement of alignment between a transmitter and receiver.
Figure 21C:
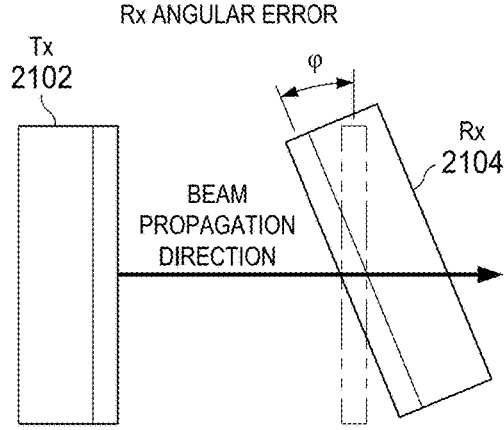
FIG. 21C illustrates a system with receiver angular error for alignment between a transmitter and receiver.

Referring now to FIGS. 21A-21C, besides the power loss due to limited-size aperture and beam divergence, another issue that needs further discussion is the potential misalignment between the transmitter and the receiver. In an ideal OAM multiplexed communication link, transmitter and receiver would be perfectly aligned, (i.e., the center of the receiver would overlap with the center of the transmitted beam 2102, and the receiver plane 2104 would be perpendicular to the line connecting their centers, as shown in FIG. 21A). However, due to difficulties in aligning because of substrate distances, and jitter and vibration of the transmitter/receiver platform, the transmitter and receiver may have relative lateral shift (i.e., lateral displacement) (FIG. 21B) or angular shift (i.e., receiver angular error) (FIG. 21C). Both types of misalignment may lead to degradation of system performance.

Figure 22A:
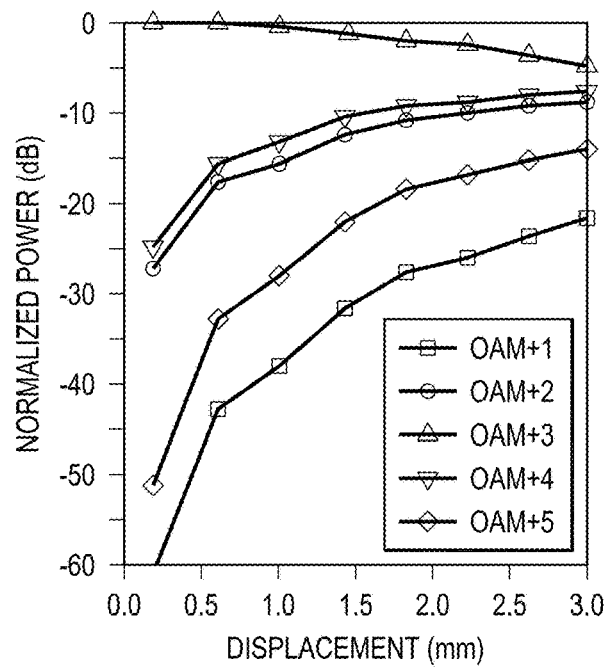
FIG. 22A illustrates simulated power distribution among different OAM modes with a function of lateral displacement.
Figure 22B:
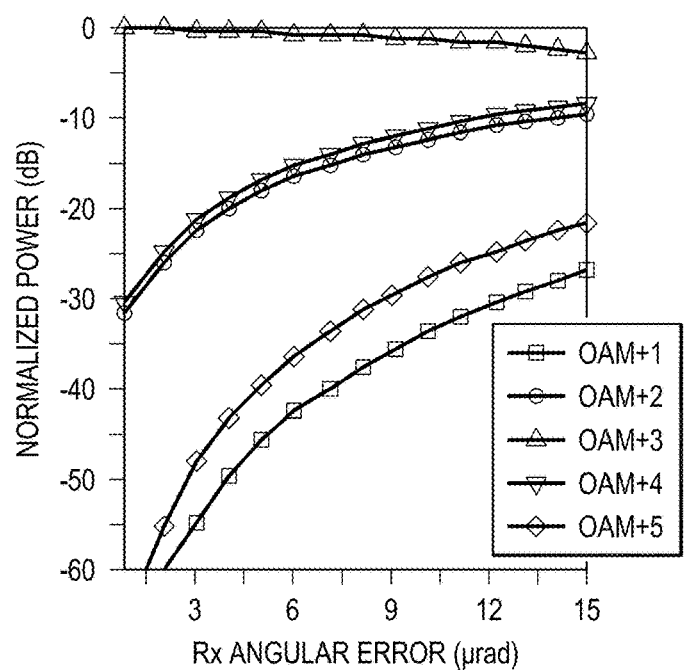
FIG. 22B illustrates simulated power distribution among different OAM modes as a function of receiver angular error.

Focusing on a link distance of 100 m, FIGS. 22A and 22B show the power distribution among different OAM modes due to lateral displacement and receiver angular error when only l=+3 is transmitted with a transmitted beam size of 3 cm. In order to investigate the effect of misalignment, the receiver aperture size is chosen to be 10 cm, which could cover the whole OAM beam at the receiver. As the lateral displacement or receiver angular error increases, power leakage to other modes (i.e., channel crosstalk) increases while the power on l=+3 state decreases. This is because larger lateral displacement or receiver angular causes larger phase profile mismatch between the received OAM beams and receiver. The power leakage to l=+1 and l=+5 is greater than that of l=+2 and l=+3 due to their larger mode spacing with respect to l=+3. Therefore, a system with larger mode spacing (which also uses higher order OAM states suffers less crosstalk. However, such a system may also have a larger power loss due to the fast divergence of higher order OAM beams, as discussed above. Clearly, this trade-off between channel crosstalk and power loss shall be considered when choosing the mode spacing in a specific OAM multiplexed link.

Figure 23:
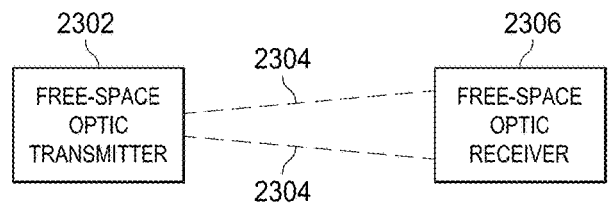
FIG. 23 illustrates a free-space communication system.

An additional configuration in which the optical angular momentum processing and multi-layer overlay modulation technique described herein above may prove useful within the optical network framework is use with free-space optics communications. Free-space optics systems provide a number of advantages over traditional RF based systems from improved isolation between the systems, the size and the cost of the receivers/transmitters, need for an FCC license, and by combining space, lighting, and communication into the same system. Referring now to FIG. 23, there is illustrated an example of the operation of a free-space communication system. The free-space communication system utilizes a free-space optics transmitter 2302 that transmits a light beam 2304 to a free-space optics receiver 2306. The major difference between a fiber-optic network and a free-space optic network is that the information beam is transmitted through free space rather than over a fiber-optic cable. This causes a number of link difficulties, which will be more fully discussed herein below. However, because the free space system does not have the optic fiber to act as a waveguide, it is more susceptible to the problems outlined above. Free-space optics is a line of sight technology that uses the invisible beams of light to provide optical bandwidth connections that can send and receive up to 2.5 Gbps of data, voice, and video communications between a transmitter 2302 and a receiver 2306. Free-space optics uses the same concepts as fiber-optics, except without the use of a fiber-optic cable. Free-space optics systems provide the light beam 2304 within the infrared (IR) spectrum, which is at the low end of the light spectrum. Specifically, the optical signal is in the range of 300 Gigahertz to 1 Terahertz in terms of wavelength.

Presently existing free-space optics systems can provide data rates of up to 10 Gigabits per second at a distance of up to 2.5 kilometers. In outer space, the communications range of free space optical communications is currently on the order of several thousand kilometers, but has the potential to bridge interplanetary distances of millions of kilometers, using optical telescopes as beam expanders. In January of 2013, NASA used lasers to beam an image of the Mona Lisa to the Lunar Reconnaissance Orbiter roughly 240,000 miles away. To compensate for atmospheric interference, an error correction code algorithm, similar to that used within compact discs, was implemented.

Figure 24:
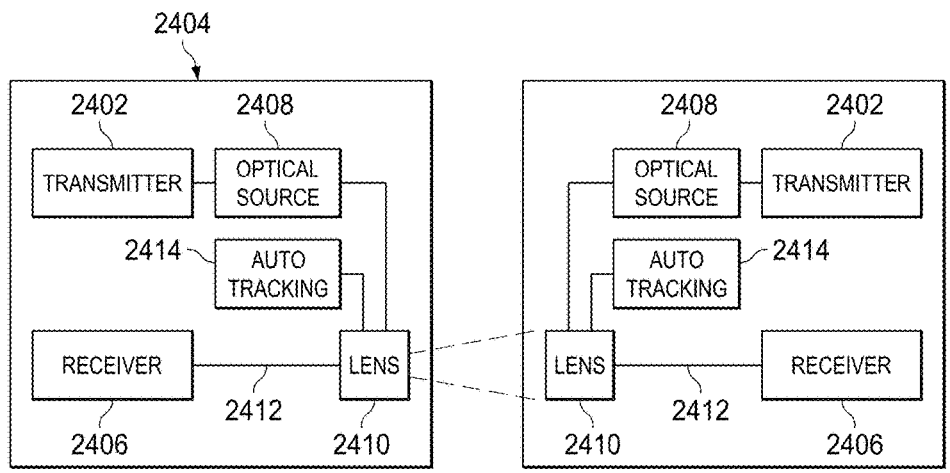
FIG. 24 illustrates a block diagram of a free-space optics system using orbital angular momentum and multi-level overlay modulation.

Referring now to FIG. 24, there is illustrated a block diagram of a free-space optics system using orbital angular momentum and multilevel overlay modulation according to the present disclosure. The OAM twisted signals, in addition to being transmitted over fiber, may also be transmitted using free optics. In this case, the transmission signals are generated within transmission circuitry 2402 at each of the FSO transceivers 2404. Free-space optics technology is based on the connectivity between the FSO based optical wireless units, each consisting of an optical transceiver 2404 with a transmitter 2402 and a receiver 2406 to provide full duplex open pair and bidirectional closed pairing capability. Each optical wireless transceiver unit 2404 additionally includes an optical source 2408 plus a lens or telescope 2410 for transmitting light through the atmosphere to another lens 2410 receiving the information. At this point, the receiving lens or telescope 2410 connects to a high sensitivity receiver 2406 via optical fiber 2412. The transmitting transceiver 2404a and the receiving transceiver 2404b have to have line of sight to each other and be aligned both laterally and angularly. Obstacles, such as, trees, buildings, animals, and atmospheric conditions, all can hinder the line of sight needed for this communications medium. Since line of sight is so critical, some systems make use of beam divergence or a diffused beam approach, which involves a large field of view that tolerates substantial line of sight interference without significant impact on overall signal quality. The system may also be equipped with auto tracking mechanism 2414 that maintains a tightly focused beam on the receiving transceiver 1904b, even when the transceivers are mounted on tall buildings or other structures that sway.

The modulated light source used with optical source 2408 is typically a laser or light emitting diode (LED) providing the transmitted optical signal that determines all the transmitter capabilities of the system. Only the detector sensitivity within the receiver 2406 plays an equally important role in total system performance. For telecommunications purposes, only lasers that are capable of being modulated at 20 Megabits per second to 2.5 Gigabits per second can meet current marketplace demands. Additionally, how the device is modulated and how much modulated power is produced are both important to the selection of the device. Lasers in the 780-850 nm and 1520-1600 nm spectral bands meet frequency requirements.

Commercially available FSO systems operate in the near IR wavelength range between 750 and 1600 nm, with one or two systems being developed to operate at the IR wavelength of 10,000 nm. The physics and transmissions properties of optical energy as it travels through the atmosphere are similar throughout the visible and near IR wavelength range, but several factors that influence which wavelengths are chosen for a particular system.

The atmosphere is considered to be highly transparent in the visible and near IR wavelength. However, certain wavelengths or wavelength bands can experience severe absorption. In the near IR wavelength, absorption occurs primarily in response to water particles (i.e., moisture) which are an inherent part of the atmosphere, even under clear weather conditions. There are several transmission windows that are nearly transparent (i.e., have an attenuation of less than 0.2 dB per kilometer) within the 700-10,000 nm wavelength range. These wavelengths are located around specific center wavelengths, with the majority of free-space optics systems designed to operate in the windows of 780-850 nm and 1520-1600 nm.

Wavelengths in the 780-850 nm range are suitable for free-space optics operation and higher power laser sources may operate in this range. At 780 nm, inexpensive CD lasers may be used, but the average lifespan of these lasers can be an issue. These issues may be addressed by running the lasers at a fraction of their maximum rated output power which will greatly increase their lifespan. At around 850 nm, the optical source 2408 may comprise an inexpensive, high performance transmitter and detector components that are readily available and commonly used in network transmission equipment. Highly sensitive silicon (SI) avalanche photodiodes (APD) detector technology and advanced vertical cavity emitting laser may be utilized within the optical source 2408.

VCSEL technology may be used for operation in the 780 to 850 nm range. Possible disadvantage of this technology include beam detection through the use of a night vision scope, although it is still not possible to demodulate a perceived light beam using this technique.

Wavelengths in the 1520-1600 nm range are well-suited for free-space transmission, and high quality transmitter and detector components are readily available for use within the optical source block 2408. The combination of low attenuation and high component availability within this wavelength range makes the development of wavelength division multiplexing (WDM) free-space optics systems feasible. However, components are generally more expensive and detectors are typically less sensitive and have a smaller receive surface area when compared with silicon avalanche photodiode detectors that operator at the 850 nm wavelength. These wavelengths are compatible with erbium-doped fiber amplifier technology, which is important for high power (greater than 500 milliwatt) and high data rate (greater than 2.5 Gigabytes per second) systems. Fifty to 65 times as much power can be transmitted at the 1520-1600 nm wavelength than can be transmitted at the 780-850 nm wavelength for the same eye safety classification. Disadvantages of these wavelengths include the inability to detect a beam with a night vision scope. The night vision scope is one technique that may be used for aligning the beam through the alignment circuitry 2414. Class 1 lasers are safe under reasonably foreseeable operating conditions including the use of optical instruments for intrabeam viewing. Class 1 systems can be installed at any location without restriction.

Another potential optical source 2408 comprised Class 1M lasers. Class 1M laser systems operate in the wavelength range from 302.5 to 4000 nm, which is safe under reasonably foreseeable conditions, but may be hazardous if the user employs optical instruments within some portion of the beam path. As a result, Class 1M systems should only be installed in locations where the unsafe use of optical aids can be prevented. Examples of various characteristics of both Class 1 and Class 1M lasers that may be used for the optical source 2408 are illustrated in Table 2 below.

TABLE 2

| Laser Classification | Power (mW) | Aperture Size (mm) | Distance (m) | Power Density (mW/cm$^2$) |
|---|---|---|---|---|
| 850-nm Wavelength | | | | |
| Class 1 | 0.78 | 7 | 14 | 2.03 |
|  |  | 50 | 2000 | 0.04 |
| Class 1M | 0.78 | 7 | 100 | 2.03 |
|  | 500 | 7 | 14 | 1299.88 |
|  |  | 50 | 2000 | 25.48 |
| 1550-nm Wavelength | | | | |
| Class 1 | 10 | 7 | 14 | 26.00 |
|  |  | 25 | 2000 | 2.04 |
| Class 1M | 10 | 3.5 | 100 | 103.99 |
|  | 500 | 7 | 14 | 1299.88 |
|  |  | 25 | 2000 | 101.91 |

The 10,000 nm wavelength is relatively new to the commercial free space optic arena and is being developed because of better fog transmission capabilities. There is presently considerable debate regarding these characteristics because they are heavily dependent upon fog type and duration. Few components are available at the 10,000 nm wavelength, as it is normally not used within telecommunications equipment. Additionally, 10,000 nm energy does not penetrate glass, so it is ill-suited to behind window deployment.

Within these wavelength windows, FSO systems should have the following characteristics. The system should have the ability to operate at higher power levels, which is important for longer distance FSO system transmissions. The system should have the ability to provide high speed modulation, which is important for high speed FSO systems. The system should provide a small footprint and low power consumption, which is important for overall system design and maintenance. The system should have the ability to operate over a wide temperature range without major performance degradations such that the systems may prove useful for outdoor systems. Additionally, the mean time between failures should exceed 10 years. Presently existing FSO systems generally use VCSELS for operation in the shorter IR wavelength range, and Fabry-Pérot or distributed feedback lasers for operation in the longer IR wavelength range. Several other laser types are suitable for high performance FSO systems.

A free-space optics system using orbital angular momentum processing and multi-layer overlay modulation would provide a number of advantages. The system would be very convenient. Free-space optics provides a wireless solution to a last-mile connection, or a connection between two buildings. There is no necessity to dig or bury fiber cable. Free-space optics also requires no RF license. The system is upgradable and its open interfaces support equipment from a variety of vendors. The system can be deployed behind windows, eliminating the need for costly rooftop sites. Further, it is easier to deploy in buildings as the system can be located as the area requires, saving significant costs of running cables to rooftops. It is also immune to radiofrequency interference or saturation. The system is also fairly speedy. The system provides 10 Gigabits per second of data throughput. This provides ample bandwidth to transfer files between two sites. With the growth in the size of files, free-space optics provides the necessary bandwidth to transfer these files efficiently.

Free-space optics also provides a secure wireless solution. The laser beam cannot be detected with a spectral analyzer or RF meter. The beam is invisible, which makes it difficult to find. The laser beam that is used to transmit and receive the data is very narrow. This means that it is almost impossible to intercept the data being transmitted. One would have to be within the line of sight between the receiver and the transmitter in order to be able to accomplish this feat. If this occurs, this would alert the receiving site that a connection has been lost or the amount of signal received severely diminished. Thus, minimal security upgrades would be required for a free-space optics system.

However, there are several weaknesses with free-space optics systems. The distance of a free-space optics system is very limited. Currently operating distances are approximately within 2 kilometers. Although this is a powerful system with great throughput, the limitation of distance is a big deterrent for full-scale implementation. Further, the more OAMs applied, the greater divergence over distance. Additionally, all systems require line of sight be maintained at all times during transmission. Any obstacle, be it environmental or animals can hinder the transmission. Free-space optic technology must be designed to combat changes in the atmosphere which can affect free-space optic system performance capacity. Finally, any shift in the mounting apparatus can cause the beam to be misaligned. Shifts can be caused by wind, earthquakes, ground shifting and even traffic.

Referring now to FIGS. 25A through 25D, in order to achieve higher data capacity within optical links, an additional degree of freedom from multiplexing multiple data channels must be exploited. Moreover, the ability to use two different orthogonal multiplexing techniques together has the potential to dramatically enhance system performance and increased bandwidth.

Figure 25A:
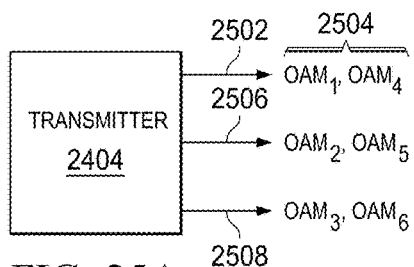
FIGS. 25A-25C illustrate the manner for multiplexing multiple data channels into optical links to achieve higher data capacity.
Figure 25B:
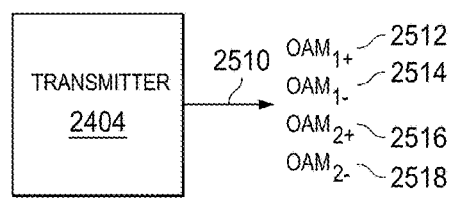

One multiplexing technique which may exploit the possibilities is mode division multiplexing (MDM) using orbital angular momentum (OAM). OAM mode refers to laser beams within a free-space optical system or fiber-optic system that have a phase term of $e^{il\varphi}$ in their wave fronts, in which $\varphi$ is the azimuth angle and l determines the OAM value (topological charge). In general, OAM modes have a "donut-like" ring shaped intensity distribution. Multiple spatial collocated laser beams, which carry different OAM values, are orthogonal to each other and can be used to transmit multiple independent data channels on the same wavelength. Consequently, the system capacity and spectral efficiency in terms of bits/S/Hz can be dramatically increased. Free-space communications links using OAM may support 100 Tbits/capacity. Various techniques for implementing this as illustrated in FIGS. 25A through 25D include a combination of multiple beams 2502 having multiple different OAM values 2504 on each wavelength. Thus, beam 2502 includes OAM values, OAM1 and OAM4. Beam 2506 includes OAM value 2 and OAM value 5. Finally, beam 2508 includes OAM3 value and OAM6 value. Referring now to FIG. 25B, there is illustrated a single beam wavelength 2510 using a first group of OAM values 2512 having both a positive OAM value 2512 and a negative OAM value 2514. Similarly, OAM2 value may have a positive value 2516 and a negative value 2518 on the same wavelength 2510. While mode division multiplexing of OAM modes is described above, other orthogonal functions may be used with mode division multiplexing such as Laguerre Gaussian functions, Hermite Gaussian functions, Jacobi functions, Gegenbauer functions, Legendre functions and Chebyshev functions.

Figure 25C:
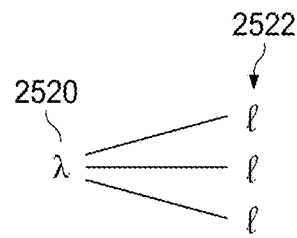
Figure 25D:
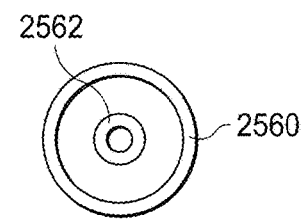
FIG. 25D illustrates groups of concentric rings for a wavelength having multiple OAM valves.

FIG. 25C illustrates the use of a wavelength 2520 having polarization multiplexing of OAM value. The wavelength 2520 can have multiple OAM values 2522 multiplexed thereon. The number of available channels can be further increased by applying left or right handed polarization to the OAM values. Finally, FIG. 25D illustrates two groups of concentric rings 2560, 2562 for a wavelength having multiple OAM values.

Figure 26:
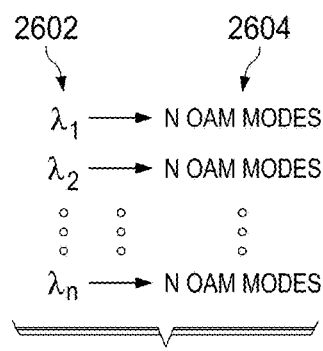
FIG. 26 illustrates a WDM channel containing many orthogonal OAM beams.

Another multiplexing technique is wavelength distribution multiplexing (WDM), WDM has been widely used to improve the optical communication capacity within both fiber-optic systems and free-space communication system. Combining OAM and WDM has not previously been done. However, OAM mode multiplexing and WDM are mutually orthogonal such that they can be combined to achieve a dramatic increase in system capacity. Referring now to FIG. 26, there is illustrated a scenario where each WDM channel 2602 contains many orthogonal OAM beam 2604. Thus, using a combination of orbital angular momentum with wave division multiplexing, a significant enhancement in communication link to capacity may be achieved.

Current optical communication architectures have considerable routing challenges. A routing protocol for use with free-space optic system must take into account the line of sight requirements for optical communications within a free-space optics system. However, an optics network may be modeled as a directed hierarchical random sector geometric graph in which sensors route their data via multi-hop paths to a base station through a cluster head. This technique is a new efficient routing algorithm for local neighborhood discovery and a base station uplink and downlink discovery algorithm. The routing protocol requires order Olog(n) storage at each node versus order O(n) used within current techniques and architectures. This new technique has the advantage of being much faster than current systems.

Current routing protocols are based on link state, distance vectors, path vectors, or source routing, and they differ from the new routing technique in significant manners. First, current techniques assume that a fraction of the links are bidirectional. This is not true within a free-space optic network in which links are unidirectional. Second, many current protocols are designed for ad hoc networks in which the routing protocol is designed to support multi-hop communications between any pair of nodes. The goal of the sensor network is to route sensor readings to the base station. Therefore, the dominant traffic patterns are different from those in an ad hoc network. In a sensor network, node to base stations, base station to nodes, and local neighborhood communication are mostly used.

Figure 27:
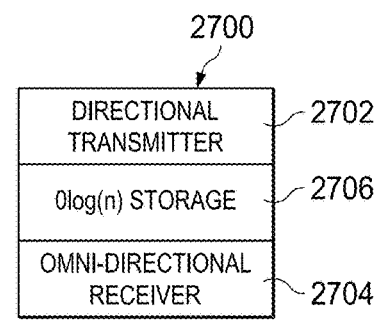
FIG. 27 illustrates a node of a free-space optical system.

Many paths of wireless and free space network are unidirectional. Recent studies on wireless and free space optical systems show that as many as 5 percent to 10 percent of links and wireless ad hoc networks are unidirectional due to various factors. Routing protocols such as DSDV and AODV use a reverse path technique, implicitly ignoring such unidirectional links and are therefore not relevant in this scenario. Other protocols such as DSR, ZRP, or ZRL have been designed or modified to accommodate unidirectionality by detecting unidirectional links and then providing bidirectional abstraction for such links. Unidirectionality only allows information transmission in a single direction which does not enable a response to be provided to an information transmission system. Referring now to FIG. 27, one solution for dealing with unidirectionality is tunneling, in which bidirectionality is emulated for a unidirectional link by using bidirectional links on a reverse back channel to establish the tunnel. Tunneling also prevents implosion of acknowledgement packets and looping by simply pressing link layer acknowledgements for tunneled packets received on a unidirectional link. Tunneling, however, works well in mostly bidirectional networks with few unidirectional links.

Figure 28:
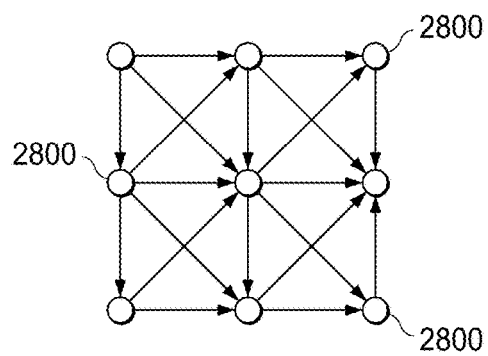
FIG. 28 illustrates a network of nodes within a free-space optical system.

Within a network using only unidirectional links such as a free-space optical network, systems such as that illustrated in FIGS. 27 and 28 would be more applicable. Nodes within a unidirectional network utilize a directional transmit 2702 transmitting from the node 2700 in a single, defined direction. Additionally, each node 2700 includes an omnidirectional receiver 2704 which can receive a signal coming to the node in any direction. Also, as discussed here and above, the node 2700 would also include a 0 log(n) storage 2706. Thus, each node 2700 provide only unidirectional communications links. Thus, a series of nodes 2700 as illustrated in FIG. 28 may unidirectionally communicate with any other node 2700 and forward communication from one location to another through a sequence of interconnected nodes.

Multiplexing of the topological charge to the RF as well as free space optics in real time provides redundancy and better capacity. When channel impairments from atmospheric disturbances or scintillation impact the information signals, it is possible to toggle between free space optics to RF and back in real time. This approach still uses twisted waves on both the free space optics as well as the RF signal. Most of the channel impairments can be detected using a control or pilot channel and be corrected using algorithmic techniques (closed loop control system) or by toggling between the RF and free space optics.

Topological charge may be multiplexed to the wave length for either linear or circular polarization. In the case of linear polarizations, topological charge would be multiplexed on vertical and horizontal polarization. In case of circular polarization, topological charge would be multiplexed on left hand and right hand circular polarizations.

The topological charges can be created using Spiral Phase Plates (SPPs) such as that illustrated in FIG. 11E, phase mask holograms or a Spatial Light Modulator (SLM) by adjusting the voltages on SLM which creates properly varying index of refraction resulting in twisting of the beam with a specific topological charge. Different topological charges can be created and muxed together and de-muxed to separate charges.

As Spiral Phase plates can transform a plane wave (l=0) to a twisted wave of a specific helicity (i.e. l=+1), Quarter Wave Plates (QWP) can transform a linear polarization (s=0) to circular polarization (i.e. s=+1).

Cross talk and multipath interference can be reduced using Multiple-Input-Multiple-Output (MIMO).

Most of the channel impairments can be detected using a control or pilot channel and be corrected using algorithmic techniques (closed loop control system).

Figure 29:
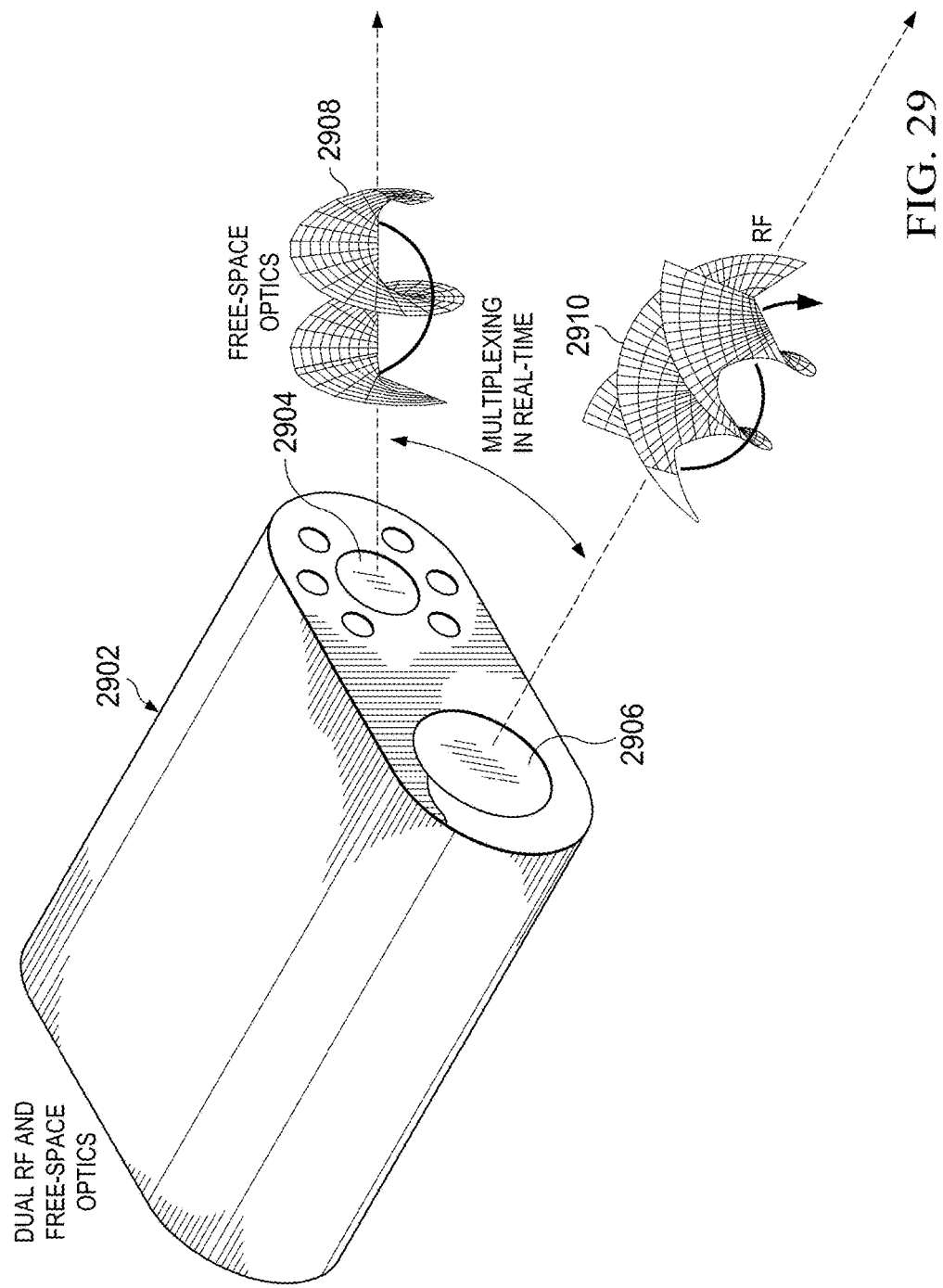
FIG. 29 illustrates a system for multiplexing between a free space signal and an RF signal.

In a further embodiment illustrated in FIG. 29, both RF signals and free space optics may be implemented within a dual RF and free space optics mechanism 2902. The dual RF and free space optics mechanism 2902 include a free space optics projection portion 2904 that transmits a light wave having an orbital angular momentum applied thereto with multilevel overlay modulation and a RF portion 2906 including circuitry necessary for transmitting information with orbital angular momentum and multilayer overlay on an RF signal 2910. The dual RF and free space optics mechanism 2902 may be multiplexed in real time between the free space optics signal 2908 and the RF signal 2910 depending upon operating conditions. In some situations, the free space optics signal 2908 would be most appropriate for transmitting the data. In other situations, the free space optics signal 2908 would not be available and the RF signal 2910 would be most appropriate for transmitting data. The dual RF and free space optics mechanism 2902 may multiplex in real time between these two signals based upon the available operating conditions.

Multiplexing of the topological charge to the RF as well as free space optics in real time provides redundancy and better capacity. When channel impairments from atmospheric disturbances or scintillation impact the information signals, it is possible to toggle between free space optics to RF and back in real time. This approach still uses twisted waves on both the free space optics as well as the RF signal. Most of the channel impairments can be detected using a control or pilot channel and be corrected using algorithmic techniques (closed loop control system) or by toggling between the RF and free space optics.

Figure 30:
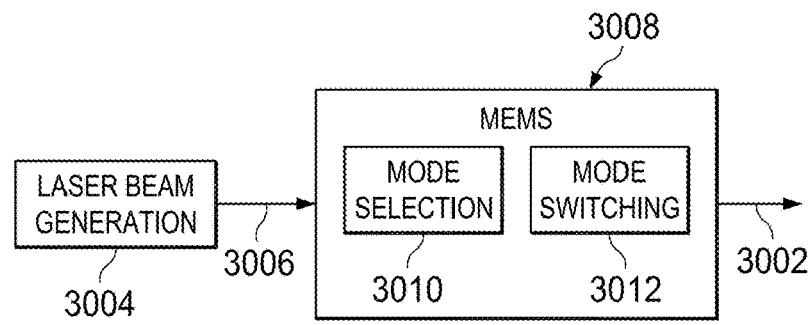
FIG. 30 illustrates the manner for generating a light beam including orthogonal functions.

Referring now to FIG. 30, there is illustrated a further manner for generating a light beam 3002 including orthogonal functions such as OAM, Hermite Gaussian, Laguerre Gaussian, etc., therein to encode information in the beam. The laser beam generator 3004 generates a beam 3006 including plane waves that is provided to a MicroElectro-Mechanical system (MEMs) device 3008. Examples of MEMs devices 3008 include digital light processing (DLP) projectors or digital micro-mirror devices (DMDs) that enable the generation of light beams having various characteristics. A MEMs device 3008 can generate Hermite Gaussian (HG) modes, Laguerre Gaussian (LG) modes and vortex OAM modes that are programmed responsive to inputs to the MEMs device 3008. The MEMs device 3008 has mode selection logic 3010 that enable selection of the Laguerre Gaussian, Hermite Gaussian and vortex OAM modes (or other orthogonal function modes) for processing of the incoming light beam 3006. The MEMs device 3008 further enables switching between the different modes at a very high rate of a few thousand times per second which is not achievable using spatial light modulator (SLMs). Switching between the modes is controlled via mode switching logic 3012. This fast switching enables these forms of OAM, HG or LG mode generation for communications as well as quantum key distribution (QKD) and quantum computers for quantum information processing. The orthogonal characteristics of Laguerre-Gaussian (LG) with OAM and Hermite-Gaussian (HG) beams combined with high-speed switching of MEMs make the device useful in achieving higher data capacity. This is possible using holograms that are programmed into the memory of a DLP that program micro-mirrors to selected positions and can twist a light beam with programmed information using the mirrors.

This enables the on-demand realization of binary gratings (holograms) that can be switched between at very high speed using an external digital signal. Using, for example, DLP technologies, a switch between different modes (different binary gratings) may be achieved at a very high rate of speed of a few thousand times per second which is not achievable using spatial light modulators (SLMs). This allows for the dynamic control of helicities provided to a beam of light for a new modulation and/or multiple access technique to encode information.

DLP's allow for high resolution and accuracy from micrometers to millimeters thus enabling a variety of frequencies from infrared to ultraviolet to be utilized. The use of DLP's for MDM (mode division multiplexing) minimizes color, distance, movement and environmental sensitivity and is thus ideal for building integrated optics. The majority of SLM's are limited by a frame refresh rate of about 60 Hz which makes the high speed, wide range of operational spectral bandwidth of digital micro-mirror devices (DMD's) useful in a variety of applications. DMD designs inherently minimize temperature sensitivity for reliable 3-D wave construction.

The vast majority of commercially available SLM devices are limited to frame rate of about 60 Hz which considerably limits the speed of operation of any system based on this technology. A DMD is an amplitude only spatial light modulator. The high speed, wide range of operational spectral bandwidth and high power threshold of a DMDs makes the device a useful tool for variety of applications. Variations of DMD's are commercially available for a fraction of the cost of a phase only SLM. Intensity shaping of spatial modes can be achieved by switching the micro mirrors on and off rapidly. However, the modes created during this process may not be temporally stable and have the desired intensity profile only when averaged by a slow detector.

Phase and amplitude information may be encoded by modulating the position and width of a binary amplitude grating implemented within a hologram such as those illustrated in FIGS. 31A-31H. By implementing such holograms to control a DMD, HG modes, LG modes, OAM vortex modes or any angular (ANG) mode may be created by properly programming the DMD with a hologram. Additionally, the switching between the generated modes may be performed at a very high speed.

This approach may be realized by considering a one-dimensional binary amplitude grating. The transmission function for this grating can be written as:

$$\tau(x) = \sum_{n=-\infty}^{\infty} \Pi\left[\frac{x-(n+k)x_0}{wx_0}\right]$$

where $$\Pi(v) = Rect(v) = \begin{cases} 1 & \text{if } |v| \le 1 \\ 0 & \text{else} \end{cases}$$

This function can be pictured as a pulse train with a period of $x_0$. The parameters of "k" and "w" are unitless quantities that set the position and the width of each pulse and are equal to constant values for a uniform grating. It is possible to locally change the value of these parameters to achieve phase and amplitude modulations of the optical field. The transmittance function $\tau(x)$ is a periodic function and can be expanded as a Fourier series.

In a case where $k(x)$ and $w(x)$ are functions of x and the binary grating is illuminated by a monochromatic plane wave. The first order diffracted light can be written as:

$$\tau_1(x) = \frac{1}{\pi}\sin[\pi w(x)]e^{i2\pi k(x)}$$

Thus, w(x) is related to the amplitude of the diffracted light while k(x) sets its phase. Therefore, the phase and the amplitude of the diffracted light can be controlled by setting the parameters k(x) and w(x). In communication theory, these methods are sometimes referred to as pulse position modulation (PPM) and pulse width modulation (PWM). The equation above is a good approximation for slowly varying k(x) and w(x) functions.

The above analysis treats a one-dimensional case. A two dimensional grating can be generated by thresholding a rapidly varying modulated carrier as:

$$\tau(x,y) = \tfrac{1}{2} + \tfrac{1}{2} sgn \{\cos [2\pi x/x_0 + \pi k(x,y)] - \cos [\pi w(x,y)]\}$$

Here, sgn(x, y) is the sign function. This may be checked in the limit where w(x,y) and k(x,y). One can find the corresponding w(x,y) and k(x,y) functions for a general complex scalar field:

$$\text{scaler field} = A(x,y) e^{i\varphi(x,y)}$$

According to the Relations $$w(x, y) = \frac{1}{\pi} \sin^{-1}[A(x, y)]$$

$$k(x, y) = \frac{1}{\pi} \varphi(x, y)$$

One could design 2-D binary amplitude holograms to generate LG modes. The gratings holograms designed for vortex modes would have a fairly uniform width across the aperture whereas for the case of LG modes, the gratings gradually disappear when the amplitude gets negligibly small.

Figure 32A:
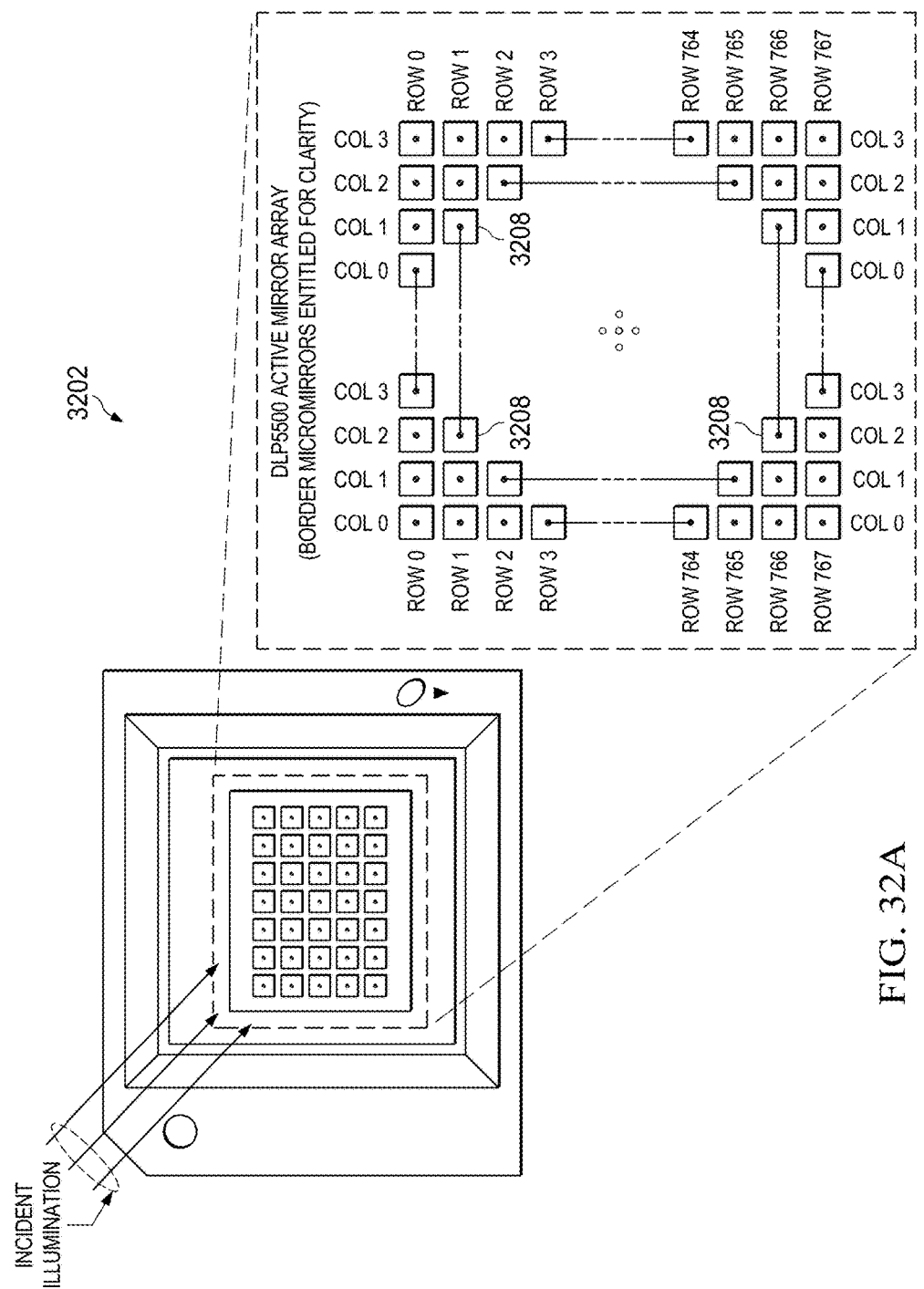
FIG. 32A is a block diagram of a digital micro-mirror device.

A digital micro-mirror device (DMD) is an amplitude only spatial light modulator. The device consist of an array of micro mirrors that can be controlled in a binary fashion by setting the deflection angle of an individual mirror to either +12° or −12°. Referring now to FIG. 32A, there is illustrated a general block diagram of a DMD 3202. The DMD 3202 includes a plurality of micro-mirrors 3208 arranged in an X by Y array. The array may comprise a 1024×768 array of aluminum micro-mirrors such as that implemented in the DLP 5500 DMD Array. However, it will be appreciated that other array sizes and DMD devices may be used. Each micro-mirror 3208 includes a combination of opto-mechanical and electro-mechanical elements. Each micro-mirror 3208 comprises a pixel of the DMD 3202. The micro-mirror 3208 is an electromechanical element having two stable micro-mirror states of +12° and −12°. The micro-mirrors have a 10.8 micrometer pitch and are designed for light having a wavelength of 420 nm-700 nm. The state of the micro-mirror 3208 is determined by the geometry and electrostatics of the pixel during operation. The two positions of the micro-mirror 3208 determine the direction that the light beam striking the mirror is deflected. In particular, the DMD 3202 is a spatial light modulator. By convention, the positive (+) state is tilted toward the illumination and is referred to as the "on" state. Similarly, the negative (−) state is tilted away from the illumination and is referred to as the "off" state.

Figure 32B:
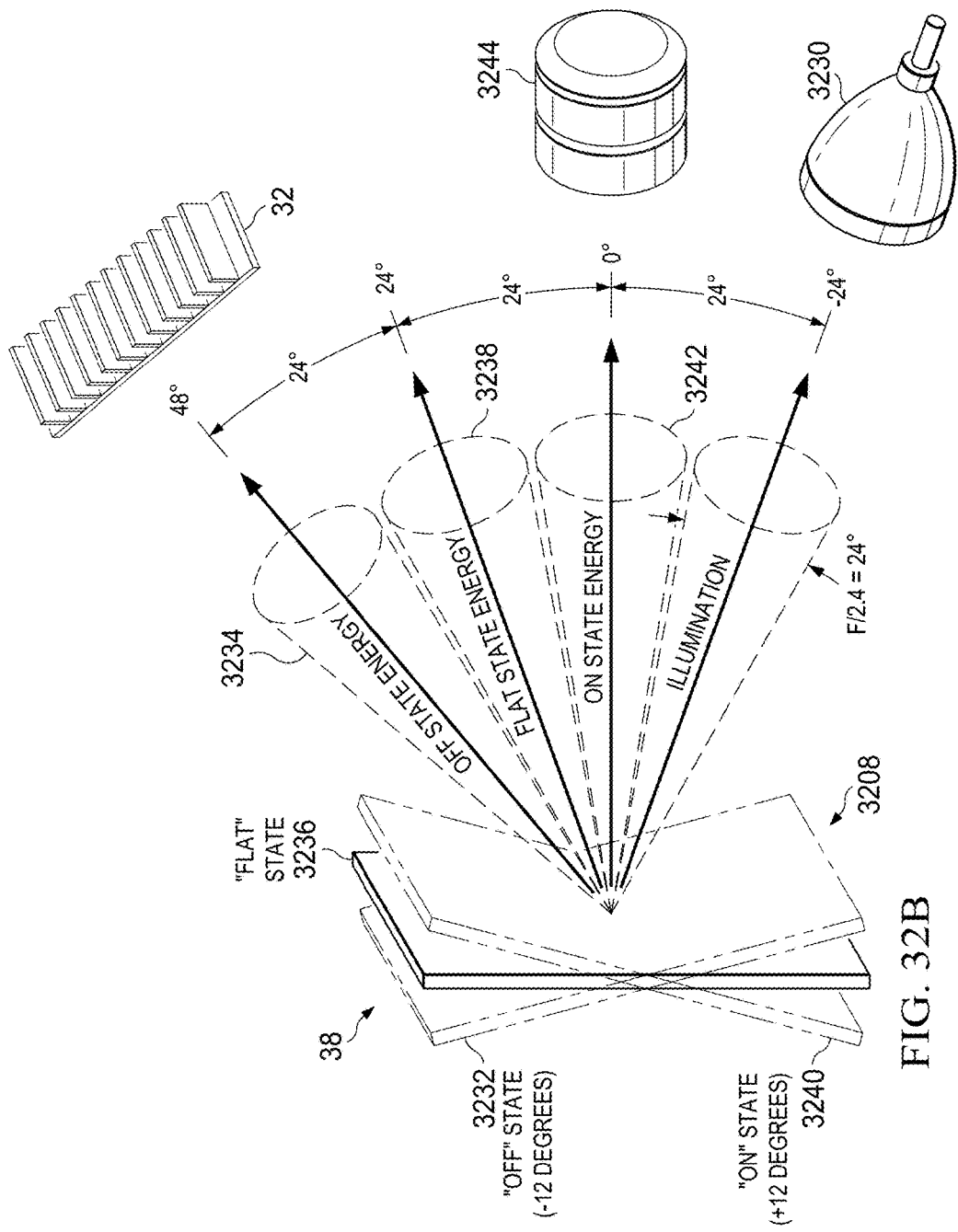
FIG. 32B illustrates the manner in which a micro-mirror interacts with a light source.

FIG. 32B illustrates the manner in which a micro-mirror 3208 will interact with a light source 3230 such as a laser. The light source 3230 shines a beam along angle of −24° that strikes the micro-mirror 3208. When the mirror is in the "off" state 3232 at an angle of −12°, the off state energy 3234 is reflected at an angle of 48°. When the mirror 3208 is positioned at the flat state 3236 of 0°, the flat state energy 3238 is reflected in an angle of 24°. Finally, when the mirror is at +12° in the "on" state 3240, the on state energy 3242 is reflected at 0° through the projection lens 3244 of a DMD.

Figure 33:
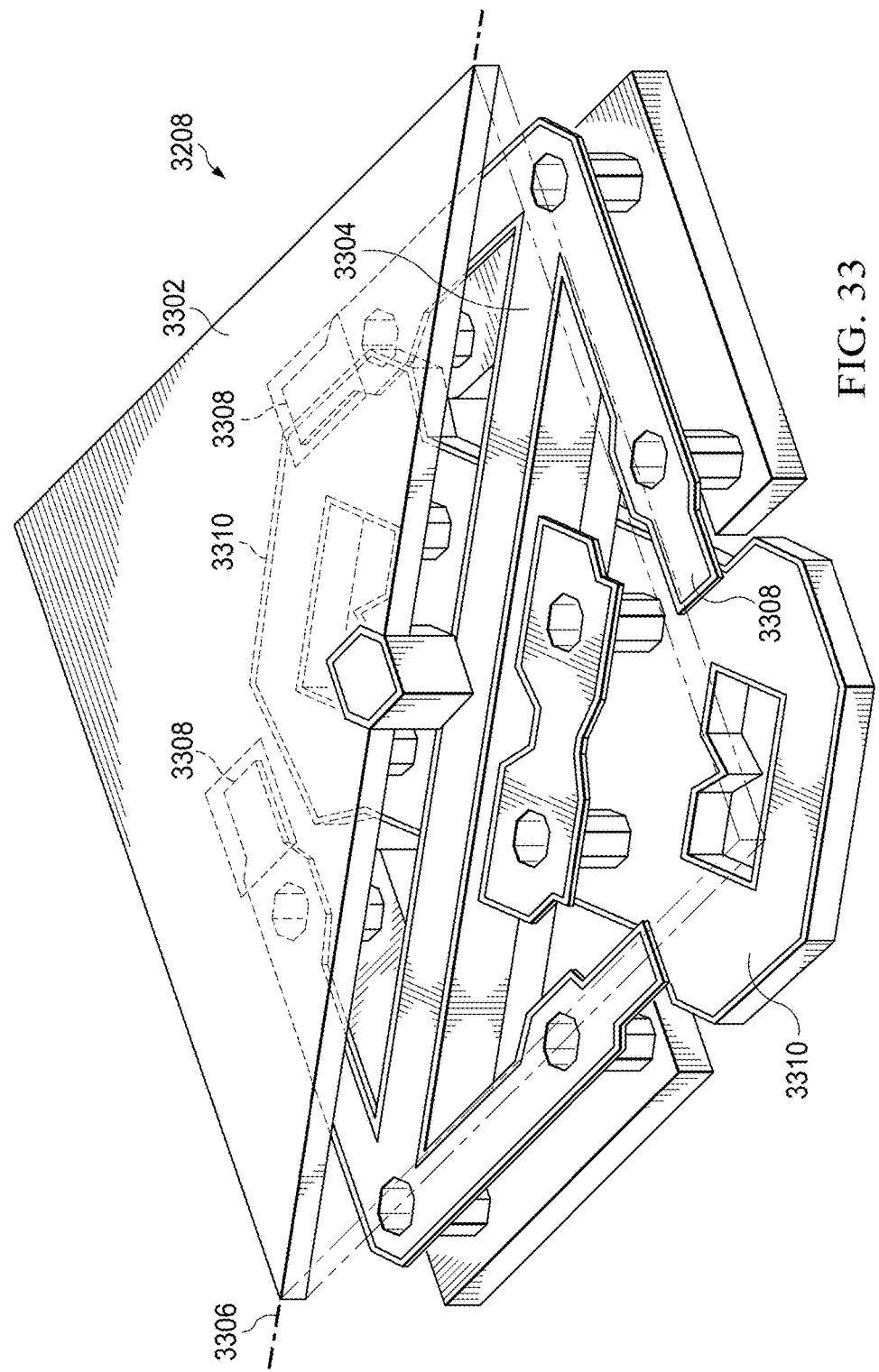
FIG. 33 illustrates the mechanical structure of the micro-mirror.

Referring now to FIG. 33, there is illustrated a view of the mechanical structure of a micro-mirror 3208. The micro-mirror 3208 includes the mirror 3302 attached to a torsional hinge 3304 along a diagonal axis 3306 of the mirror. The underside of the micro-mirror 3302 makes electrical contact with the remainder of the circuitry via spring tips 3308. A pair of electrodes 3310 is used for holding the micro-mirror 3302 in one of the two operational positions (+12° and −12°).

Figure 34:
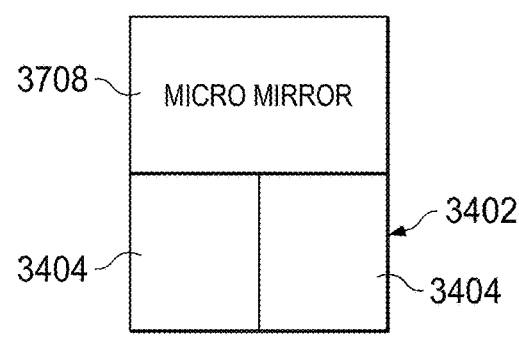
FIG. 34 is a block diagram of the functional components of a micro-mirror.

Referring now also to FIG. 34, there is illustrated a block diagram of the functional components of the micro-mirror 3208. Below each micro-mirror 3208 is a memory cell 3402 consisting of dual CMOS memory elements 3404. The states of the two memory elements 3404 are not independent, but are always complementary. If one CMOS memory element 3404 is at a logical "1" level, the other CMOS element is at a logical "0" and vice versa. The state of the memory cell 3402 of the micro-mirror 3208 plays a part in the mechanical position of the mirror 3208. However, loading information within the memory cell 3402 does not automatically change the mechanical state of the micro-mirror 3208.

Although the state of the dual CMOS memory elements 3404 plays a part in determining the state of the micro-mirror 3208, the state of the memory elements 3304 is not the sole determining factor. Once the micro-mirror 3208 has landed, changing the state of the memory cells 3402 will not cause the micro-mirror 3208 to flip to the other state. Thus, the memory state and the micro-mirror state are not directly linked together. In order for the state of the CMOS memory elements 3404 to be transferred to the mechanical position of the micro-mirror 3208, the micro-mirror 3108 must receive a "Mirror Clocking Pulse" signal. The mirror clocking pulse signal momentarily releases the micro-mirror 3108 and causes the mirror to reposition based on the state of the CMOS memory elements 3304. Thus, information relating to mirror positions may be preloaded into the memory element 3404, and the mechanical position of the mirror 3302 for each mirror within a MEMs device 3202 simultaneously change responsive to the mirror clocking pulse signal. One manner in which the information within the memory cells 3402 may be programmed is through the use of holograms, such as those described herein that are used to defined the position of each of the micro-mirrors 3208 with and a MEMs device 3202.

When a DMD 3202 is "powered up" or "powered down," there are prescribed operations that are necessary to ensure the proper orientation of the micro-mirrors 3208. These operations position the micro-mirrors 3208 during power up and release them during power down. The process for changing the position of a micro-mirror 3208 is more particularly illustrated in the flowchart of FIG. 35. Initially, at step 3502, the memory states within the memory cells 3402 are set. Once the memory states have been set within the memory cells 3402, the mirror clock pulse signal may be applied at step 3504. The micro-mirror 3108 will have an established specification of the time before and after a mirror clocking pulse that data may be loaded into the memory cell 3402. Application of the mirror clocking pulse signal will then set the mirrors to their new state established by the memory at step 3506. The process is completed at step 3508, and the mirror 3302 position is fixed and new data may be loaded into the memory cell 3402.

Figure 36:
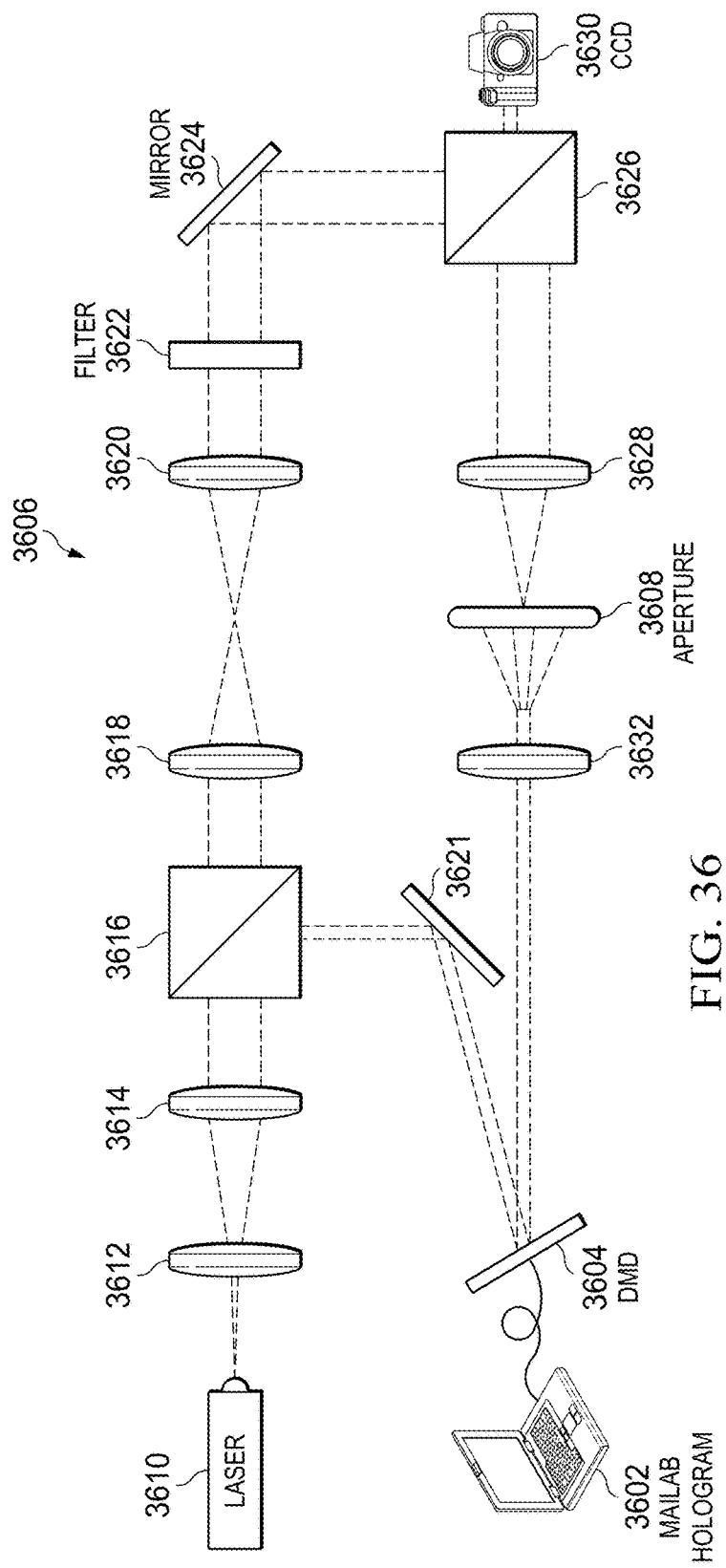
FIG. 36 illustrates an intensity in phase interferometer for measuring the intensity and phase of a generated beam.

Referring now to FIG. 36, there is illustrated an intensity and phase interferometer for measuring the intensity and phase of the generated beam. One can generate spatial modes by loading computer-generated Matlab holograms 3602 such as those described herein above and illustrated in FIGS. 31A-31H onto a DMD memory. The holograms 3602 for generating modes can be created by modulating a grating function with 20 micro-mirrors per each period. The holograms 3602 are provided to a DMD 3604. An imaging system 3606 along with an aperture 3608 separates the first order diffracted light into separate modes. The imaging system includes a laser 3610 that provides a light through a pair of lenses 3612, 3614. The lens 3612 expands the light beam to lens 3614 which collimates the beam. A beam splitter 3616 splits the beam toward a lens 3618 and mirror 3621. Lens 3618 focuses the beam through lens 3620 which collimates the beam through a filter 3622. The filtered beam is reflected by mirror 3624 through a second beam splitter 3626. The beam splitter 3626 splits the beam toward a lens 3628 and a charge coupled device camera 3630. The charge coupled device (CCD) camera 3630 measures the intensity profile of the generated beam. The plane wave beam provided to lens 3628 is focused on to the aperture 3608 to interfere with the twisted beam from the DMD. Also focused on the aperture 3608 is the twisted beam from the DMD 3604. The beam from the DMD 3604 is provided through a lens 3632 that also focuses on the aperture 3608. The phase of the mode being generated is determined from the number of spirals in the pattern and is caused by interfering the twisted beam with a plane wave beam. Also, whether the phase is positive or negative may be determined by whether the spirals are clockwise (positive) or counter-clockwise (negative). A Mach-Zehnder interferometer may be used to verify the phase pattern of the created beams. The collimated plane wave provided from lens 3628 is interfered with the modes generated by the beam from the DMD 3604 through lens 3632. This generates the interferograms (spiral patterns) at the aperture 3608. The modes generated from the DMD may then be multiplexed together using memory-based static forks on the DLP.

Therefore, there is a possibility of using binary holograms to coherently control both phase and amplitude of a light beam. A low number of pixels per each period of the binary grating results in quantization errors in encoding phase and intensity. The total number of grating periods with in the incident beam on the DMD 3604 sets an upper limit on the spatial bandwidth of the generated modes. Consequently a large number of micro-mirrors is preferable for generating high-quality modes. This can be achieved by using newer generations of DMDs. Another set of modes that are needed for OAM-based quantum key distribution is the set of angular (ANG) modes.

Figure 37:
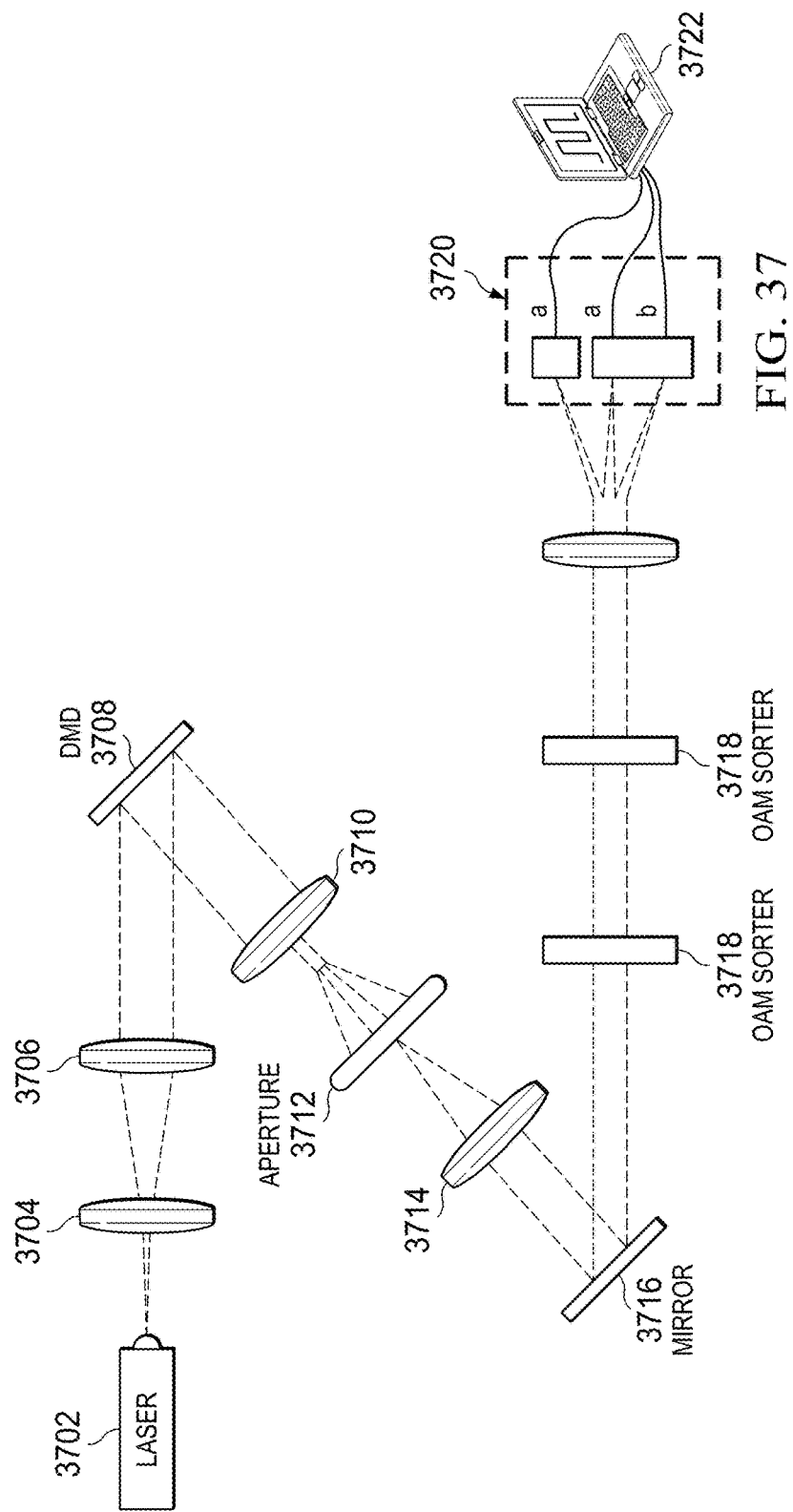
FIG. 37 illustrates the manner in which switching between different OAM modes may be achieved in real time.

Referring now to FIG. 37, there is illustrated the manner in which switching between different OAM modes may be achieved in real time. The laser 3702 generates a collimated beam through lenses 3704 and 3706 to a DMD 3708. The DMD 3708 provides a beam that is focused by lens 3710 onto aperture 3712. The output from the aperture 3712 is provided to a lens 3714 that collimates the beam onto a mirror 3716. The collimated beam is provided to an OAM sorter 3718 that separates the signal into various OAM modes 3720 as detected by a computer 3722.

Using DMDs for generating OAM modes provides the ability to switch between different modes at very high speeds. This involves a much smaller number of optical elements as compared to the conventional techniques were OAM modes are generated using a series of separated forked holograms and are multiplexed using beam splitters. Therefore, one can achieve dynamic switching among vortex OAM modes with different quantum numbers. The computer-generated holograms for these modes must be loaded onto the memory of the DMD 3708, and the switching is achieved by using a clock signal. One can use a mode sorter to map the input modes to a series of separated spots. The intensity may then be measured corresponding to each mode using a high-bandwidth PIN detector at positions corresponding to each mode. The DMD devices are available for a fraction of the cost of phase only spatial light modulators.

The DMD efficiency observed in a specific application depends on application-specific design variables such as illumination wavelength, illumination angle, projection aperture size, overfill of the DMD micro-mirror array and so on. Overall optical efficiency of each DMD can generally be estimated as a product of window transmission, a diffraction efficiency, micro-mirror surface reflectivity and array fill factor. The first three factors depend on the wavelength of the illumination source.

DLP technology uses two types of materials for DMD mirrors. The mirror material for all DMD's except Type-A is Corning Eagle XG, whereas type A DMDs use Corning 7056. Both mirror types have an anti-reflectivity (AR), thin-film coating on both the top and the bottom of the window glass material. AR coatings reduce reflections and increase transmission efficiency. The DMD mirrors are designed for three transmission regions. These ranges include the ultraviolet light region from 300 nm to 400 nm, the visible light region from 400 nm to 700 nm and the near infrared light region (NIR) from 700 nm to 2500 nm. The coating used depends on the application. UV windows have special AR coatings designed to be more transmissive for ultraviolet wavelengths, visible coatings for visible DMDs and NIR coatings for NIR DMDs.

The measured data provided in the following sections reflects a typical single pass transmittance through both top and bottom AR coated mirror surfaces with random polarization. The angle of incidence (AOI) of 0° is measured perpendicular to the window surface unless mentioned otherwise. With an increase in the number of window passes, the efficiency would decline.

Figure 38:
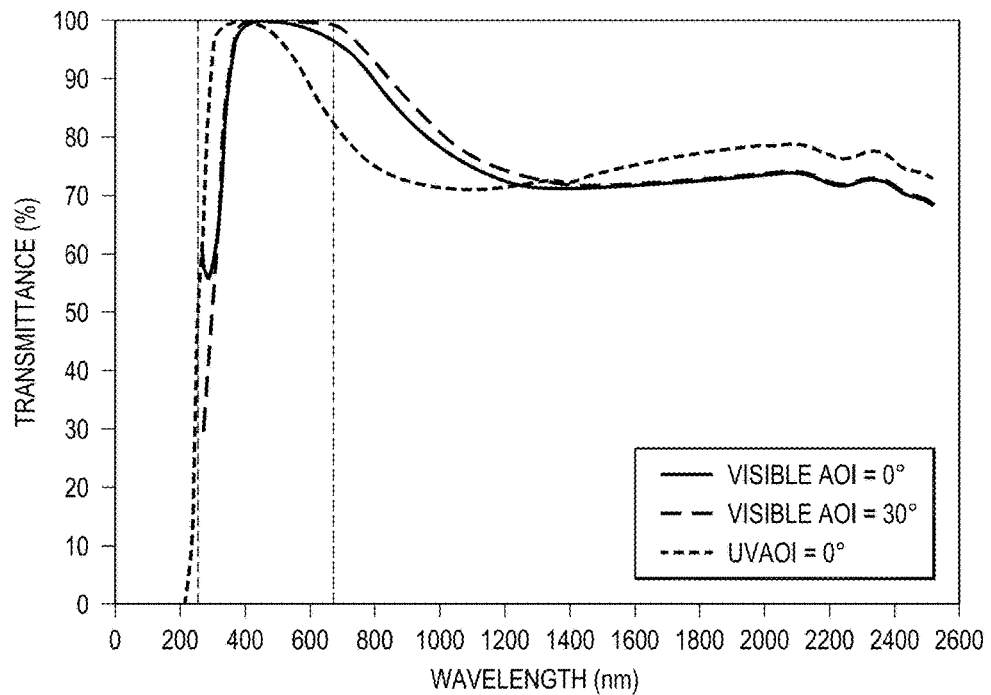
FIG. 38 illustrates the window transmission curves for Corning 7056.
Figure 39:
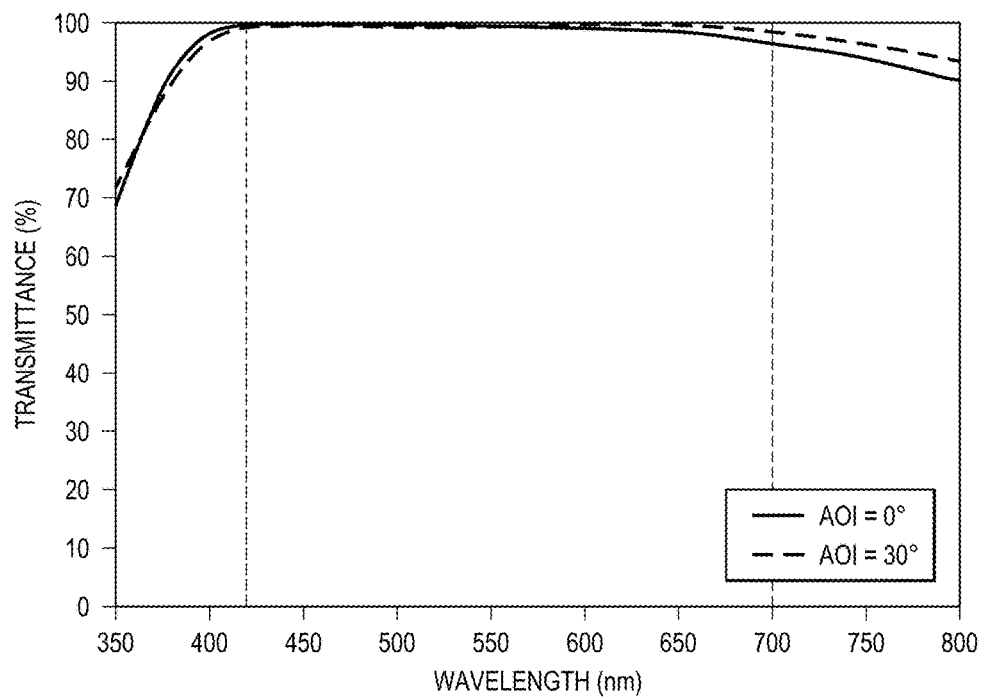
FIGS. 39-43 are zoomed in views of visible and UV AR coated window transmittance for Corning 7056.
Figure 40:
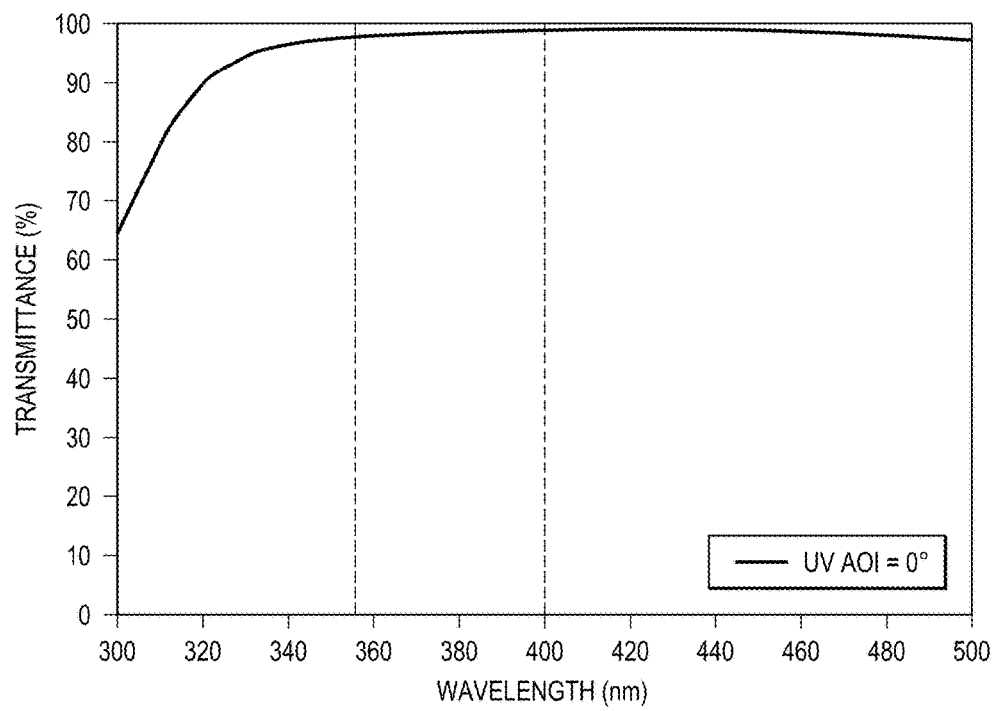
Figure 41:
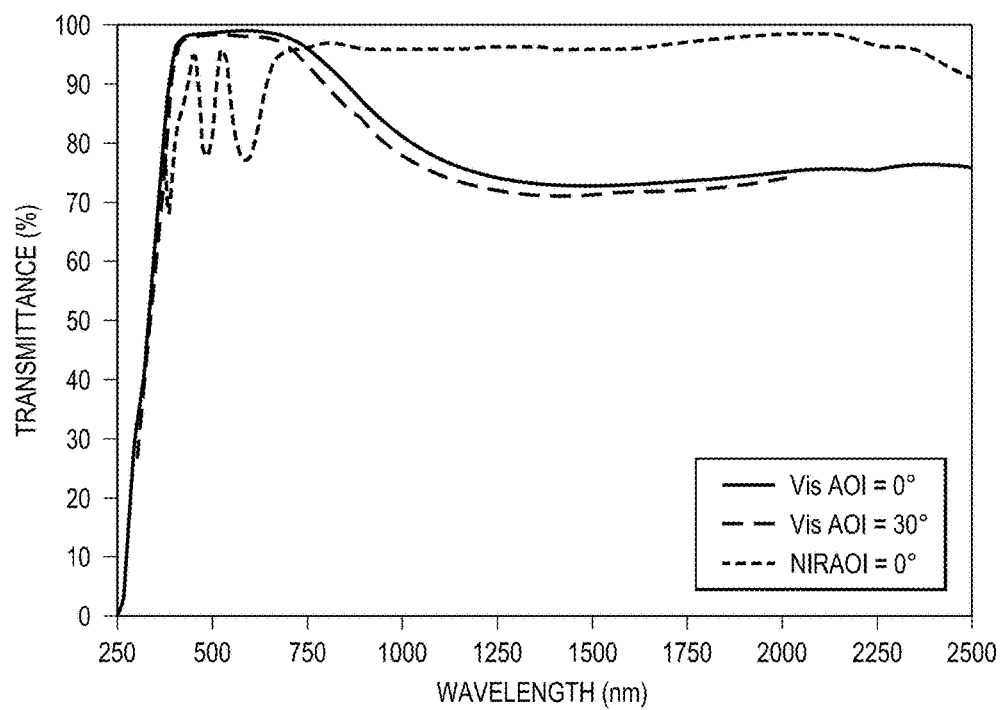
Figure 42:
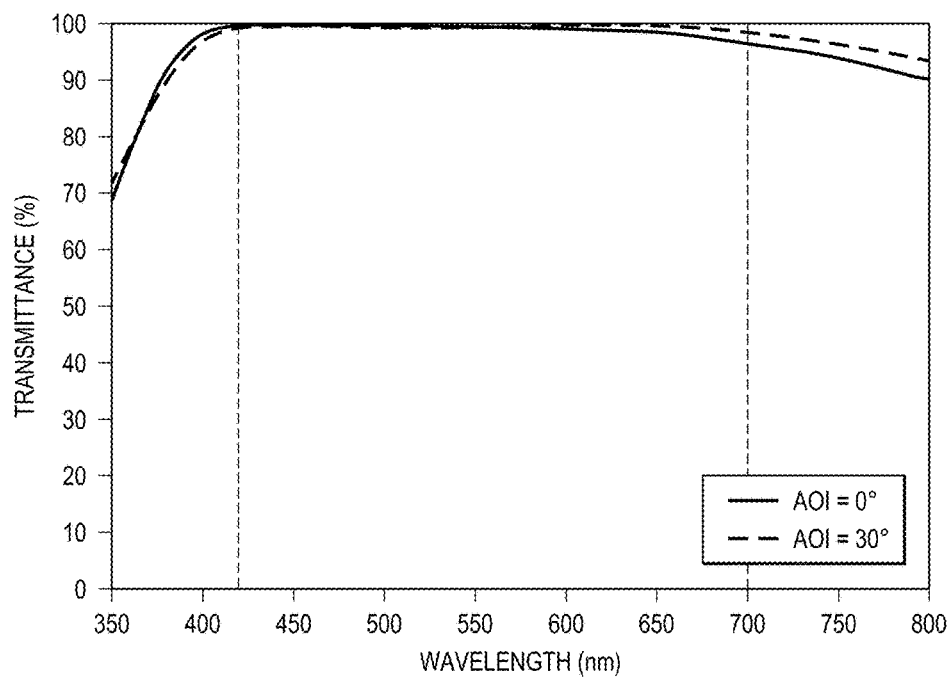
Figure 43:
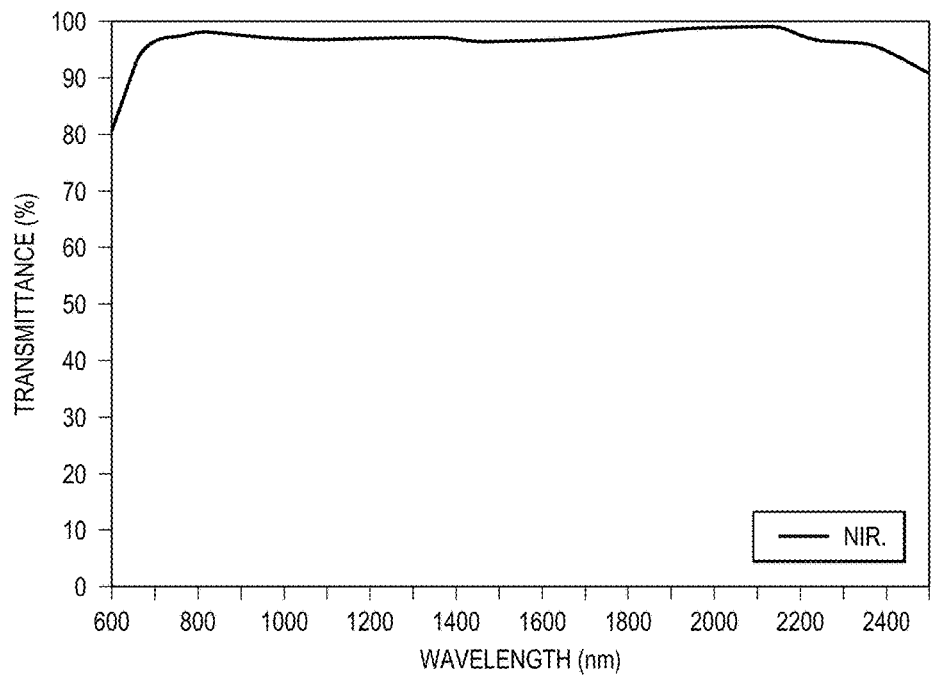

FIG. 38 represents the window transmission curves for Corning 7056. The window transmission response curve in this figure applies to Taipei MDM's in their specified illumination wavelength regions. FIG. 38 shows the UV window transmittance measured perpendicular to the window surface and visible window transmittance at a lie of 0° and 30°. FIGS. 39-43 are zoomed in views of the typical visible and UV AR coated window transmittance in their maximum transmission regions. The visible Corning Eagle XG window transmission data shown in FIG. 42 applies to the DLP 5500, DLP 1700, DLP 3000 and DLP 3000 DMD's. The typical transmittance observed in these DMD's is broadband visible region is approximately 97%. The NIR Corning Eagle XG window transmission data of FIG. 43 applies to the DLP 3000 NIR DMD. The typical transmittance observed in the NIR DMD's in the broadband NIR region is approximately 96% for most of the region with a dip toward 90% as it nears 2500 nm.

Figure 44:
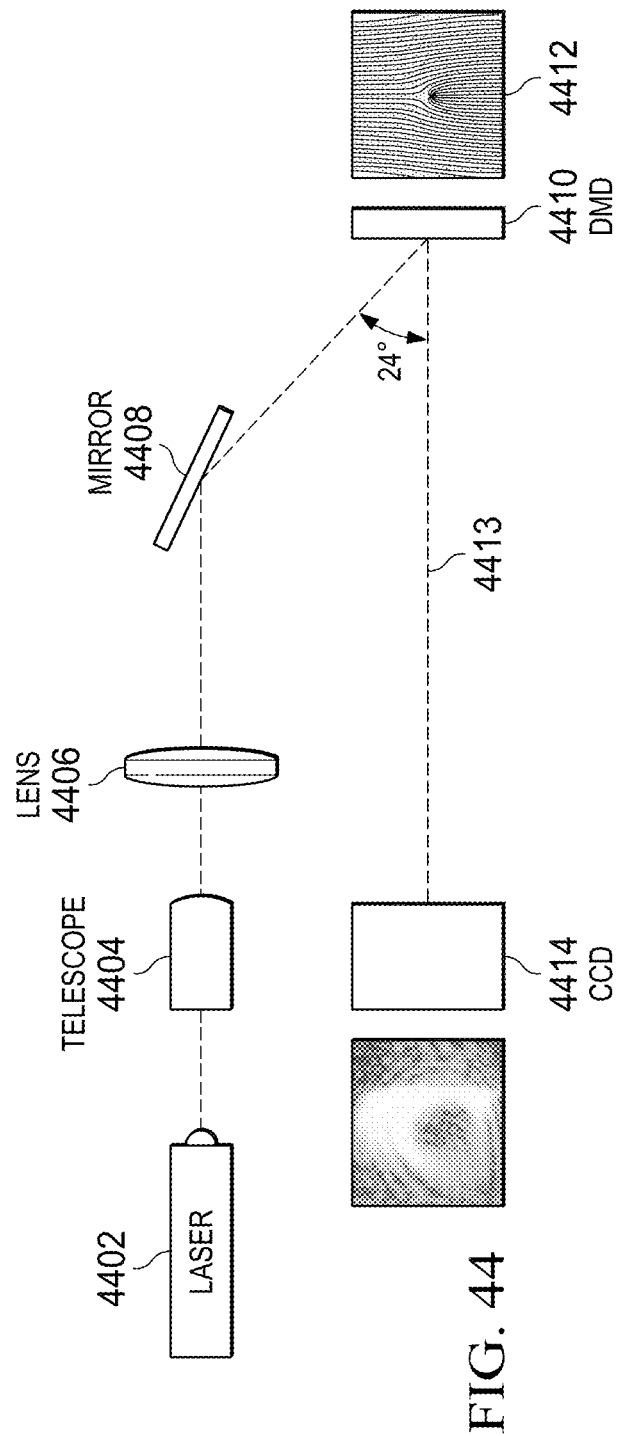
FIG. 44 illustrates circuitry for the generation of an OAM twisted beam using a hologram within a micro-electromechanical device.

Referring now to FIG. 44, there is illustrated a configuration of generation circuitry for the generation of an OAM twisted beam using a hologram within a micro-electrical mechanical device. A laser 4402 generates a beam having a wavelength of approximately 543 nm. This beam is focused through a telescope 4404 and lens 4406 onto a mirror/system of mirrors 4408. The beam is reflected from the mirrors 4408 into a DMD 4410. The DMD 4410 has programmed in to its memory a one or more forked holograms 4412 that generate a desired OAM twisted beam 4413 having any desired information encoded into the OAM modes of the beam that is detected by a CCD 4414. The holograms 4412 are loaded into the memory of the DMD 4410 and displayed as a static image. In the case of 1024×768 DMD array, the images must comprise 1024 by 768 images. The control software of the DMD 4410 converts the holograms into .bmp files. The holograms may be displayed singly or as multiple holograms displayed together in order to multiplex particular OAM modes onto a single beam. The manner of generating the hologram 4412 within the DMD 4410 may be implemented in a number of fashions that provide qualitative differences between the generated OAM beam 4413. Phase and amplitude information may be encoded into a beam by modulating the position and width of a binary amplitude grating used as a hologram. By realizing such holograms on a DMD the creation of HG modes, LG modes, OAM vortex mode or any angular mode may be realized. Furthermore, by performing switching of the generated modes at a very high speed, information may be encoded within the helicity's that are dynamically changing to provide a new type of helicity modulation. Spatial modes may be generated by loading computer-generated holograms onto a DMD. These holograms can be created by modulating a grating function with 20 micro mirrors per each period.

Rather than just generating an OAM beam 4413 having only a single OAM value included therein, multiple OAM values may be multiplexed into the OAM beam in a variety of manners as described herein below. The use of multiple OAM values allows for the incorporation of different information into the light beam. Programmable structured light provided by the DLP allows for the projection of custom and adaptable patterns. These patterns may be programmed into the memory of the DLP and used for imparting different information through the light beam. Furthermore, if these patterns are clocked dynamically a modulation scheme may be created where the information is encoded in the helicities of the structured beams.

Figure 45:
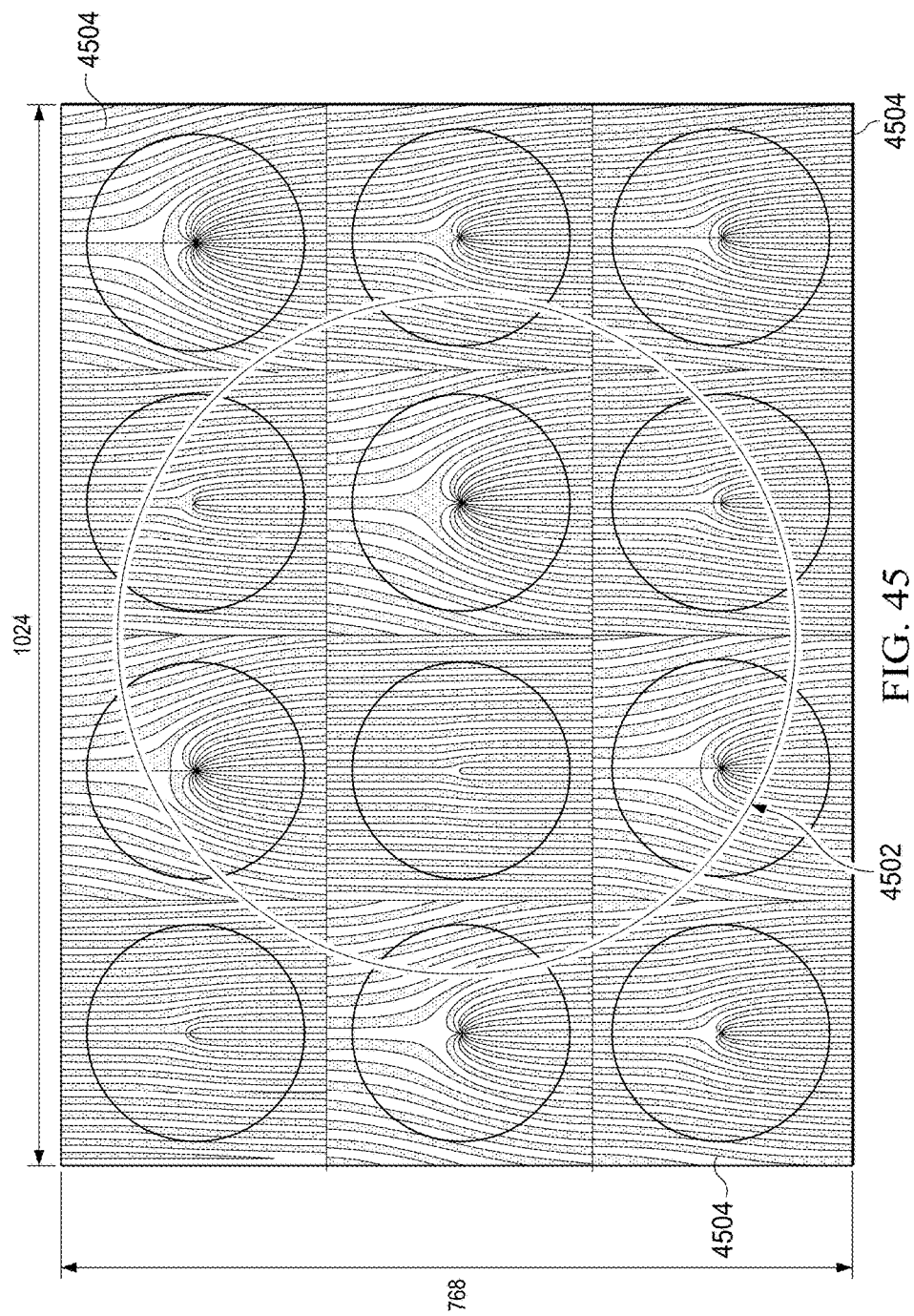
FIG. 45 illustrates multiple holograms generated by a micro-electromechanical device.

Referring now to FIG. 45, rather than just having the laser beam 4502 shine on a single hologram multiple holograms 4504 may be generated by the DMD 4410. FIG. 45 illustrates an implementation wherein a 4×3 array of holograms 4504 are generated by the DMD 4410. The holograms 4504 are square and each edge of a hologram lines up with an edge of an adjacent hologram to create the 4×3 array. The OAM values provided by each of the holograms 4504 are multiplexed together by shining the beam 4502 onto the array of holograms 4504. Several configurations of the holograms 4504 may be used in order to provide differing qualities of the OAM beam 4413 and associated modes generated by passing a light beam through the array of holograms 4504.

Figure 46:
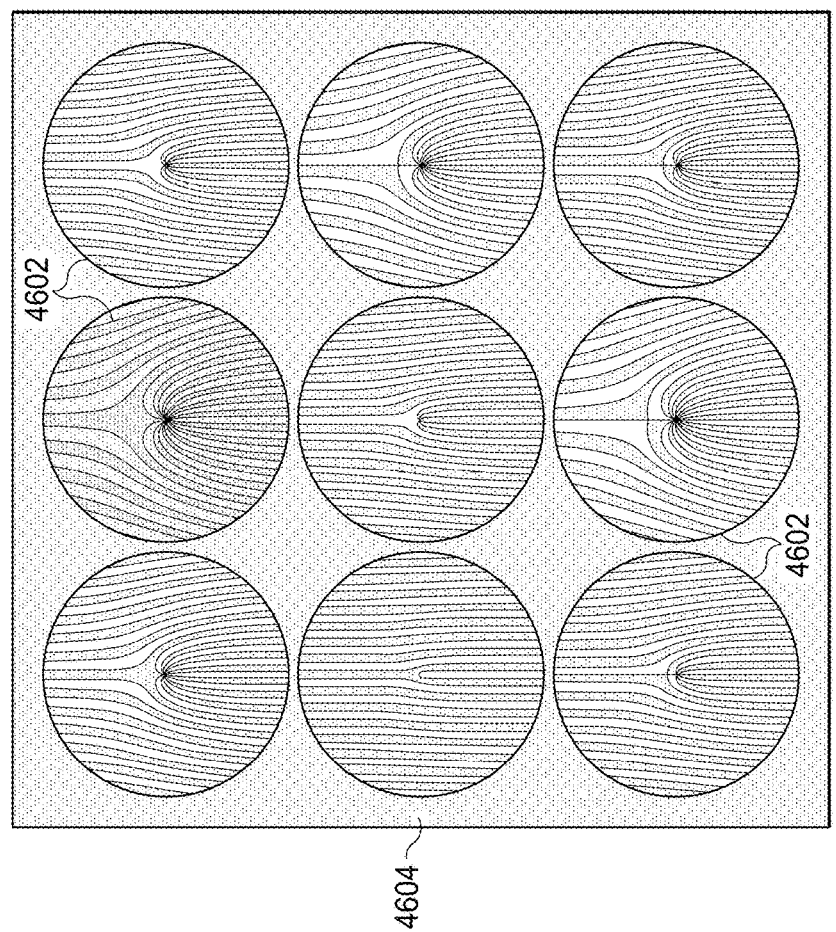
FIG. 46 illustrates a square array of holograms on a dark background.
Figure 47:
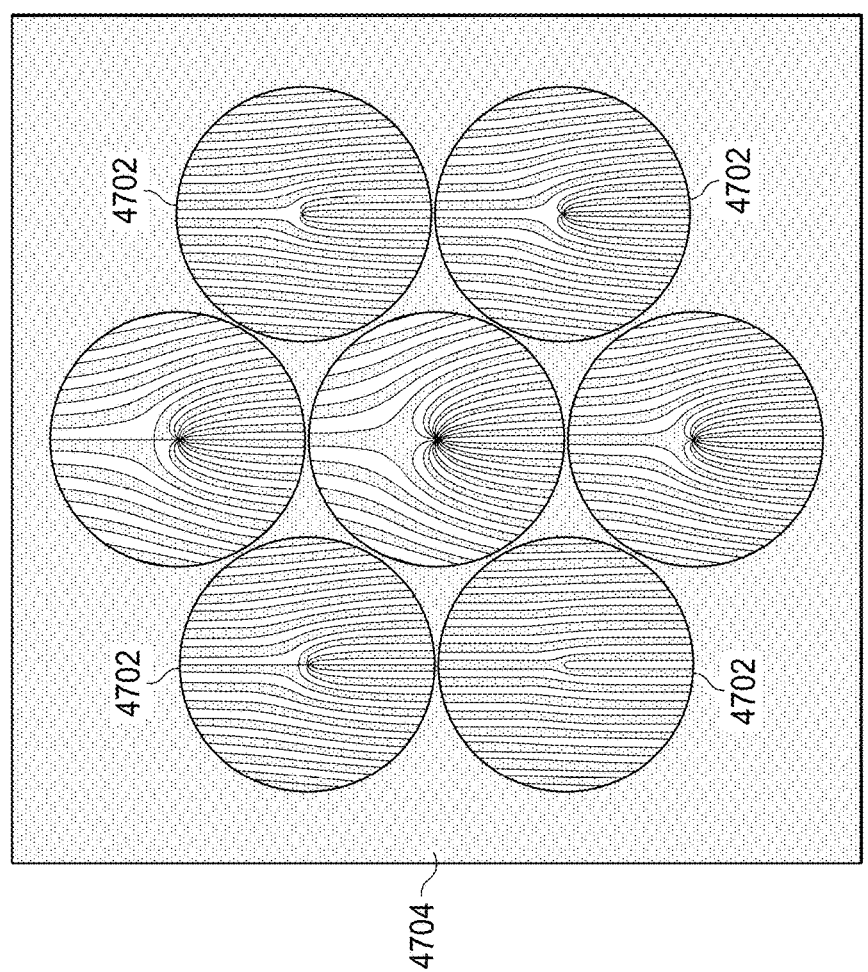
FIG. 47 illustrates a hexagonal array of holograms on a dark background.

Referring now to FIG. 46 there is illustrated an alternative way of multiplexing various OAM modes together. An X by Y array of holograms 4602 has each of the hologram 4602 placed upon a black (dark) background 4604 in order to segregate the various modes from each other. In another configuration illustrated in FIG. 47, the holograms 4702 are placed in a hexagonal configuration with the background in the off (black) state in order to better segregate the modes.

Figure 48:
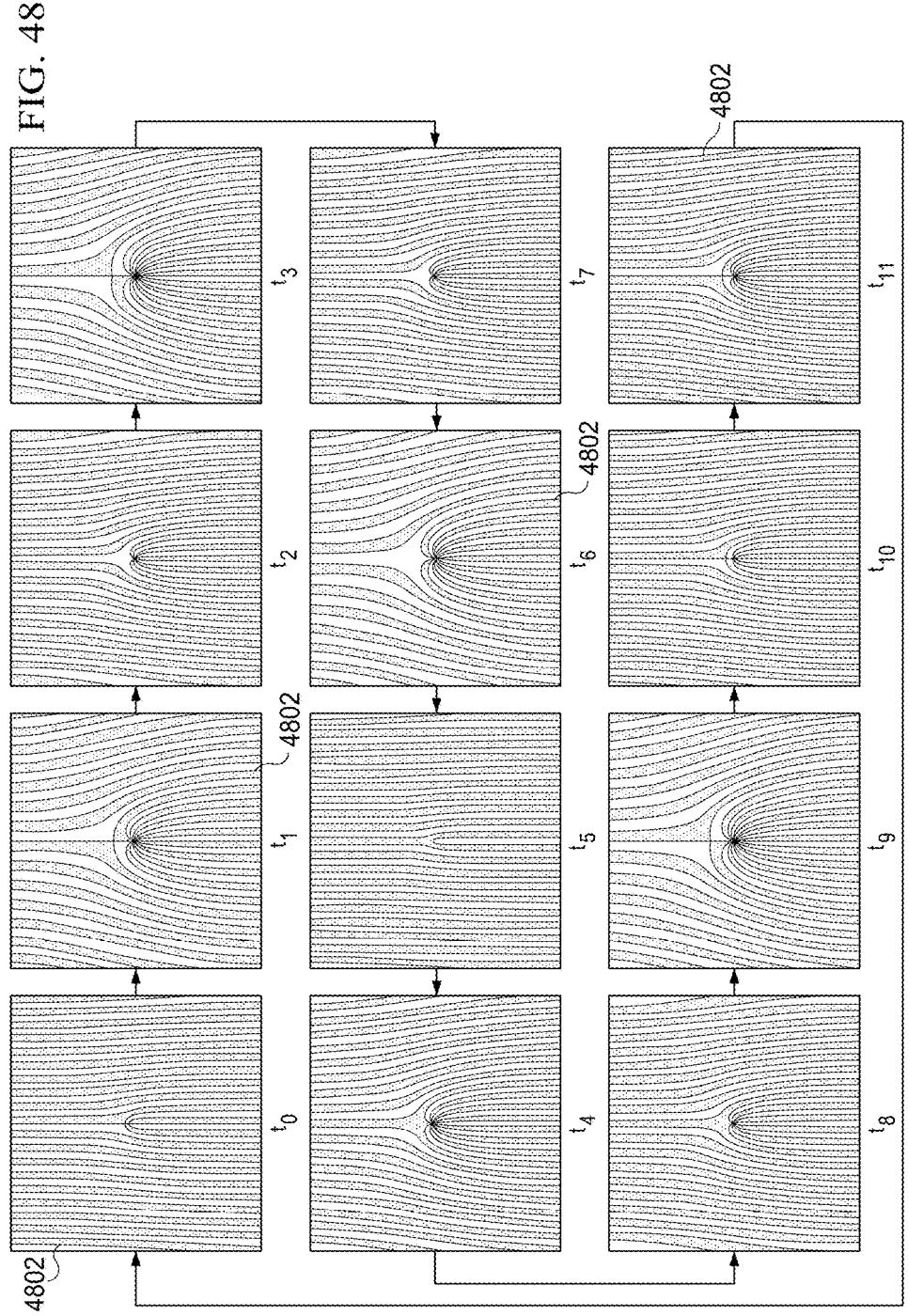
FIG. 48 illustrates a process for multiplexing various OAM modes together.

FIG. 48 illustrates yet another technique for multiplexing multiple OAM modes together wherein the holograms 4802 are cycled through in a loop sequence by the DMD 4410. In this example modes $T_0$-$T_{11}$ are cycled through and the process repeats by returning back to mode $T_0$. This process repeats in a continuous loop in order to provide an OAM twisted beam with each of the modes multiplex therein.

Figure 49:
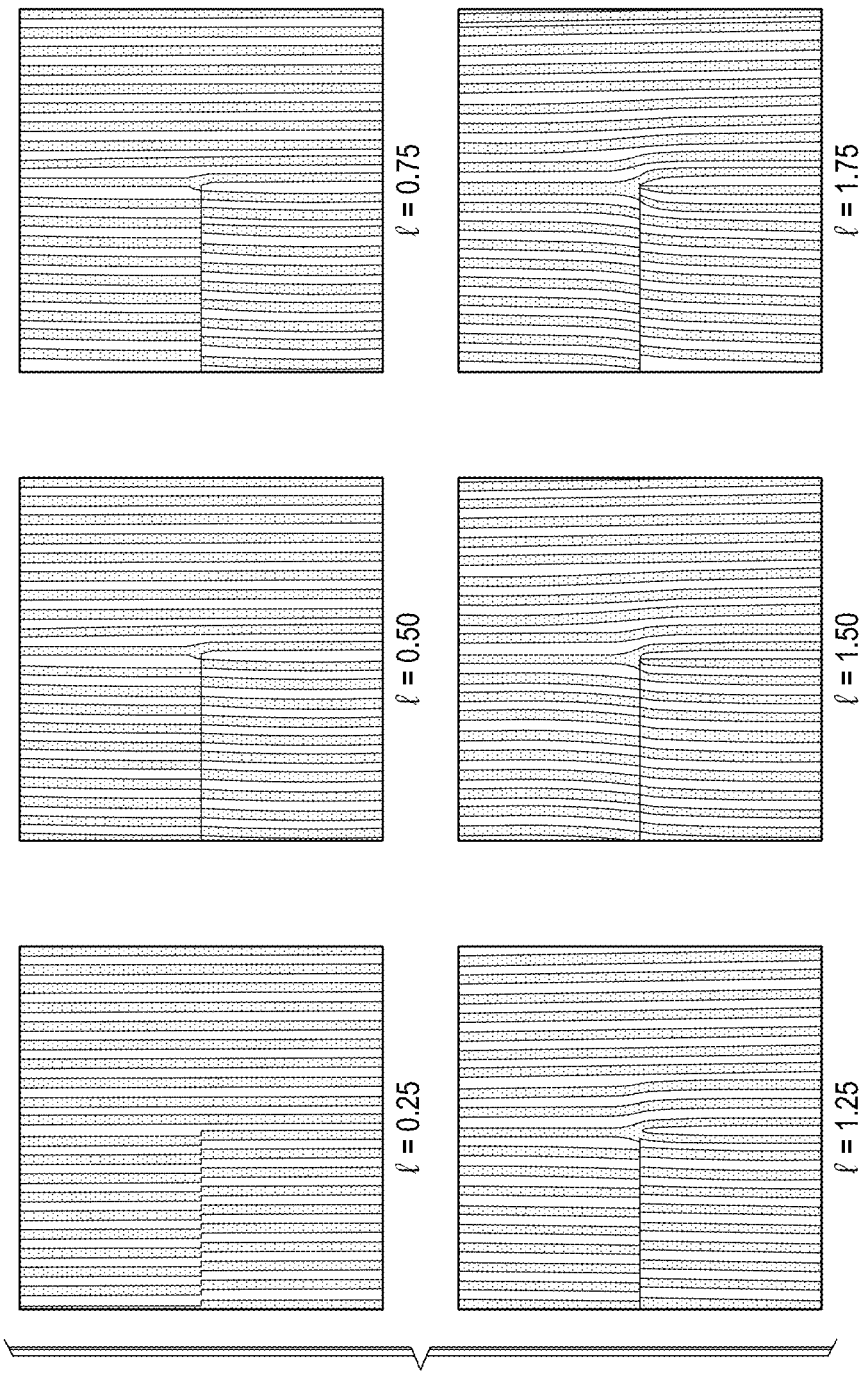
FIG. 49 illustrates fractional binary fork holograms.

In addition to providing integer OAM modes using holograms within the DMD, fractional OAM modes may also be presented by the DMD using fractional binary forks as illustrated in FIG. 49. FIG. 49 illustrates fractional binary forks for generating fractional OAM modes of 0.25, 0.50, 0.75, 1.25, 1.50 and 1.75 with a light beam.

Figure 50:
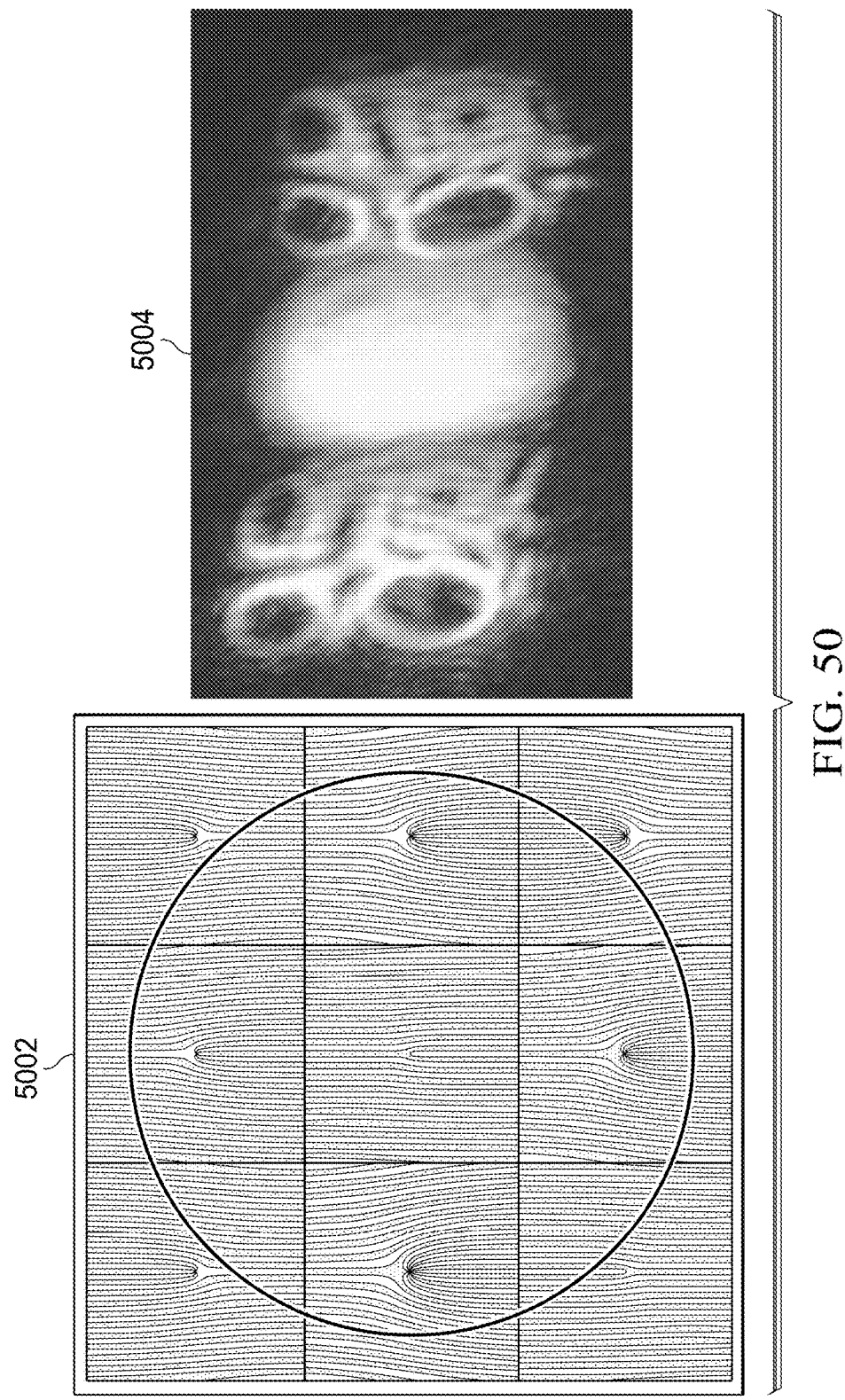
FIG. 50 illustrates an array of square holograms with no separation on a light background and associated generated OAM mode image.
Figure 51:
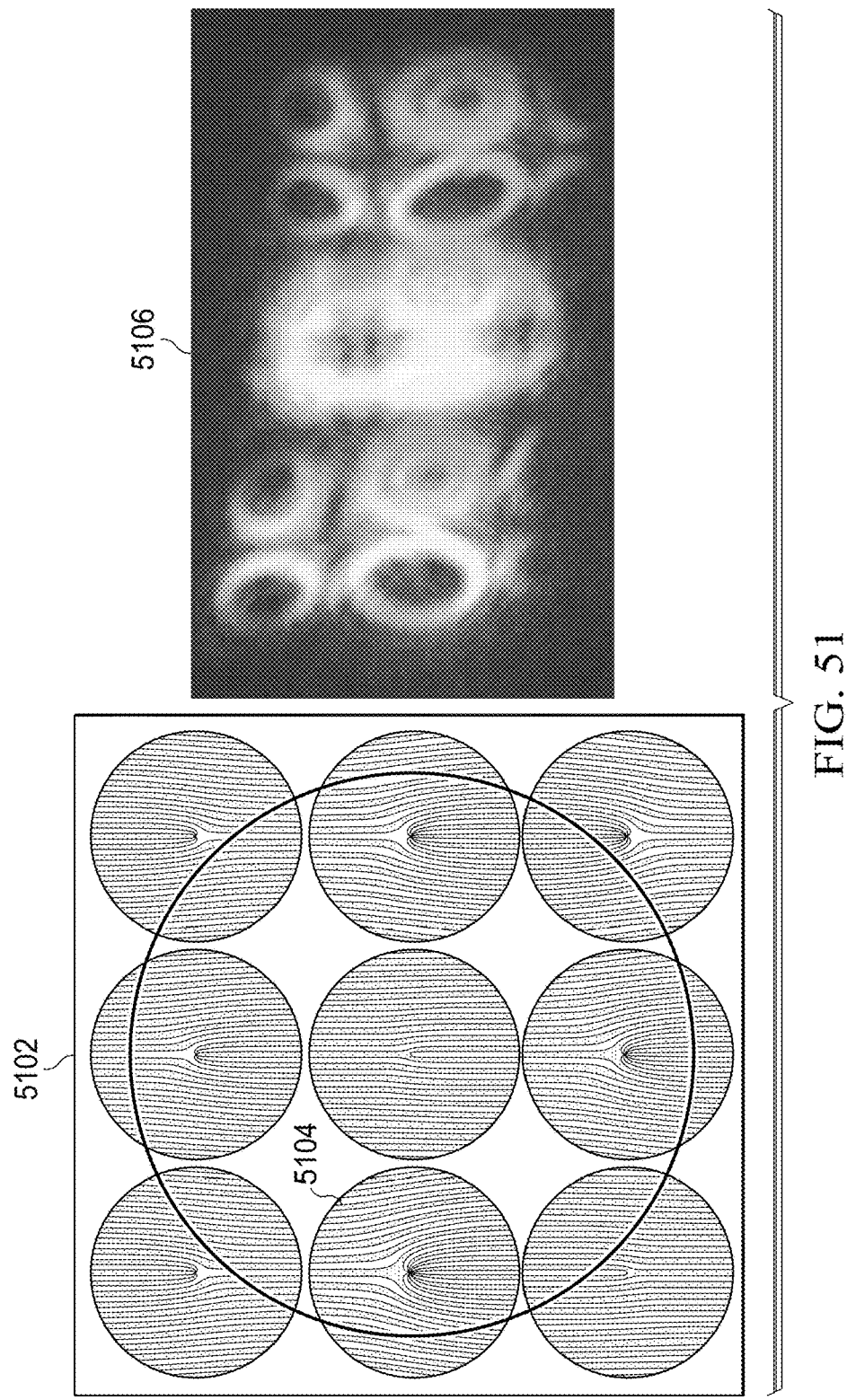
FIG. 51 illustrates an array of circular holograms separated on a light background and associated generated OAM mode image.

Referring now to FIG. 50-63, there are illustrated the results achieved from various configurations of holograms program within the memory of a DMD. FIG. 50 illustrates the configuration at 5002 having no hologram separation on a white background producing the OAM mode image 5004. FIG. 51 uses a configuration 5102 consisting of circular holograms 5004 having separation on a white background. The OAM mode image 5006 that is provided therefrom is also illustrated. Bright mode separation yields less light and better mode separation.

Figure 52:
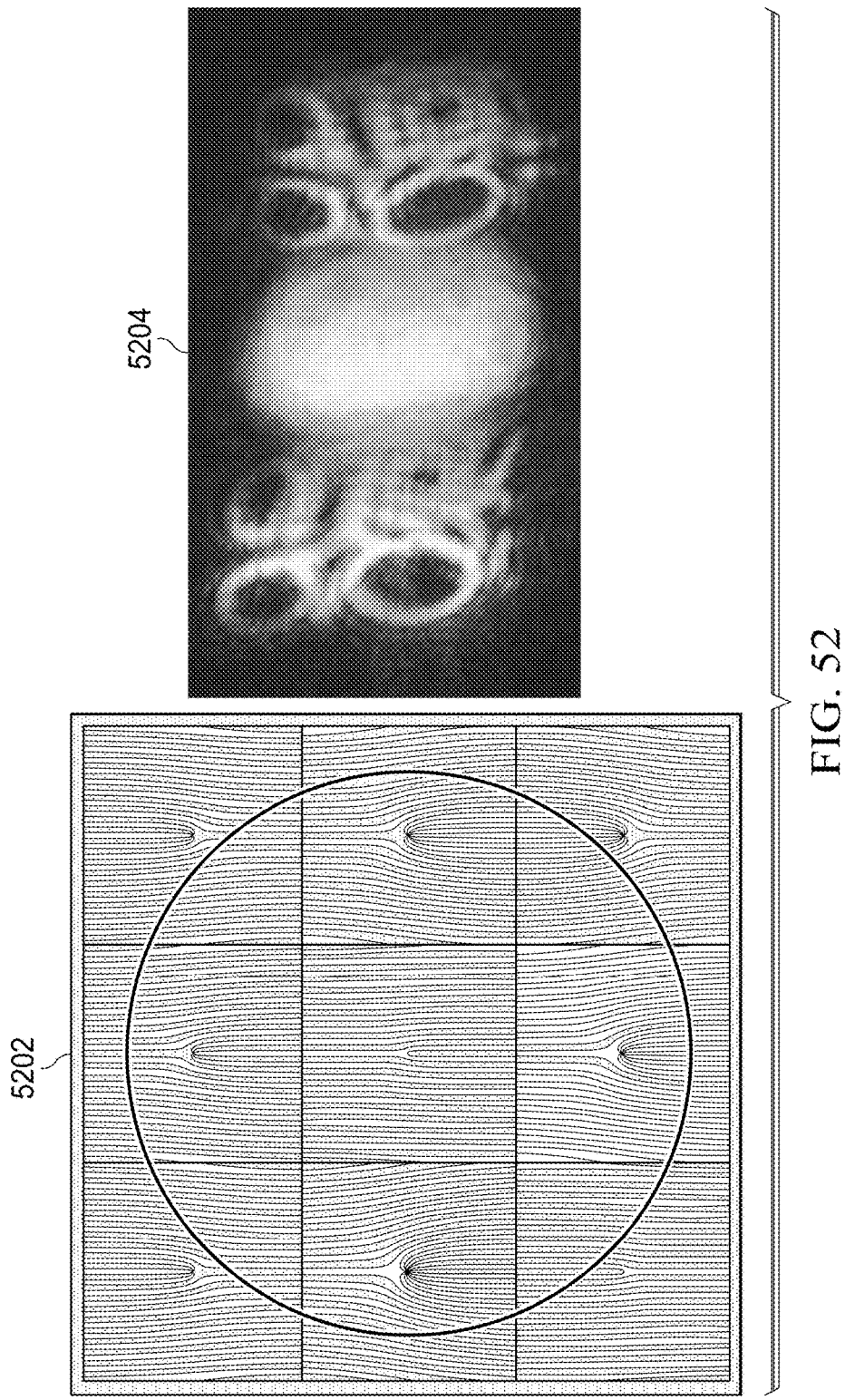
FIG. 52 illustrates an array of square holograms with no separation on a dark background and associated generated OAM mode image.
Figure 53:
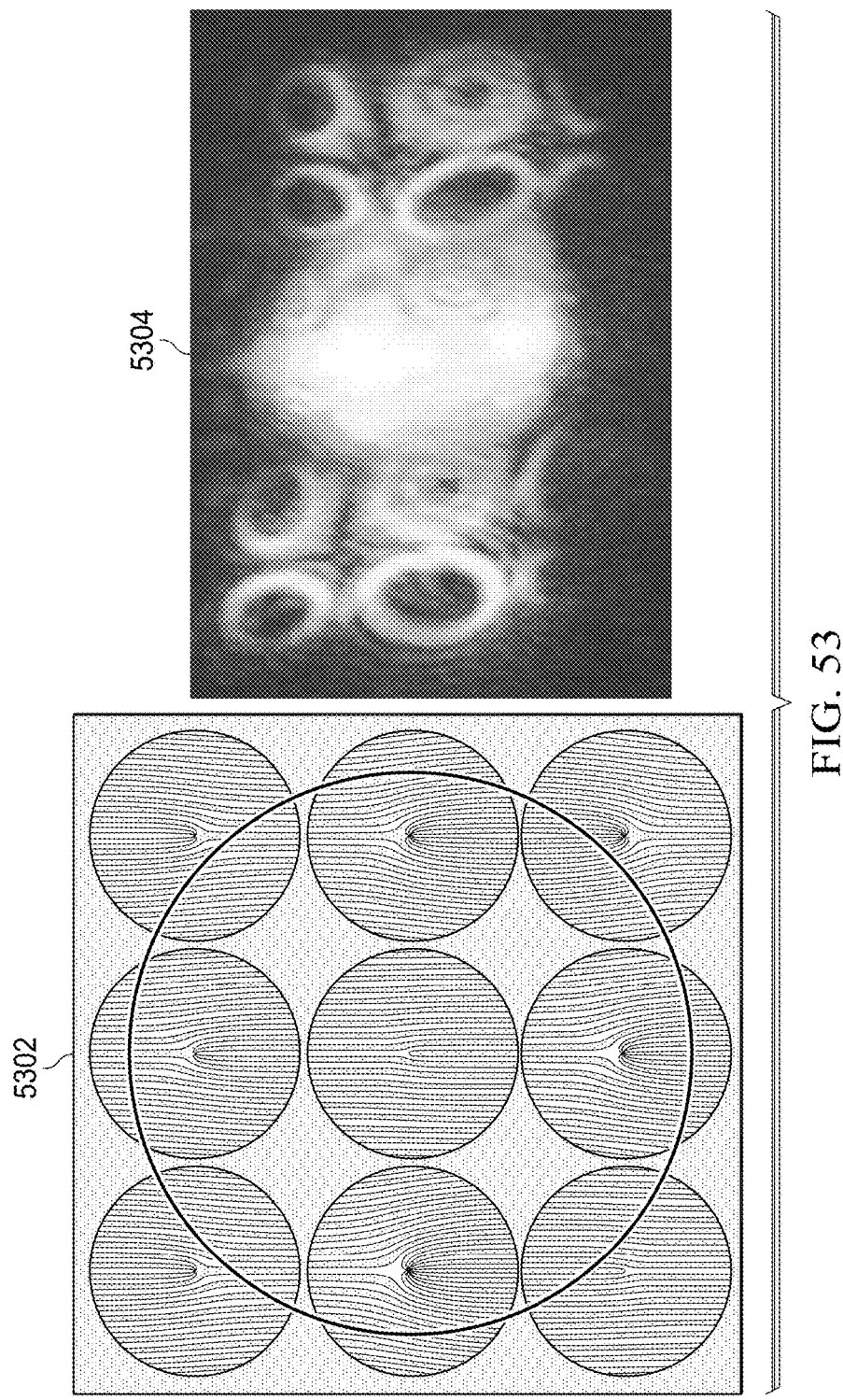
FIG. 53 illustrates an array of circular holograms on a dark background and associated generated OAM mode image.

FIG. 52 illustrates a configuration 5202 having square holograms with no separation on a black background. The configuration 5202 generates the OAM mode image 5204. FIG. 53 illustrates the configuration of circular holograms (radius ~256 pixels) that are separated on a black background. This yields the OAM mode image 5304. Dark mode separation yields more light in the OAM image 5304 and has slightly better mode separation.

Figure 54:
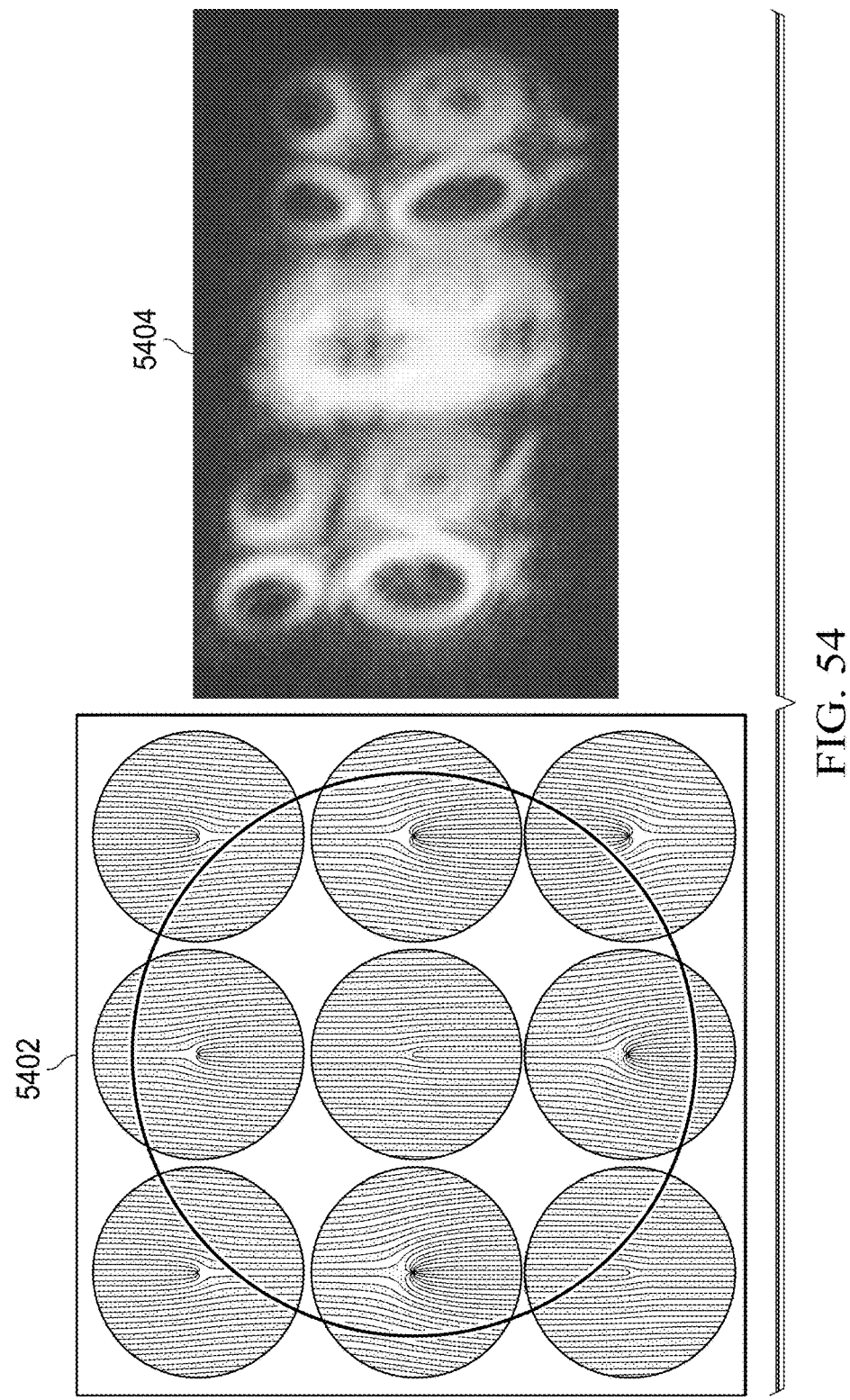
FIG. 54 illustrates circular holograms with separation on a bright background and associated generated OAM mode image.
Figure 55:
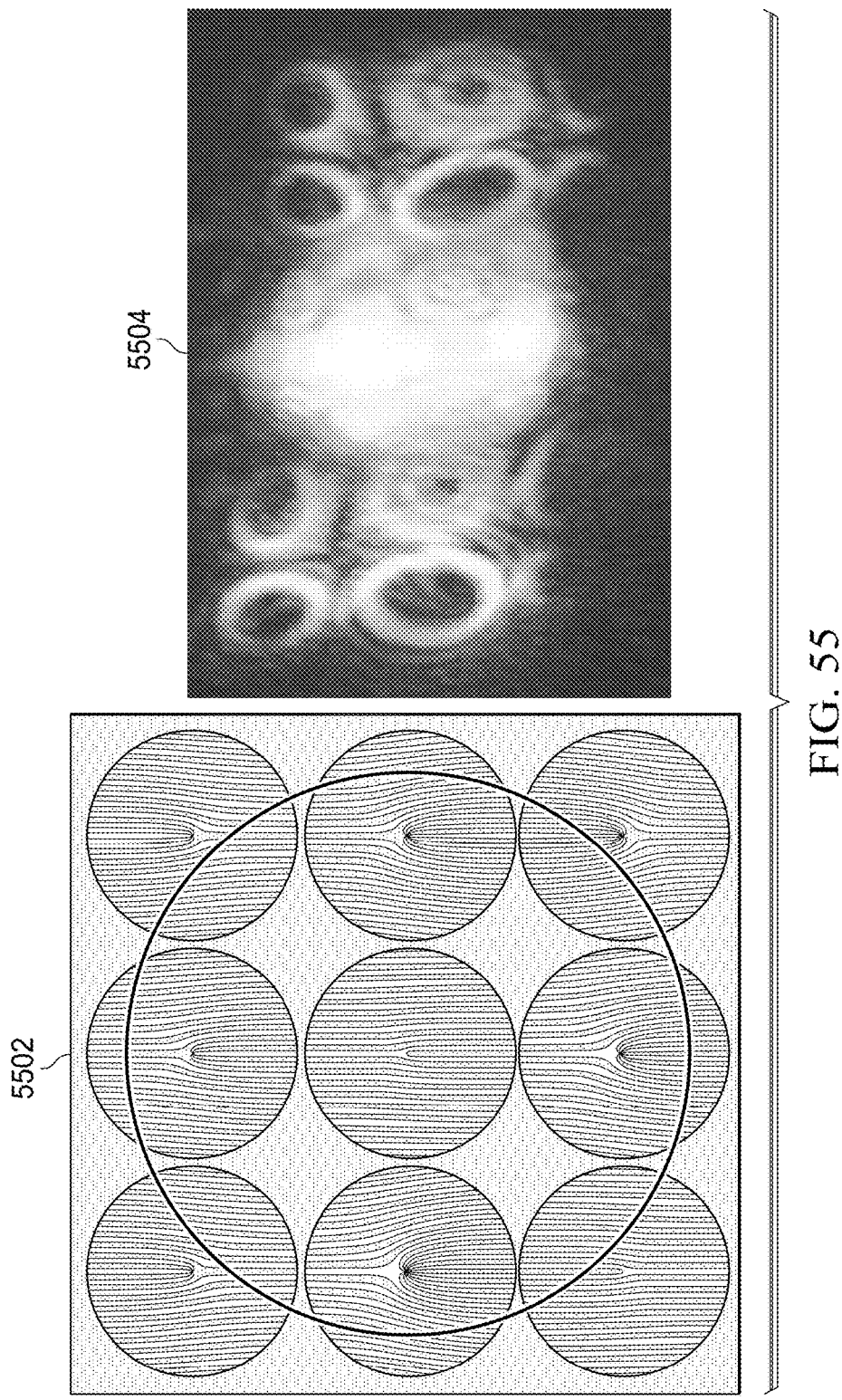
FIG. 55 illustrates circular holograms with separation on a dark background and associated generated OAM mode image.

FIG. 54 illustrates a configuration 5402 having a bright background and circular hologram (radius ~256 pixels) separation yielding an OAM mode image 5404. FIG. 55 illustrates a configuration 5502 using circular holograms (radius ~256 pixels) having separation on a black background to yield the OAM mode image 5504. The dark mode separation yields more light and has a slightly worse mode separation within the OAM mode images.

Figure 56:
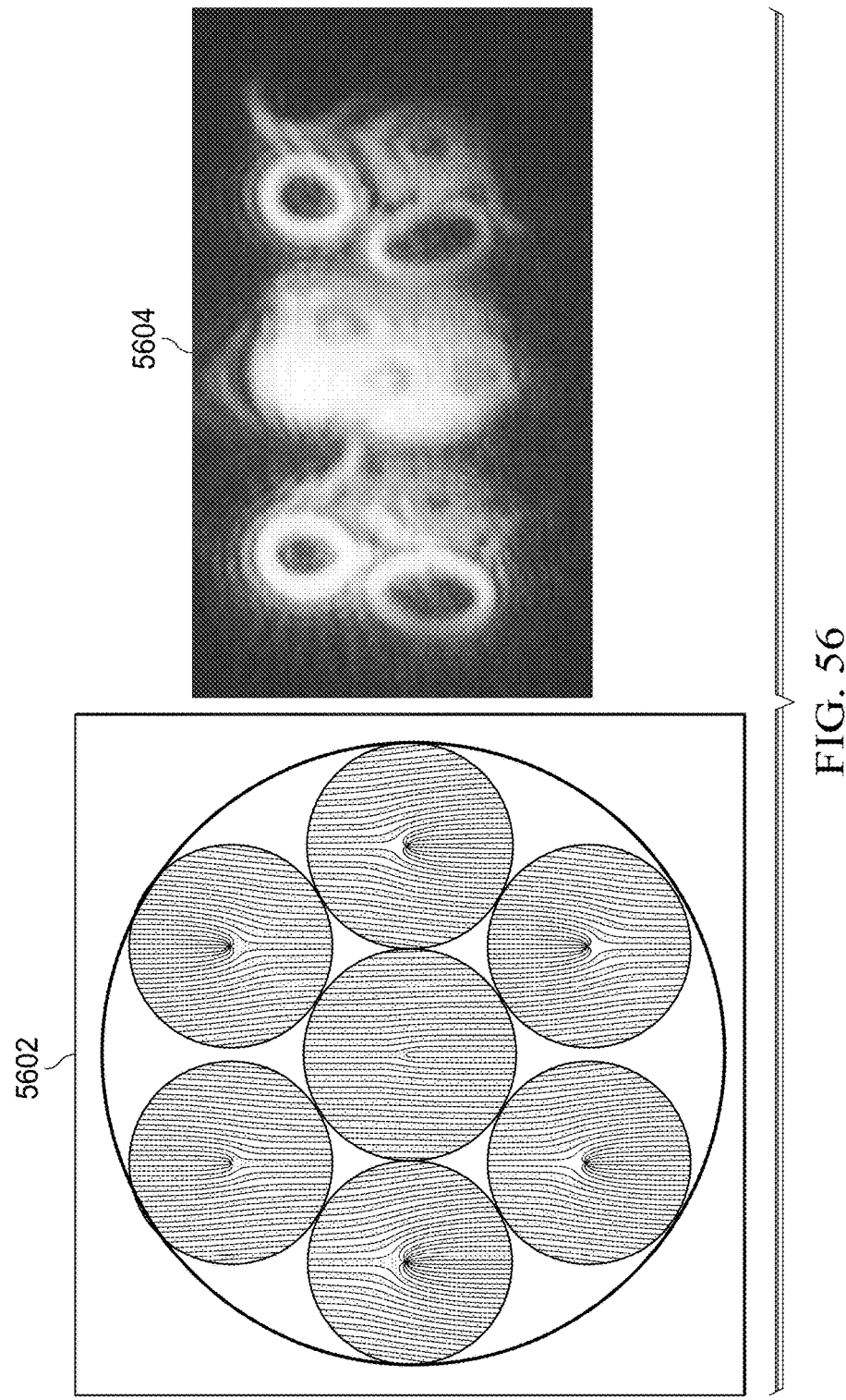
FIG. 56 illustrates a hexagonal array of circular holograms on a bright background and associated OAM mode image.
Figure 57:
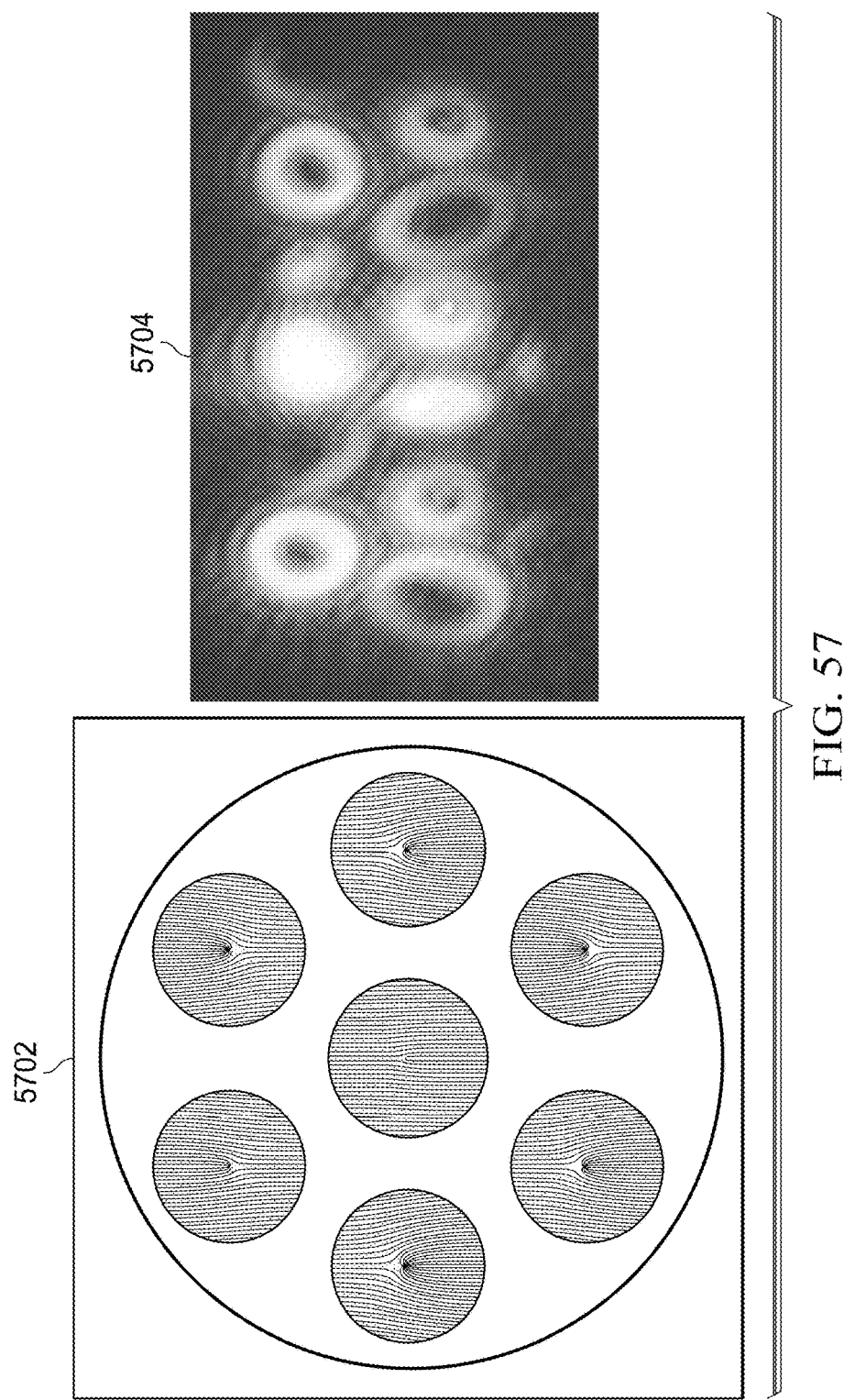
FIG. 57 illustrates an hexagonal array of small holograms on a bright background and associated OAM mode image.

FIG. 56 illustrates a configuration 5602 including circular holograms (radius ~256 pixels) in a hexagonal distribution on a bright background yielding an OAM mode image 5604. FIG. 57 illustrates at 5702 small circular holograms (radius ~256 pixels) in a hexagonal distribution on a bright background that yields and OAM mode image 5704. The larger holograms with brighter backgrounds yield better OAM mode separation images.

Figure 58:
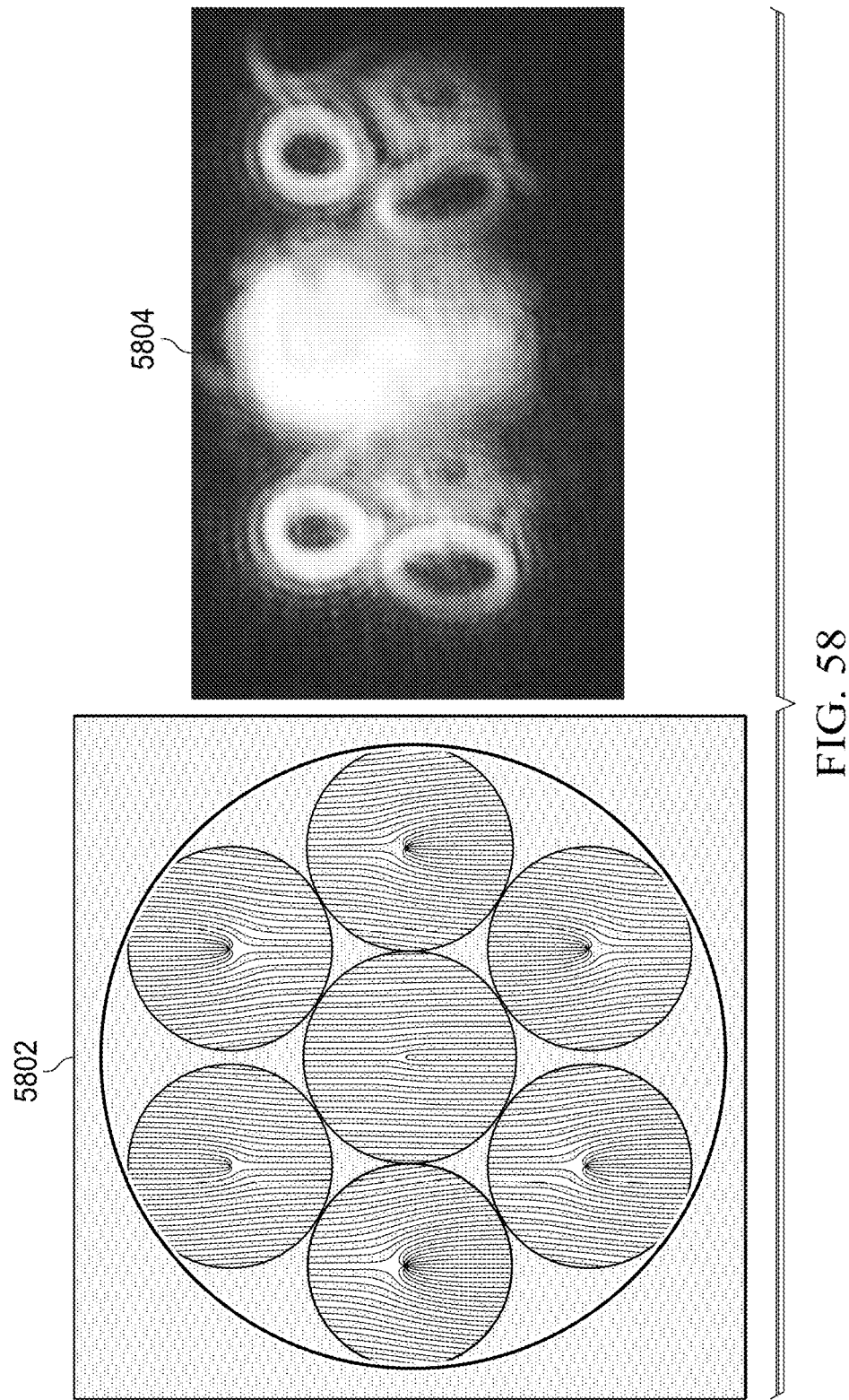
FIG. 58 illustrates a hexagonal array of circular holograms on a dark background and associated OAM mode image.
Figure 59:
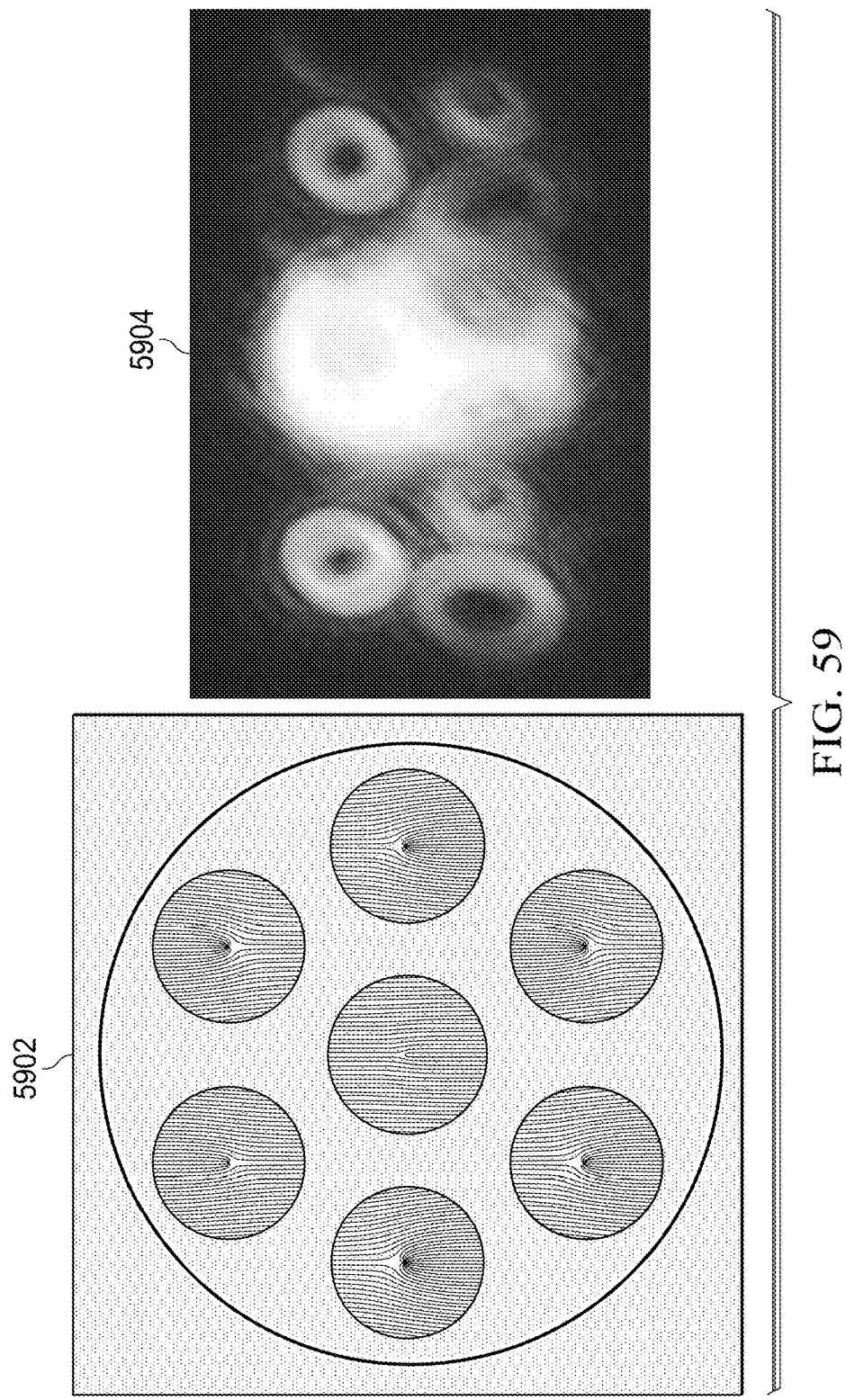
FIG. 59 illustrates a hexagonal array of small holograms on a dark background and associated OAM mode image.

Referring now to FIG. 58, there is illustrated a configuration 5802 of circular holograms (radius ~256 pixels) in a hexagonal distribution on a dark background with each of the holograms having a radius of approximately 256 pixels. This configuration 5802 yields the OAM mode image 5804. FIG. 59 illustrates the use of small holograms (radius ~256 pixels) having a radius of approximately 190 pixels arranged in a hexagonal distribution on a black background that yields the OAM mode image 5904. Larger holograms (radius of approximately 256 pixels) having a dark background yields worse OAM mode separation within the OAM mode images.

Figure 60:
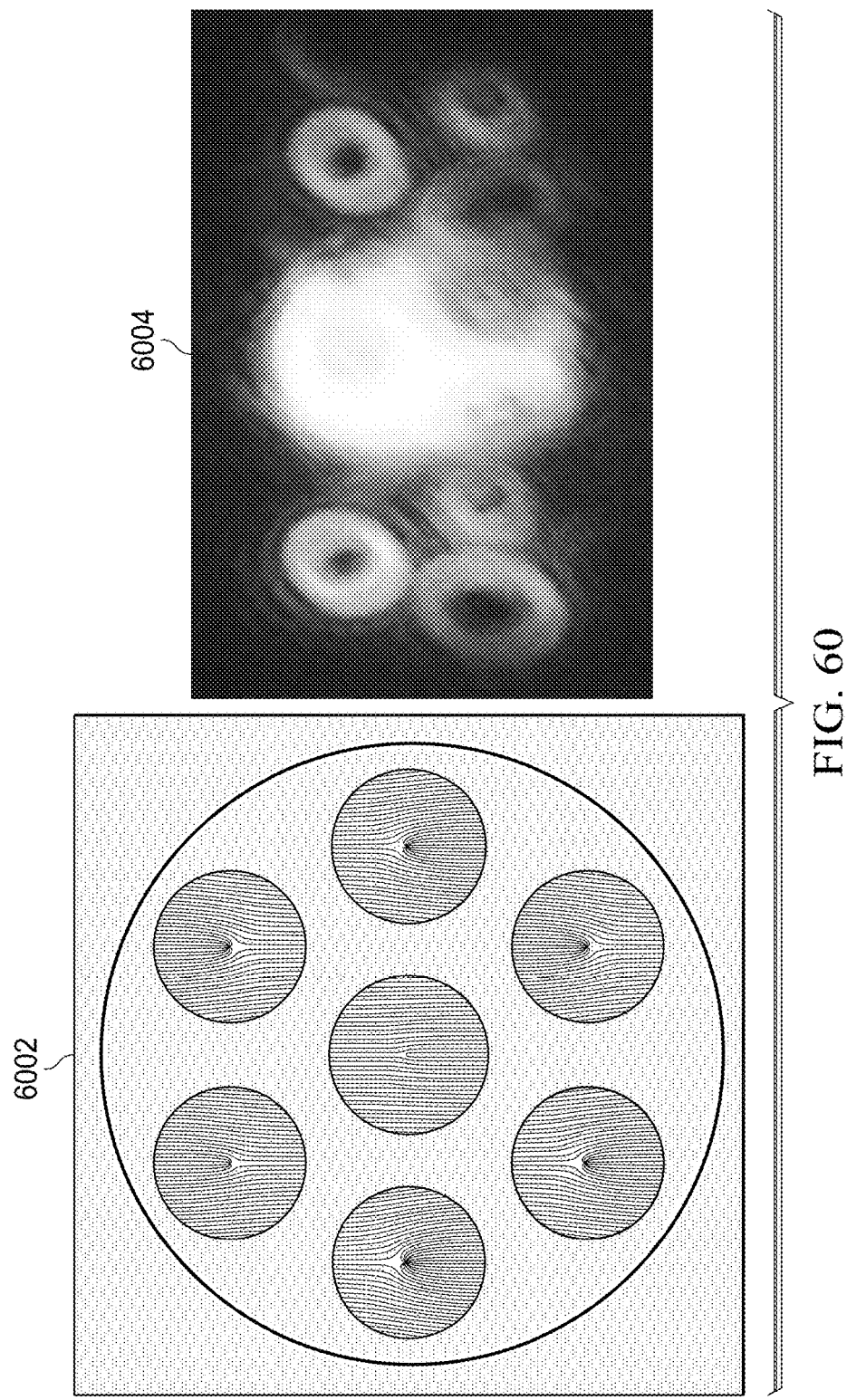
FIG. 60 illustrates a hexagonal array of small holograms separated on a dark background and associated OAM mode image.
Figure 61:
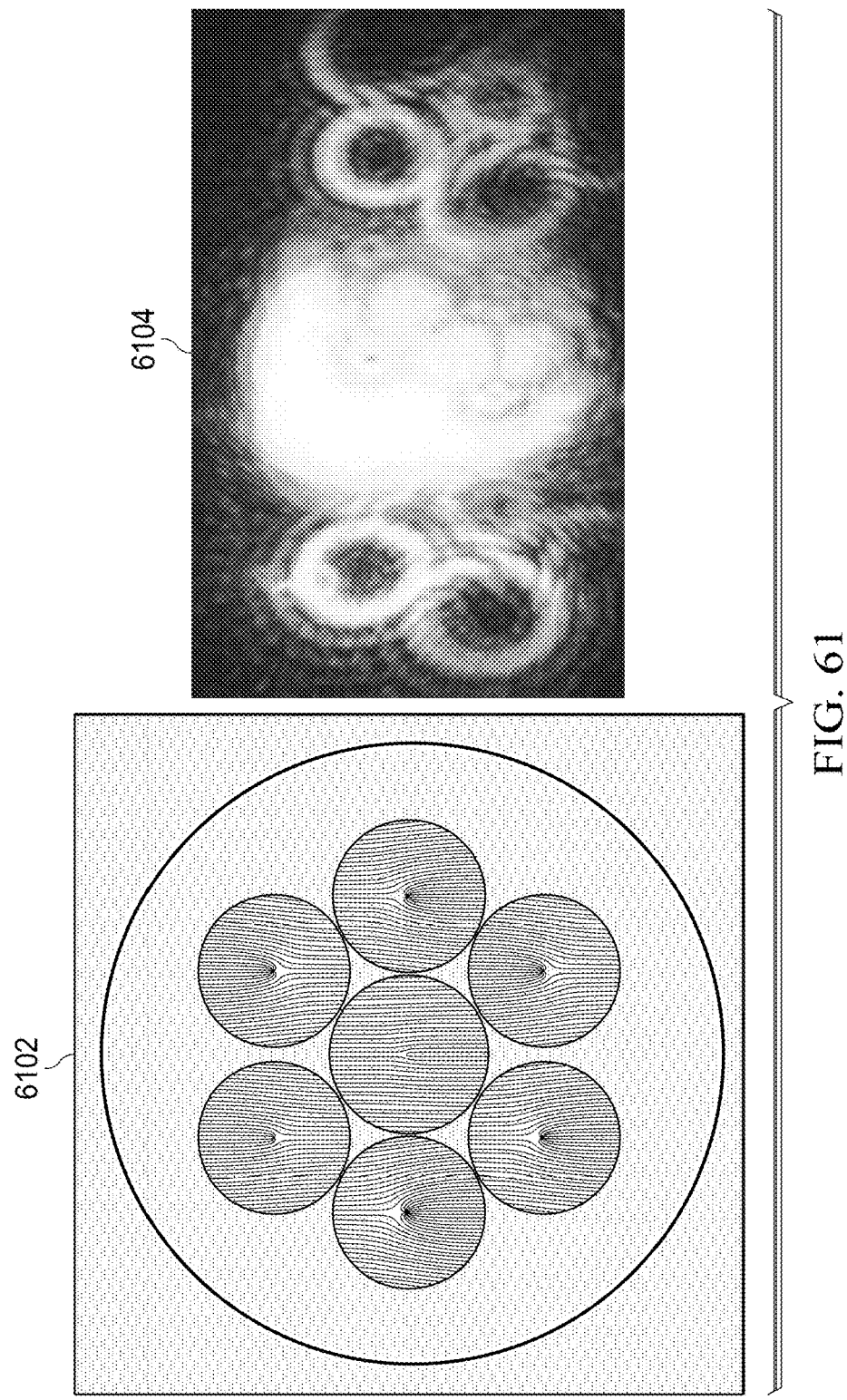
FIG. 61 illustrates a hexagonal array of small holograms closely located on a dark background and associated OAM mode image.

FIG. 60 illustrates a configuration 6002 of small holograms (radius of approximately 190 pixels) in a hexagonal separated distribution on a dark background that yields the OAM mode image 6004. FIG. 61 illustrates a configuration 6102 of small holograms (radius ~256 pixels) in a hexagonal distribution that are close together on a dark background that yields the OAM mode image 6104. The larger dark boundaries (FIG. 60) yield worse OAM mode image separation than a smaller dark boundary.

Figure 62:
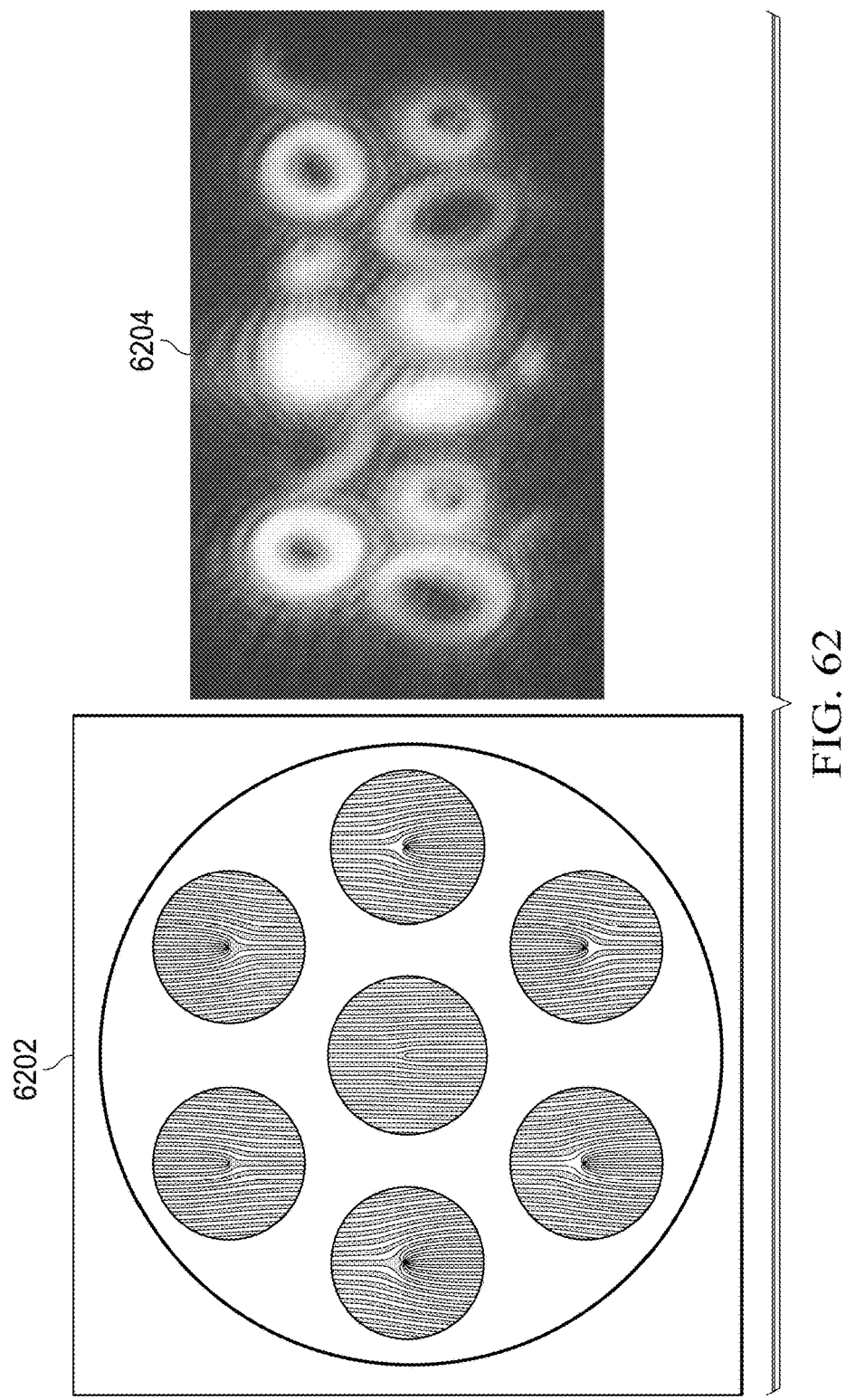
FIG. 62 illustrates a hexagonal array of small holograms that are separated on a bright background and associated OAM mode image.
Figure 63:
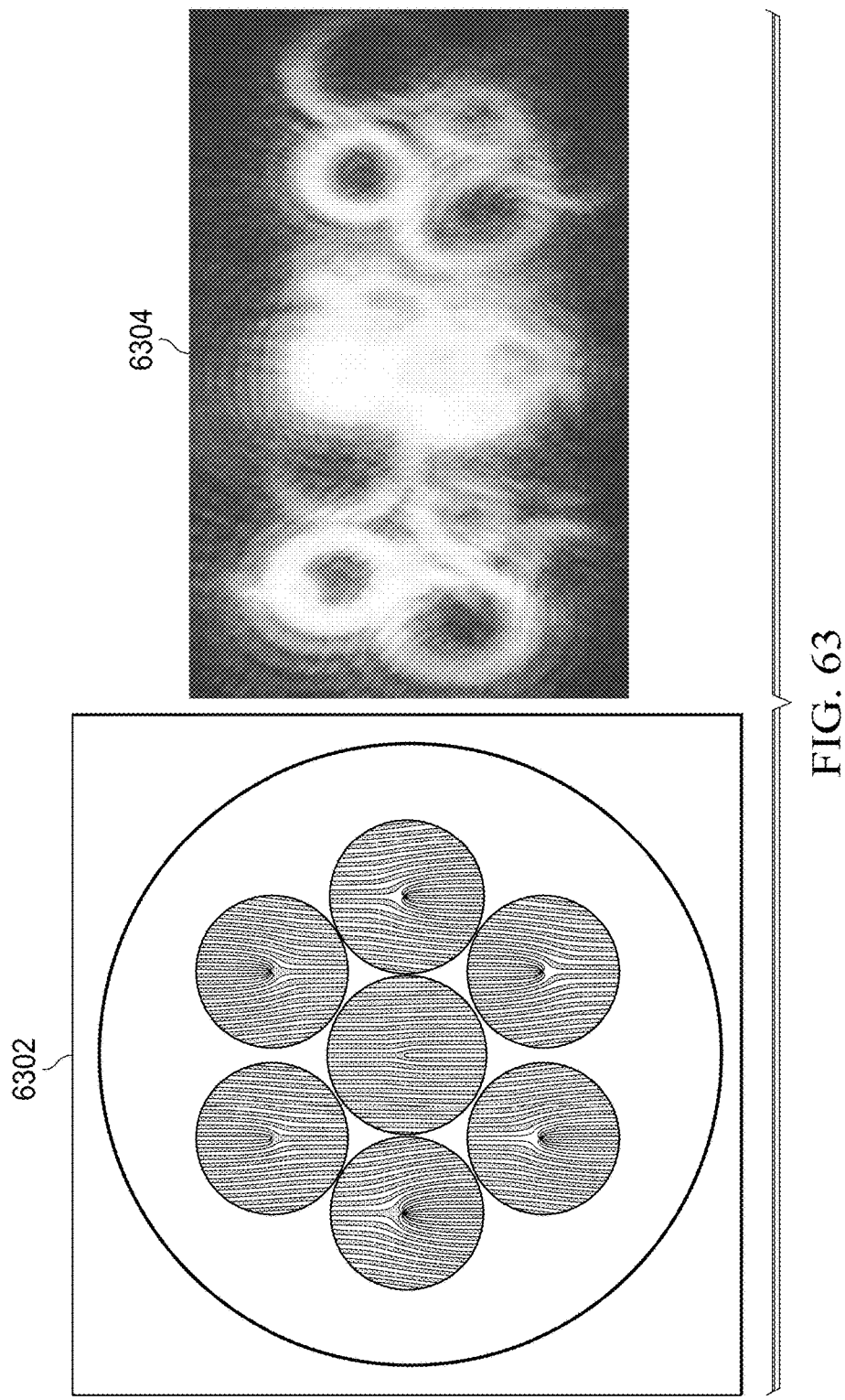
FIG. 63 illustrates a hexagonal array of small holograms that are closely located on a bright background and associated OAM mode image.

FIG. 62 illustrates a configuration 6202 of small holograms (radius ~256 pixels) in a separated hexagonal configuration on a bright background yielding OAM mode image 6204. FIG. 63 illustrates a configuration 6302 of small holograms (radius ~256 pixels) more closely spaced in a hexagonal configuration on a bright background yielding OAM mode image 6304. The larger bright boundaries (FIG. 62) yield a better OAM mode separation.

Figure 64:
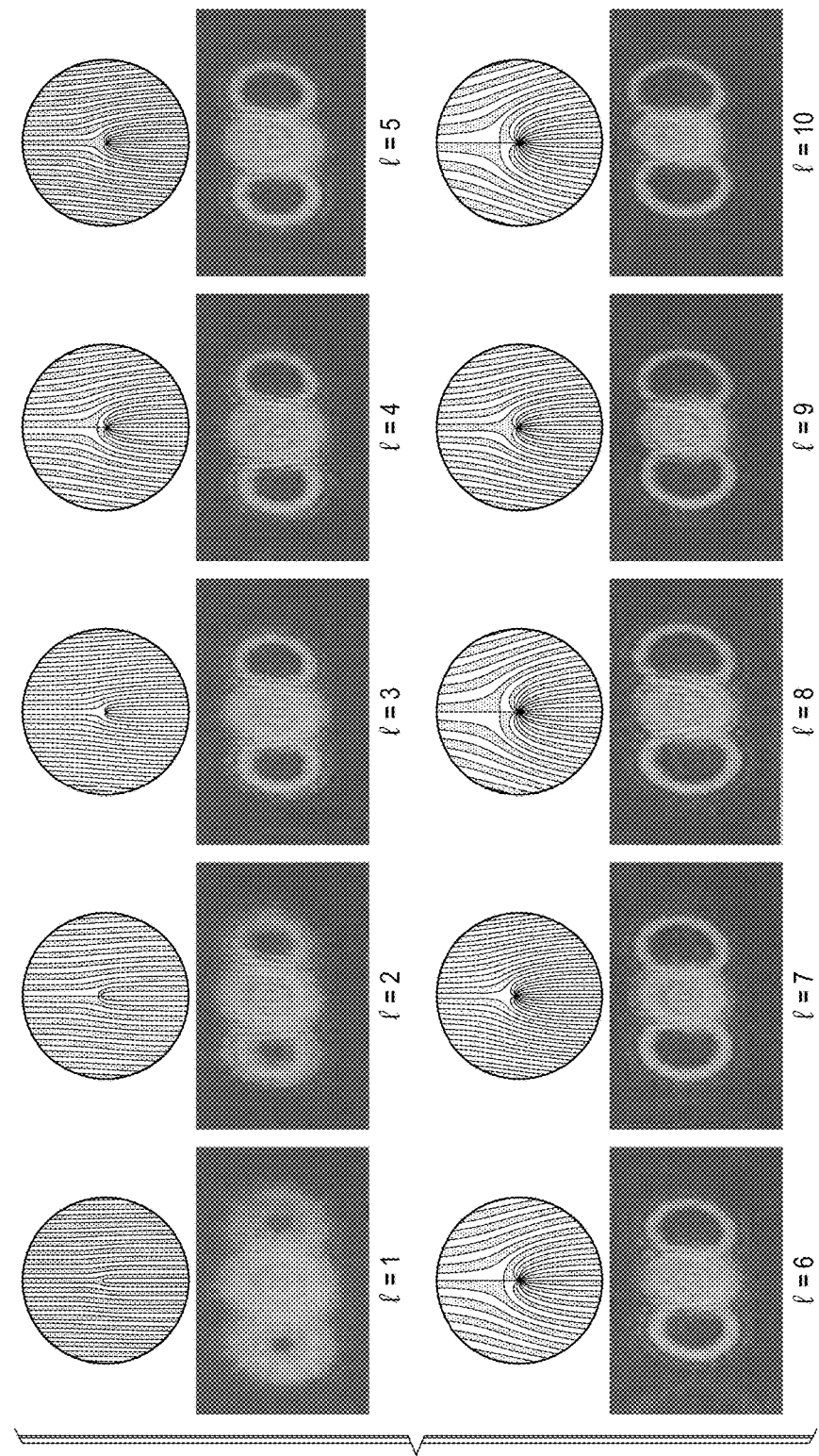
FIG. 64 illustrates reduced binary holograms having a radius equal to 100 micro-mirrors and a period of 50 for various OAM modes.
Figure 65:
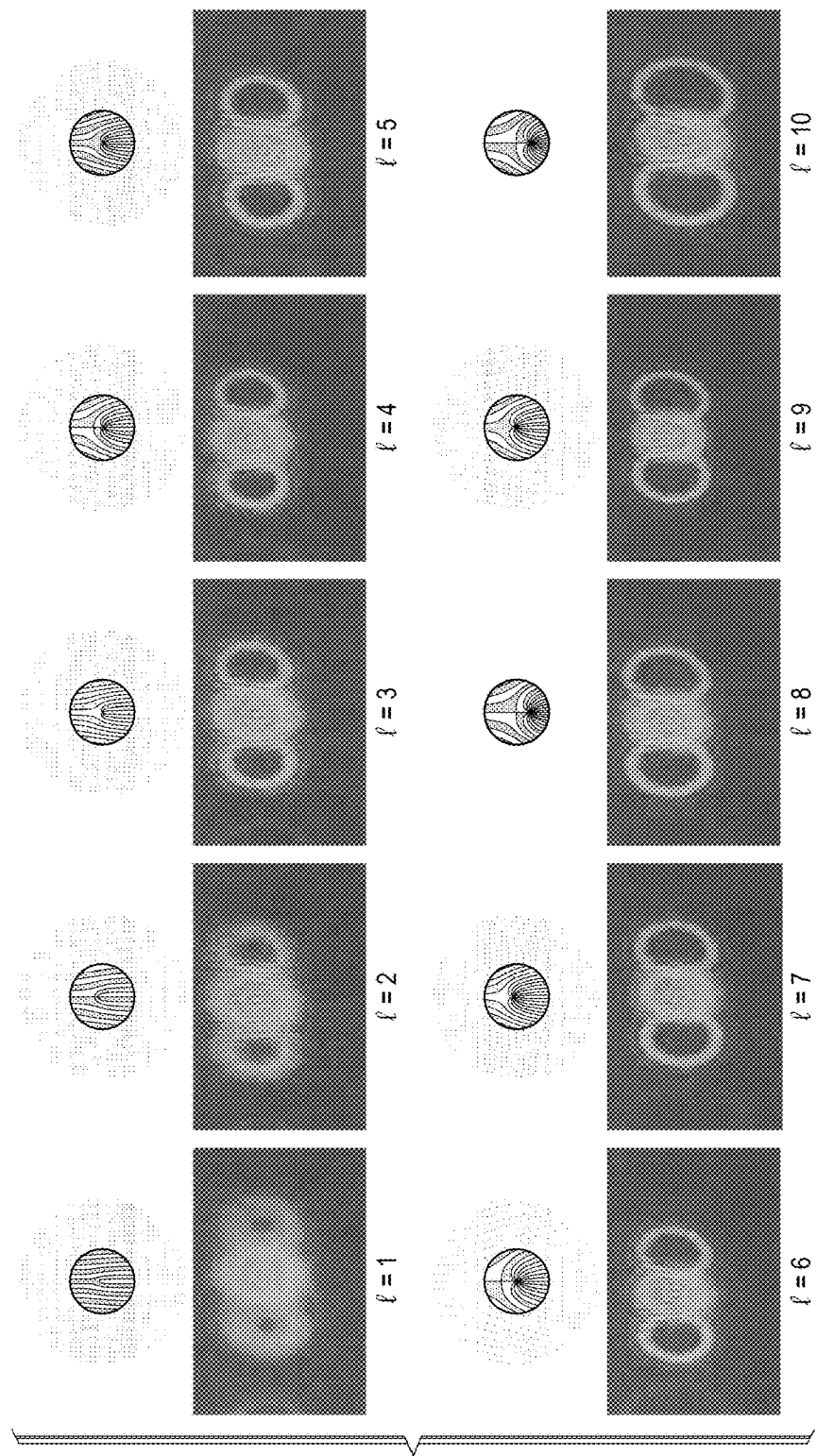
FIG. 65 illustrates OAM modes for holograms having a radius of 50 micro-mirrors and a period of 50.
Figure 66:
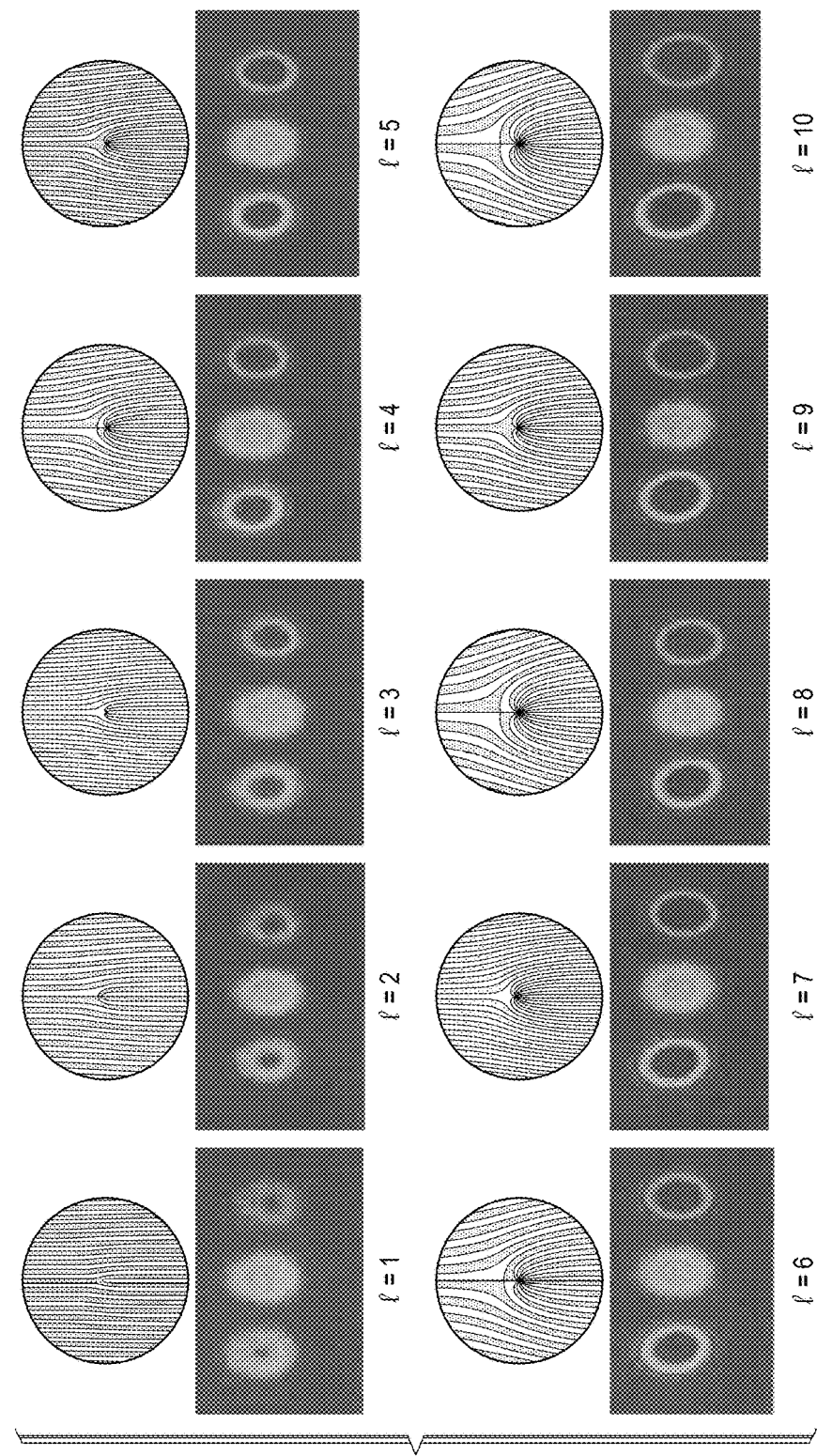
FIG. 66 illustrates OAM modes for holograms having a radius of 100 micro-mirrors and a period of 100.
Figure 67:
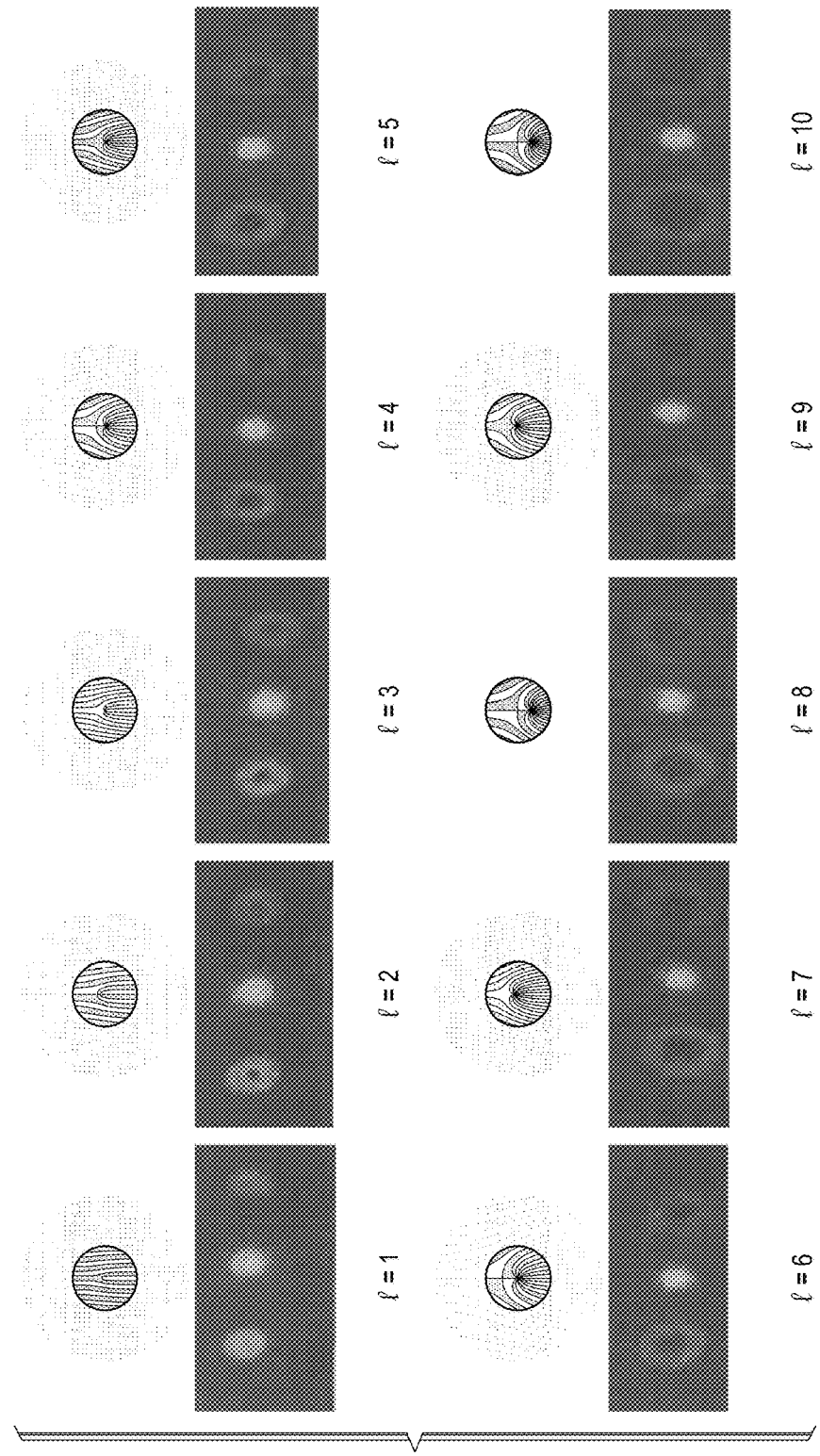
FIG. 67 illustrates OAM modes for holograms having a radius of 50 micro-mirrors and a period of 50.

Additional illustrations of holograms, namely reduced binary holograms are illustrated in FIGS. 64-67. FIG. 64 illustrates reduced binary holograms having a radius equal to 100 micro mirrors and a period of 50 for various OAM modes. Similarly, OAM modes are illustrated for reduced binary for holograms having a radius of 50 micro mirrors and a period of 50 (FIG. 65); a radius of 100 micro mirrors and a period of 100 (FIG. 66) and a radius of 50 micro mirrors and a period of 50 (FIG. 67).

The illustrated data with respect to the holograms of FIGS. 50-67 demonstrates that full forked gratings yield a great deal of scattered light. Finer forked gratings yield better define modes within OAM images. By removing unnecessary light from the hologram (white regions) there is a reduction in scatter. Holograms that are larger and have fewer features (more dark zones) having a hologram diameter of 200 micro mirrors provide overlapping modes and strong intensity. Similar configurations using 100 micro mirrors also demonstrate overlapping modes and strong intensity. Smaller holograms having smaller radii between 100-200 micro mirrors and periods between 50 and 100 generated by a DLP produce better defined modes and have stronger intensity than larger holograms with larger radii in periods. Smaller holograms having more features (dark zones with hologram diameters of 200 micro mirrors provide well-defined modes with strong intensity. However, hundred micro mirror diameter holograms while providing well-defined modes provide weaker intensity. Thus, good, compact hologram sizes are between 100-200 micro mirrors with zone periods of between 50 and 100. Larger holograms have been shown to provide a richer OAM topology.

Figure 68:
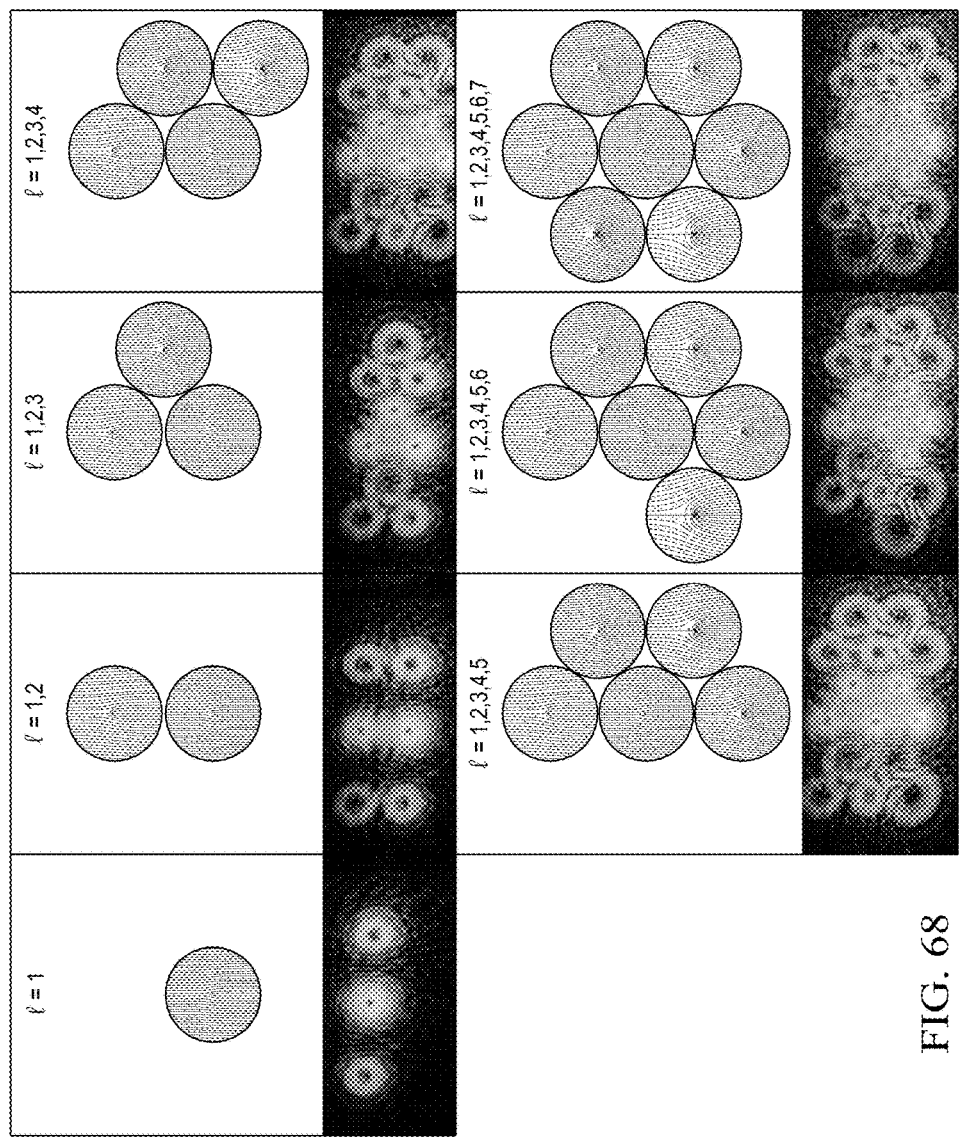
FIG. 68 illustrates additional methods of multimode OAM generation by implementing multiple holograms within a MEMs device.

Additional methods of providing multimode OAM generation by implementing multiple holograms within a MEMs device are illustrated in FIG. 68. These configurations of holograms illustrate the hologram configurations and associated OAM mode images for mode combinations from l=1 to l=1, 2, 3, 4, 5, 6, 7.

Figure 69:
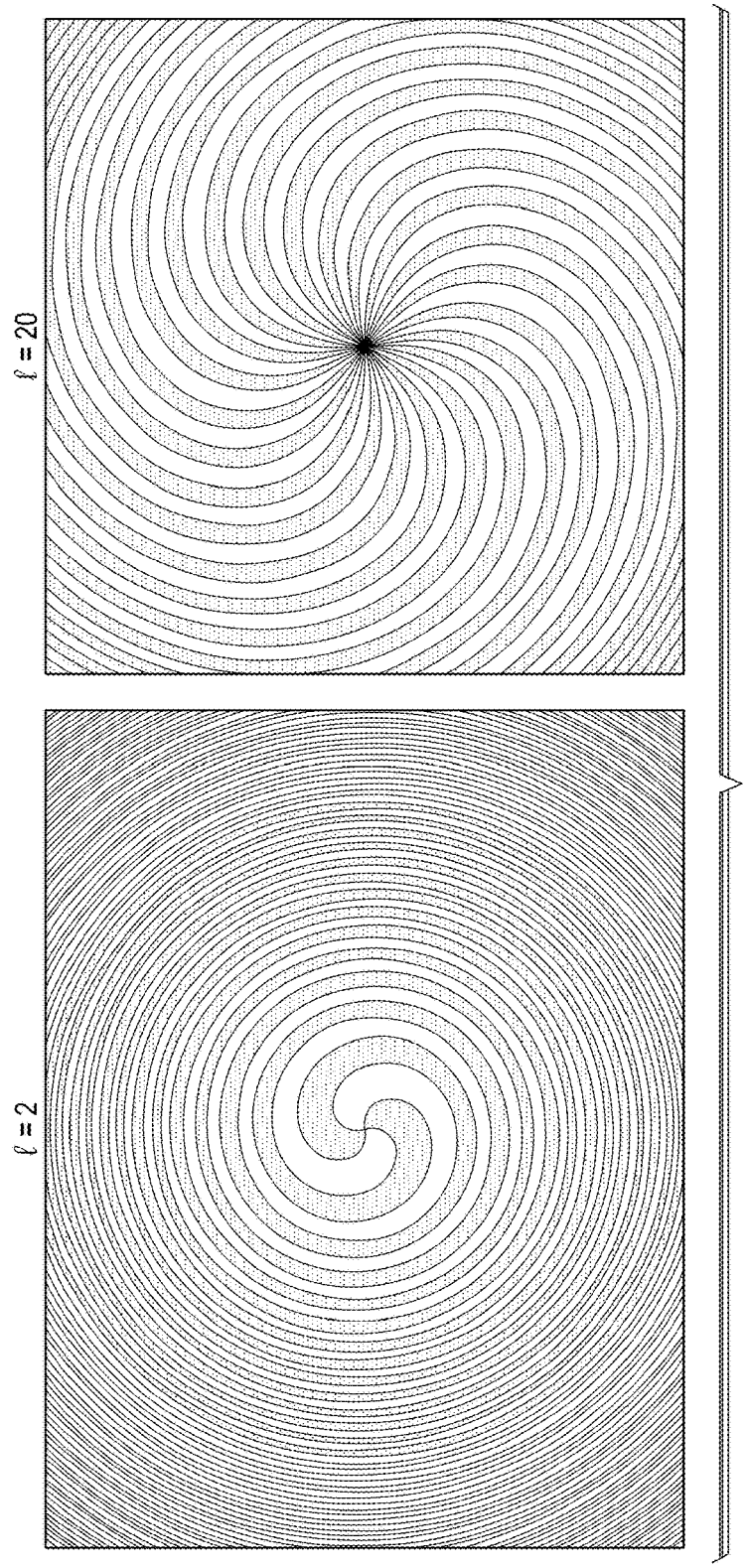
FIG. 69 illustrates binary spiral holograms.

In addition to the binary forked holograms discussed hereinabove, the Matlab capability of the DMD also enables the generation of binary spiral holograms of differing mode levels. FIG. 69 illustrates binary spiral holograms for l=1 and l=20.

It will be appreciated by those skilled in the art having the benefit of this disclosure that this system and method for applying orthogonal limitations to light beams using microelectromechanical systems provides improved mode data transmission capability. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A system for generating a programmably structured light beam having a plurality of orthogonal function modes applied thereto, comprising:
a light source for generating a plane wave light beam;
a MicroElectroMechanical (MEM) system including an array of micro-mirrors for generating the programmably structured light beam having the plurality of orthogonal function modes applied thereto responsive to the plane wave light beam and control signals for controlling the array of micro-mirrors;
a controller for generating the control signals to dynamically control a position of each of a plurality of micromirrors of the array of micro-mirrors, the controller further generating the control signals to cause the MEM system to switch between differing modes of the plurality of orthogonal function modes at a rate of at least 1000 times per second; and
wherein the controller controls the position of the plurality of micro-mirrors to dynamically generate a plurality of holograms for dynamically applying the plurality of orthogonal function modes to the plane wave light beam and to dynamically encode a phase and amplitude of the programmably structured light beam responsive to the control signals to generate the programmably structured light beam.

2. The system of claim 1, wherein the controller switches the array of micro-mirrors between different holograms to dynamically control the plurality of orthogonal function modes applied to the light beam and to dynamically encode the phase and the amplitude of the programmably structured light beam from the MEM system.

3. The system of claim 1, wherein the controller controls the array of micro-mirrors to produce holograms having a radius substantially in a range of 100-200 micro-mirrors and a period substantially in a range of 50-100.

4. The system of claim 1 further including a memory for storing data enabling the controller to generate the plurality of holograms responsive to the data.

5. The system of claim 1, wherein the light beam comprises a light beam in frequencies in a range from infra-red to ultra-violet.

6. The system of claim 1, wherein the MEM system further comprises switching circuitry responsive to the control signals for switching micro-mirrors within the array of micro-mirrors between an "on" state and an "off" state at least 1000 times per second.

7. The system of claim 1, wherein the controller configures the array of micro-mirrors to present a plurality of holograms at a same time.

8. The system of claim 7, wherein the controller configures the array of micro-mirrors to selectively present the plurality of holograms on a light background or a dark background.

9. The system of claim 7, wherein the controller configures the array of micro-mirrors to present the plurality of holograms with a separation between each of the holograms.

10. The system of claim 1, wherein the MEM System comprises a digital light processor (DLP).

11. The system of claim 1, wherein the controller controls the position of the micro-mirrors to multiplex the plurality of orthogonal function modes within the programmably structured light beam.

12. A system for generating a programmably structured light beam having a plurality of orthogonal function modes applied thereto, comprising:
a light source for generating a plane wave light beam;
a MicroElectroMechanical (MEM) system including an array of micro-mirrors for generating the programmably structured light beam having the plurality of orthogonal function modes applied thereto responsive to the plane wave light beam and control signals for controlling the array of micro-mirrors, wherein the orthogonal function modes comprise at least two of Laguerre Gaussian modes, Hermite Gaussian modes and vortex OAM modes;

a controller for generating the control signals to dynamically control a position of each of a plurality of micro-mirrors of the array of micro-mirrors, the controller further generating the control signals to cause the MEM system to switch between differing modes of the plurality of orthogonal function modes; and wherein the controller controls the position of the plurality of micro-mirrors to dynamically generate a plurality of holograms for dynamically applying the plurality of orthogonal function modes to the plane wave light beam and to dynamically encode a phase and amplitude of the programmably structured light beam responsive to the control signals to generate the programmably structured light beam.

13. The system of claim 12, wherein the controller switches the array of micro-mirrors between different holograms to dynamically control the plurality of orthogonal function modes applied to the light beam and to dynamically encode the phase and the amplitude of the programmably structured light beam from the MEM system.

14. The system of claim 12, wherein the controller controls the array of micro-mirrors to produce holograms having a radius substantially in a range of 100-200 micro-mirrors and a period substantially in a range of 50-100.

15. The system of claim 12 further including a memory for storing data enabling the controller to generate the plurality of holograms responsive to the data.

16. The system of claim 12, wherein the light beam comprises a light beam in frequencies in a range from infra-red to ultra-violet.

17. The system of claim 12, wherein the MEM system further comprises switching circuitry responsive to the control signals for switching micro-mirrors within the array of micro-mirrors between an "on" state and an "off" state at least 1000 times per second.

18. The system of claim 12, wherein the controller configures the array of micro-mirrors to present a plurality of holograms at a same time.

19. The system of claim 18, wherein the controller configures the array of micro-mirrors to selectively present the plurality of holograms on a light background or a dark background.

20. The system of claim 18, wherein the controller configures the array of micro-mirrors to present the plurality of holograms with a separation between each of the holograms.

21. The system of claim 12, wherein the orthogonal function modes further comprises one of Laguerre-Gaussian functions, Hermite-Gaussian functions or twisted mode functions.

22. The system of claim 12, wherein the light beam having the plurality of orthogonal function modes applied thereto is used for quantum key distribution.

* * * * *